United States Patent [19]
Unuma et al.

[11] Patent Number: 5,483,630
[45] Date of Patent: Jan. 9, 1996

[54] METHOD AND APPARATUS FOR REPRESENTING MOTION OF MULTIPLE-JOINTED OBJECT, COMPUTER GRAPHIC APPARATUS, AND ROBOT CONTROLLER

[75] Inventors: Munetoshi Unuma; Ryozo Takeuchi, both of Hitachi, Japan

[73] Assignee: Hitachi, Ltd., Tokyo, Japan

[21] Appl. No.: 727,108

[22] Filed: Jul. 9, 1991

[30] Foreign Application Priority Data

Jul. 12, 1990 [JP] Japan ................................ 2-182632
May 23, 1991 [JP] Japan ................................ 3-118341

[51] Int. Cl.⁶ ............................................. G06T 13/00
[52] U.S. Cl. ........................................... 395/152; 345/122
[58] Field of Search .............................. 395/152, 87, 81, 395/96; 340/724, 725, 726; 358/93; 345/122

[56] References Cited

U.S. PATENT DOCUMENTS

| | | | |
|---|---|---|---|
| 4,600,919 | 7/1986 | Stern | 340/725 |
| 4,663,726 | 5/1987 | Chand et al. | 395/87 |
| 4,705,999 | 10/1987 | Soji et al. | 318/568 |
| 5,049,797 | 9/1991 | Phillips | 318/568.16 |
| 5,053,760 | 10/1991 | Frasier et al. | 340/725 |
| 5,083,201 | 1/1992 | Ohba | 358/105 |

FOREIGN PATENT DOCUMENTS 8909458  10/1989  WIPO .

OTHER PUBLICATIONS

Wilhelms, "Toward Automatic Motion Control," IEEE Computer Graphics and Applications, vol. 7, No. 4, Apr. 1987, pp. 11–22.
Agui et al, "Three–dimensional Computer Animation by Trigonometric Approximation to Aperiodic Motion", May '88, pp. 82–88.

*Primary Examiner*—Heather R. Herndon
*Assistant Examiner*—Michael Smith
*Attorney, Agent, or Firm*—Antonelli, Terry, Stout & Kraus

[57] ABSTRACT

A bending angle of each joint of a multiple-jointed object is represented with a function expressed independently of a length between joints of the object. Based on the function, contour data is produced for a motion of each joint, which is then displayed on a screen. With this provision, it is unnecessary to generate again functions each time the size of the object changes. Namely, the functions are independent of the size of the object. Since parameters of the functions can be altered to add characteristics to changes in the bending angles the respective joints, the object is actuated in an action having an emotional expression.

35 Claims, 44 Drawing Sheets

METHOD AND APPARATUS FOR REPRESENTING MOTION OF MULTIPLE-JOINTED OBJECT, COMPUTER GRAPHIC APPARATUS, AND ROBOT CONTROLLER

BACKGROUND OF THE INVENTION

The present invention relates to a method of representing motion of a multiple-articulated object such as a human or an animal, and in particular, to a motion representation method, a motion representing apparatus, a computer graphic apparatus, and a robot controller suitable for facilitating an operation to set and to change a motion of the multiple-hinged object when a size thereof is altered and for enabling various kinds of motions to be represented.

In order to represent in computer graphics such motions as walking and running actions of a human and motions of a horse and a spanworm, a key frame method has been employed in general. According to the key frame method, to generate motions of a multiple-articulated object such as a human or a horse, the user first defines contours thereof at a point of time and at a subsequent point of time, respectively. Contours between these periods are determined based on an interpolation so that the respective contours or shapes thus attained are sequentially displayed in a time-series manner to resultantly produce a motion picture in which the multiple-jointed object seems to make a real action. However, the key frame method is attended with a problem that the contours thus determined in the time-series manner for the motion of the object takes a long period of time, which hence requires a considerably large amount of processing time and which imposes a heavy load on the operator.

Heretofore, to overcome this problem, as described in an article entitled "A Study of Computer Animation Composed of Animation Primitives by Trigonometric Motion Approximation" written in the Proceedings of IECE of Japan, Jan. 1980, Vol. J63-D No. 1, an action of a human is shot by a camera to attain an animation picture thereof on a 16 millimeter (mm) film so as to measure movements of representative points of joints or articulations. For each joint portion above, horizontal and vertical positions X and Y thereof are obtained in centimeters relative to reference positions in a form of a function of time T, thereby determining a locus of the movement of each joint portion. Thereafter, the locus of the movement is approximated by a straight line and a trigonometric curve such that the computer system achieves computations on the approximated curve to attain respective contour data items in a time sequence, which are then sequentially displayed as a motion picture in the graphic system.

According to the prior art above, the movement of each articulation thus obtained through the shooting operation on a 16 mm film is analyzed to extract changes in the X-directional and Y-directional positions relative to the respective reference positions at each point of time, thereby determining the approximated curve of the motion of the human. Consequently, a satisfactory animation picture is developed when the action is to be expressed by the approximated curve. However, the approxiamted curve cannot be applied to a case, for example, where the size of the object is varied or where dimensional ratios between the respective joints are altered in the motion. In this case, there arises a problem that the shooting operation is required to be again actually achieved on the object with the pertinent size and/or with the associated ratio between the joints, which leads to a limited degree of freedom for representing the animation. That is, according to the conventional technology, when generating a motion picture of a multiple-jointed object in the computer graphic system, the image can be presented only as an analogy of the real object having thus undergone the shooting operation. This means that various actions cannot be developed in computer graphics. For example, only an ordinary walking action of a human shot by the camera can be displayed in the graphic image. Namely, even when the ordinary or standard action is modified, a motion picture of, for example, a violent walking action or a joyful or pleasant walking motion cannot be obtained. consequently, heretofore, to express such an action above, for example, a human model is required to actually walk with a violent feeling to be shot by a camera so as to attain an image of the violent walk, which is then analyzed to implement an objective animation picture. In other words, for example, when producing a motion picture of animals, insects, and imaginary objects of which various actions cannot be actually shot by a camera, various movements thereof cannot be easily presented in computer graphics.

In addition, it has been impossible in the conventional technology to produce an action with a human sentimental or emotional feature, which is usually expressed, for example, by a feature. That is, a characteristic action with a human emotion cannot be reflected on animation picture of the multiple-jointed object.

SUMMARY OF THE INVENTION

It is therefore an object of the present invention to provide a motion representation method and a computer graphic apparatus in which, even when a size of a multiple-jointed object and/or a dimensional ratio between joints thereof are altered, a motion of the object can be easily changed in computer graphics.

Another object of the present invention is to provide a motion representation method and a computer graphic apparatus in which a multiple-articulated object can achieve various motions such as those having characteristics of actions of the object in computer graphics.

Still another object of the present invention is to provide a method of and an apparatus for controlling a robot in which an action of the robot can be determined independent of a size thereof and in which instructions of various motions can be issued to the robot, thereby solving a problem, similar to that described above, appearing when the robot is actually operated for various actions.

A first feature of the present invention resides in that, when a motion of a multiple-articulated object is presented on a display screen by controlling an action of each joint of the object, a bending angle of each articulation is expressed by a function independent of a length between articulations such that data of a contour of the multiple-jointed object in motion are obtained from the function, thereby displaying an image of the object according to a change in a size and/or a dimensional ratio between joints thereof.

A second feature of the present invention resides suitably in that in a case where a motion of a multiple-jointed object is presented on a display screen by controlling an action of each joint of the object, a bending angle of each articulation is expressed by the following function independent of a length between articulations.

$$\theta_m(t) = D_m + \sum_{n=1} A_{mn} \times \sin(n \times t + \psi_{mn} - \Phi_{m \times n}) \quad (1)$$

$D_m$: Direct-current component $A_{mn}$: Amplitude of each frequency component $\Psi_{mn}$: Phase m: Joint number n: Higher harmonic of n-th order $\Phi_m$: Phase difference of 1st order higher harmonics between reference joint and m-th joint ($\Phi_m=0$ for reference joint)

Data of a contour of the multiple-jointed object in motion are obtained from values of the function $\theta_m(t)$ for each joint.

A third feature of the present invention resides in that, when a motion of a multiple-jointed object is presented on a display screen by controlling an action of each joint of the object, a bending angle of each articulation is expressed by a function independent of a length between articulations and components of the respective functions are modified when presenting the motion of the object.

A fourth feature of the present invention resides in that in the function (1), at least either one of the parameter values of $D_m$, $A_{mn}$, and $\Psi_{mn}$ is changed.

A fifth feature of the present invention resides in that in a robot control operation in which instructions of operations are supplied to a multiple-jointed robot so as to instruct the robot to achieve a desired motion, a bending angle of each articulation is expressed by a function independent of a length between articulations such that positional data is computed for each joint of the robot based on the function, thereby producing the operational instructions.

A sixth feature of the present invention resides in that a bending angle of each joint of a multiple-jointed object is expressed by a function independent of a length between joints so as to reflect onto the function a feature of a motion such as one expressed by an element of a human emotion which may be linguistically represented by a feature.

A seventh feature of the present invention resides in that when presenting a motion of a multiple-jointed object on a display screen by controlling an action of each joint of the object, the action of the object is expressed by a function of time. Means for changing parameters disposed to develop various kinds of motions includes at least either one of means for obtaining a mean value of parameters of each function of time representing a plurality of actions, means for controlling a direction or an orientation of the multiple-jointed object, means for creating a route of a motion, means for changing a stride length between an inner side and an outer side of a curve, means for taking into consideration an influence of a centrifugal force, means for controlling a stride length in the motion, means for interpolating the function of time with respect to space, means for combining an action created in the key frame method With an action generated from the function of time, means for producing a function of time from measured data, means for generating a function of time from the action created in the key frame method, and means for correcting the function of time.

As set forth above, when a bending angle of each articulation of a multiple-hinged object is expressed by a function, the angle can be independent of a length between articulations. Consequently, in a case when a contour of the multiple-jointed object to be displayed is computed depending on the bending angle of each joint, the computation can be accomplished independently of the size of the object, namely, the function need not be prepared again for the computation. Consequently, even when the multi-articulated object is changed in its size, the computation of the contour thereof can be carried out by use of the functions prepared beforehand. Moreover, to change the representation of the motion, the user need only modify parameters of the functions to alter, for example, a change rate of the bending angle of each joint.

Furthermore, when computing mean values of the respective parameters of the functions of time representing a plurality of actions in the motion representation, the motion can be represented depending on a mean value of a plurality of functions of time.

The user may control the proceeding direction of the motion by adjusting the direction of the multiple-articulated object.

The object can be arbitrarily moved or displaced in a space based on a route of the motion prepared beforehand.

The inching width is varied between the inner and outer sides of a curve and hence the slip of a foot is prevented.

Owing to the influence of the centrifugal force taken into consideration, an inclination of a body can be presented in a circular motion.

The number of steps in an interval can be controlled depending on a stride width supervised in a movement.

Based on an interpolation of a function of time with respect to a space, the motion can be altered while the object is being moved. Depending on an interpolation of a function of time with respect to time, the motion can be varied depending on an elapsed time.

By combining a motion produced in the key frame method with one created from a function of time, there can be represented a motion which cannot be represented only from the function of time.

Measured data are processed to generate a function of time, which enables an actual motion to be produced depending on the function of time.

A function of time is created from a motion obtained in the key frame method and hence an imaginary action not actually existing in the accessible environment can be produced from the function of time.

A function of time can be corrected by interpolating the function of time.

DESCRIPTION OF THE PREFERRED EMBODIMENTS

Figure 1:
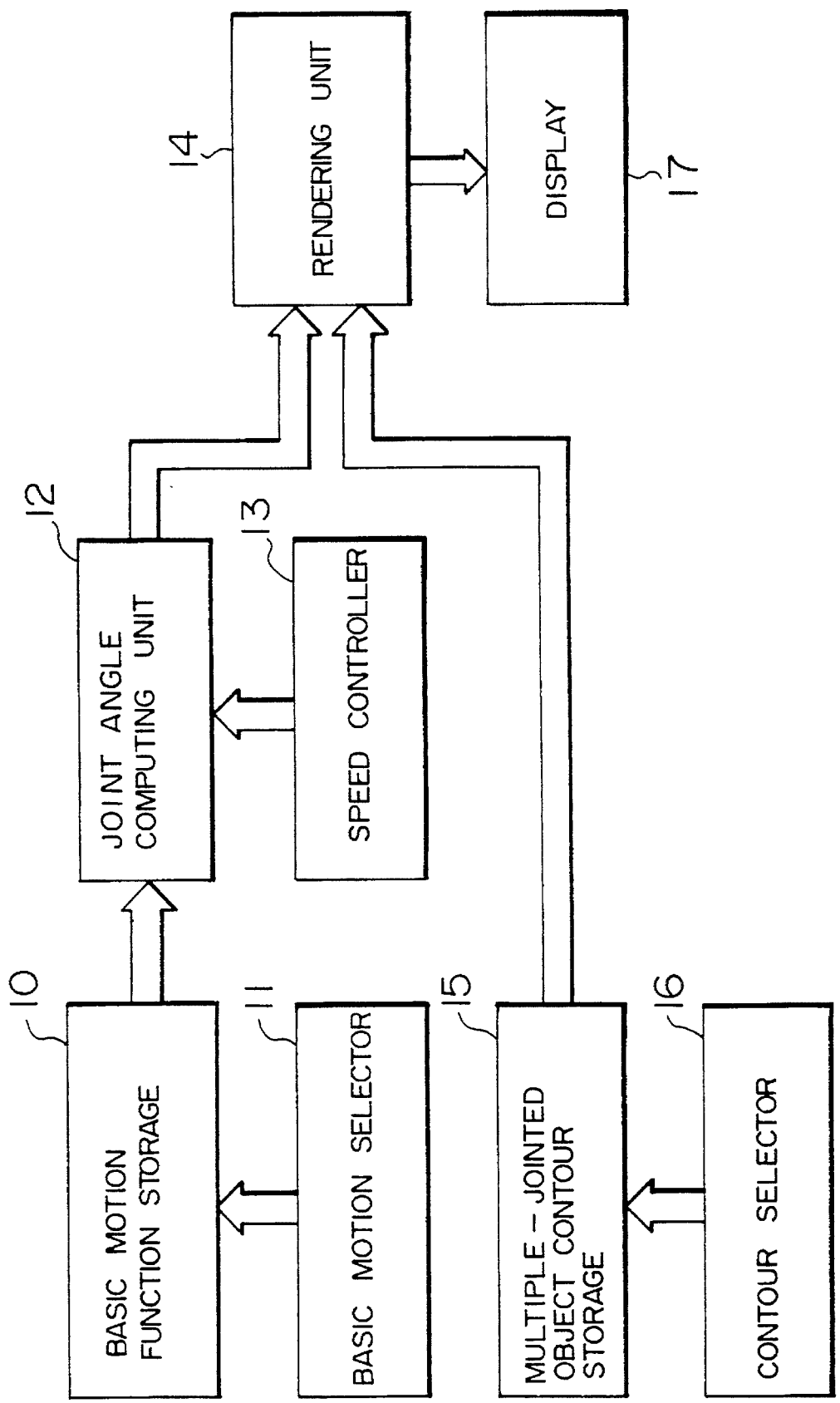
FIG. 1 is a schematic diagram showing the configuration of a computer graphic apparatus in a first embodiment according to the present invention.

Referring now to the drawings, description will be given of embodiments according to the present invention.

Figure 2:
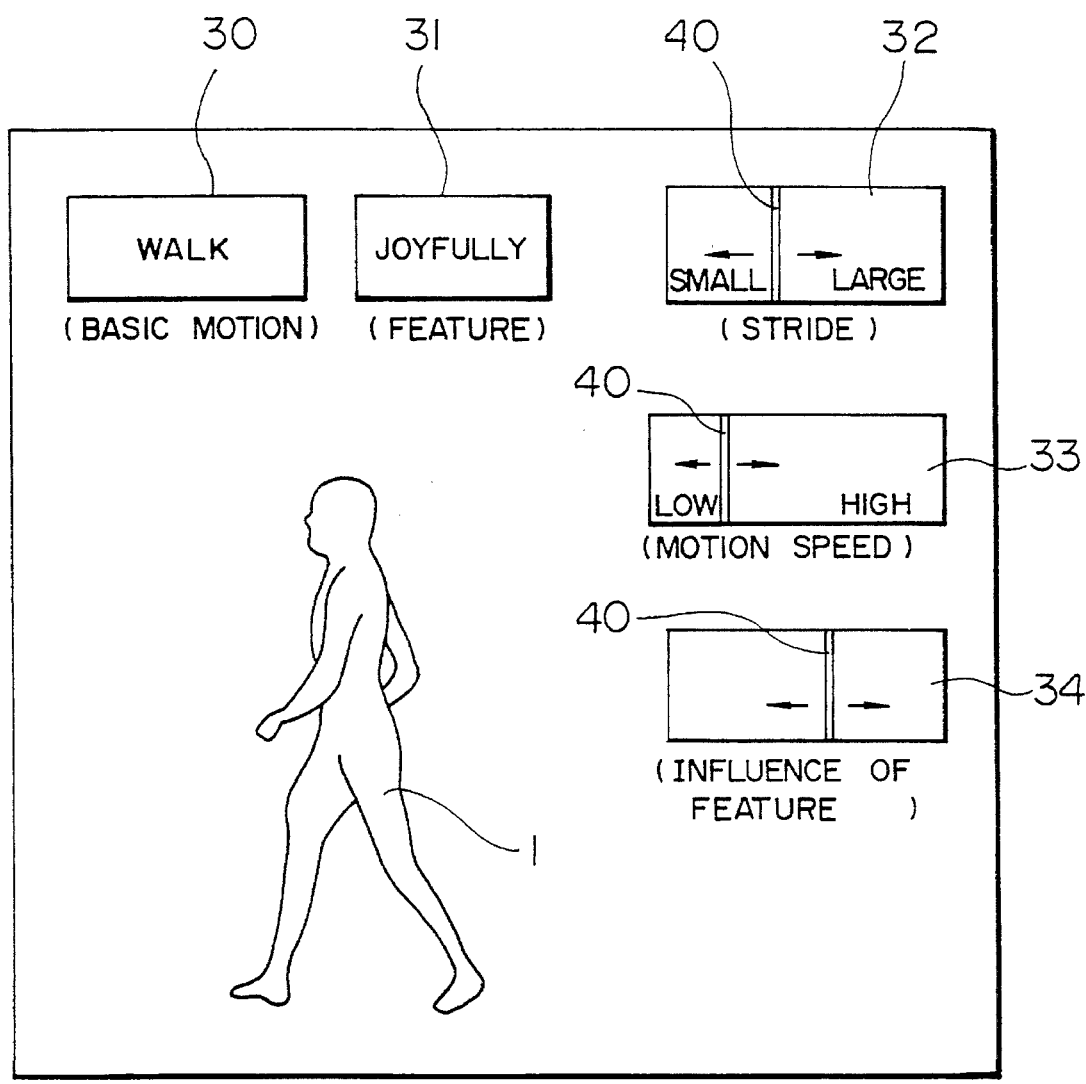
FIG. 2 is a diagram showing the display screen layout of the computer graphic apparatus.
Figure 3:
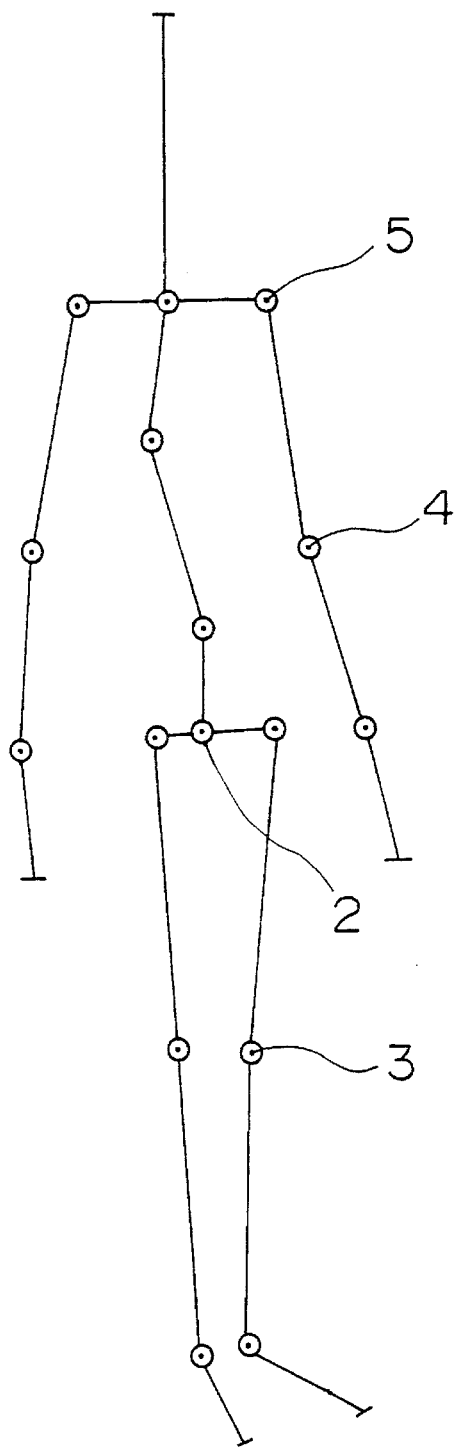
FIG. 3 is a diagram showing an image of a human in a line drawing.

FIG. 1 shows the configuration of a computer graphic apparatus in a first embodiment according to the present invention. In this system, as shown in FIG. 2, an example of a multiple-jointed object i.e. a human is presented in an animation picture of a multiple-articulated object 1 on a display screen such as a CRT. In operation of the computer graphic apparatus, the multiple-hinged object 1 is represented as a multiple-jointed object in a linework as shown in FIG. 3. In this line drawing, a bending angle of each joint (a coxa 2, a knee joint 3, an elbow joint 4, and a shoulder joint 5 in the example of FIG. 3) is controlled to attain various kinds of contours. Thereafter, the body portion is added to the line drawing to display a motion image of a human (FIG. 2).

The computer graphic apapratus of FIG. 1 includes a basic motion function storage 10 for storing therein for each basic motion a periodic function expressing a bending angle of each articulation, a basic motion selector 11 for selecting a desired function from the various functions loaded in the storage 10, a joint angle computing unit 12 for receiving the function selected from the storage 10 by the selector 11 and for computing based thereon a bending angle of the pertinent joint in a time series manner, a speed controller 13 for controlling a speed at which the computing unit 12 achieves the computation of the joint angle in a time series fashion, namely, the speed of a motion conducted by the joint, a multiple-hinged object contour storage 15 for storing therein contours used to draw bodies related to lineworks of the various multiple-jointed objects, a contour selector 16 for selecting a contour of a multiple-articulated object, a rendering unit 14 for drawing a body for the motion of the multiple-jointed object, which is expressed only by joint bending angles computed by the computing unit 12, based on the contour read from the storage 15, thereby generating image information for displaying the picture in a two-dimensional manner, and a display 17 for presenting the picture depending on the image information.

The basic motion function storage 10 is loaded with functions associated with a motion of each joint for each basic action such as a walking action, a running action, or a sitting action. Under this condition, to select a basic motion, the operator picks a basic operation specification icon 30 presented on the display screen as shown in FIG. 2. In the following paragraph, a walking action of a human image is taken as an example to be expressed by a function representing a motion to be displayed.

Figure 4:
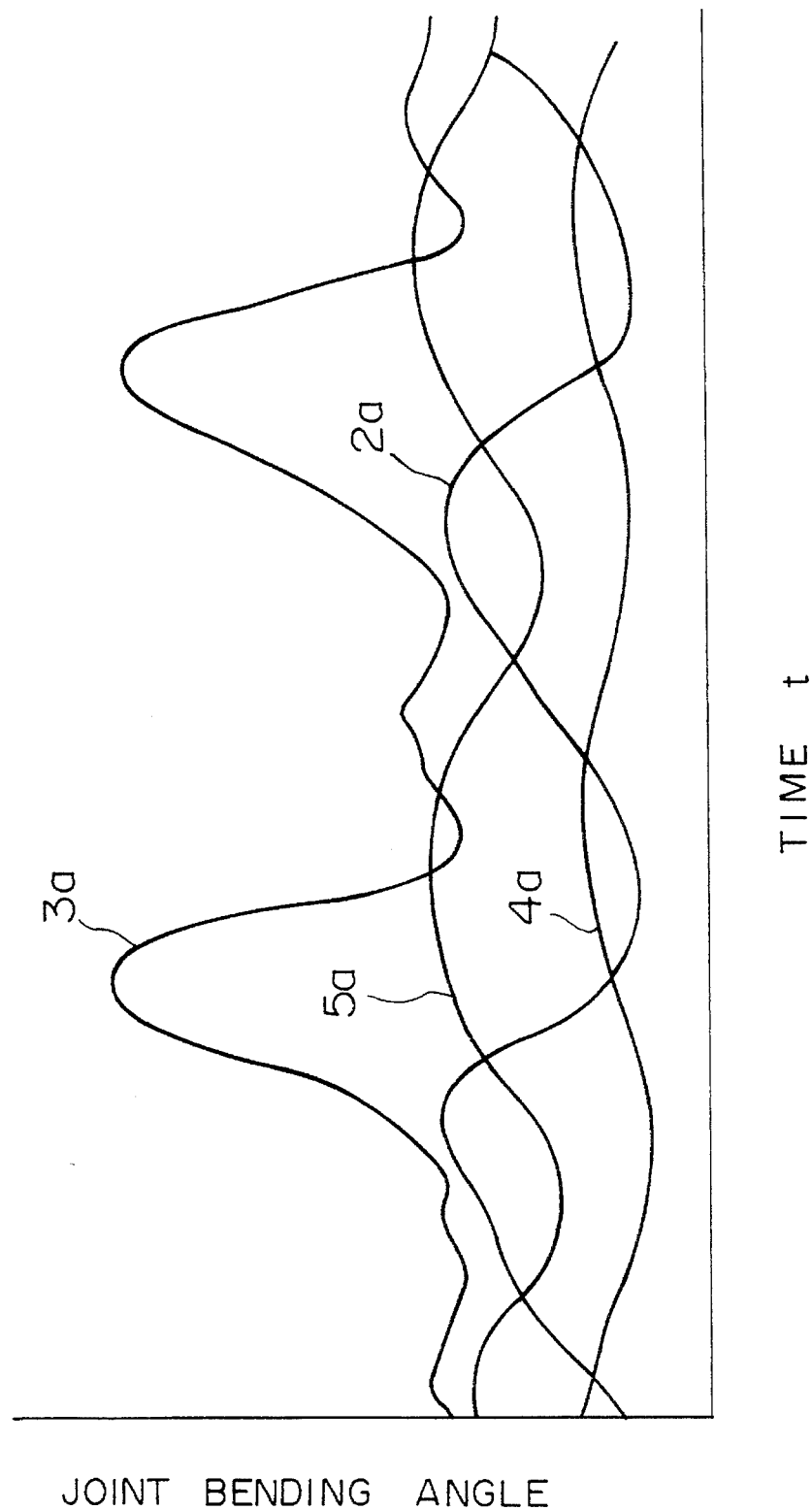
FIG. 4 is a graph presenting measured values of a change in the bending angles of primary joints of the human.
Figure 5:
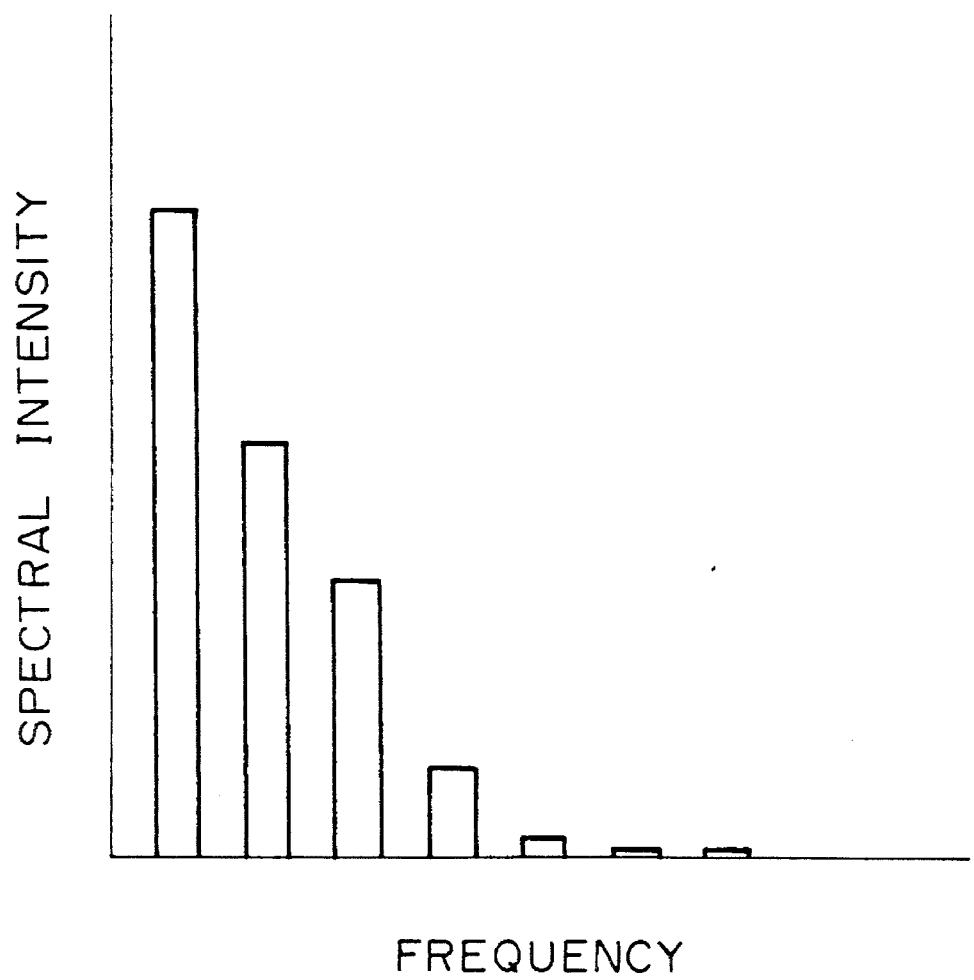
FIG. 5 is a graph showing a spectrum related to a curve 3a of FIG. 4.

FIG. 4 is a graph showing curves representing changes with respect to time of measured bending angles of primary joints of a walking person viewed from a horizontal direction (X-axis direction). Curves 2a, 3a, 4a, and 5a designate changes with respect to time of measured bending angles of the coxa, the knee joint, the elbow joint, and the shoulder joint, respectively. The angle changes are measured for two periods (strides or steps). These curves show correlations existing between the actions of the respective articulations. FIG. 5 is a spectral diagram obtained by achieving a Fourier analysis on the measure values 3a of the knee joint of FIG. 4. Essential spectrum compounds can be expressed by use of a function of at most the fifth or sixth degree. Namely, there need not be employed a complicated expression including high-frequency components. In consequence, the change $\Theta_m(t)$ with respect to time of the joint bending angle can be expressed by the following equation of a very low degree. For example, as shown in FIG. 5, seven spectrum elements need only be required to express the angle change $\Theta_m(t)$. The following function (1) is identical with the previously described above, but since the embodiment is clearly described, the function (1) is again used as follows;

$$\Theta_m(t) = D_m + \sum_{n+1} A_{mn} \times \sin(n \times t + \psi_{mn} - \Phi_{m \times n}) \qquad (1)$$

where,
- $D_m$: Direct current component
- $A_{mn}$: Amplitude of each frequency component
- $\psi_{mn}$: Phase
- m: Joint number
- n: Higher harmonic of n-th order
- $\Phi_n$: Phase difference of 1st order higher harmonic between reference joint and m-th joint ($\Phi_m=0$ for reference joint)

In this connection, the harmonization between the actions of the respective joints is expressed by use of a difference between phases of the joints. The phase differences are retained through the motion.

The joint angle computing unit 12 of FIG. 1 achieves computations based on the function (1) to obtain an action of the knee joint while changing the value of the variable t such that the position of the joint is sequentially displayed at the point of time t, thereby presenting a motion picture of the knee. Incidentally, to set the action speed, the operator uses a motion specification icon 33 of FIG. 2. Namely, when the display item of a vertical bar 40 in the icon is horizontally shifted by a mouse cursor or the like, the speed controller 13 of FIG. 1 is activated to develop its operation. The joint angle computing unit 12 computing based on the function (1) the values of $\Theta_m(t_1)$, $\Theta_m(t_2)$, $\Theta_m(t_3)$, etc. in a time series fashion increases the value of $t_2-t_1=t_3-t_2=\ldots=\Delta t$ before achieving the computations when the operator specifies a higher motion speed.

Since the function (1) above does not include any parameter denoting a length, even when a size and/or a dimensional ratio between joints of the object are/is varied, the function (1) need not be modified. Consequently, also when it is desired to alter a size of a multi-hinged object to be displayed, the load imposed on the operator is not increased; moreover, after the size is changed, the animation picture of the multi-articulated object can be displayed at a high speed. That is, according to the embodiment above, the operator need only select a kind of each basic motion, a motion speed thereof, and a contour of each joint for a motion picture. Namely, a motion of a multi-jointed object can be developed with a very small amount of information and through a small number of operation steps.

Referring now to the motion representing apparatus of FIG. 1, the operation of the first embodiment will be described. First, the contour storage 15 is loaded, for example, with contour data related to a state of a person image standing in an upright style and contour data of a basic posture of a flying butterfly. The contour selecting unit 16 selects desired contour data therefrom. For example, when the contour data of a person image are selected, the selected data are fed to the rendering unit 14. On the other hand, the basic motion function storage 10 is loaded, for example, with functions for which parameters of basic actions of a person such as a walking action, a running action, and a sitting action are respectively specified. One of the basic motions is selected by the basic motion selector 11. For example, when a running action is selected, the function associated with the running action is transferred to the joint angle computing unit 12, which in turn achieves a computation of the function (1) to produce data of angles. The computation result is transferred together with a speed change rate indicated by the speed controller 13 to the rendering unit 14. Based on the contour data from the contour storage 15 and the angle data thus received, the rendering unit 14 creates image data to be sent to the display 17, which resultantly presents thereon a picture of the image data.

Figure 6:
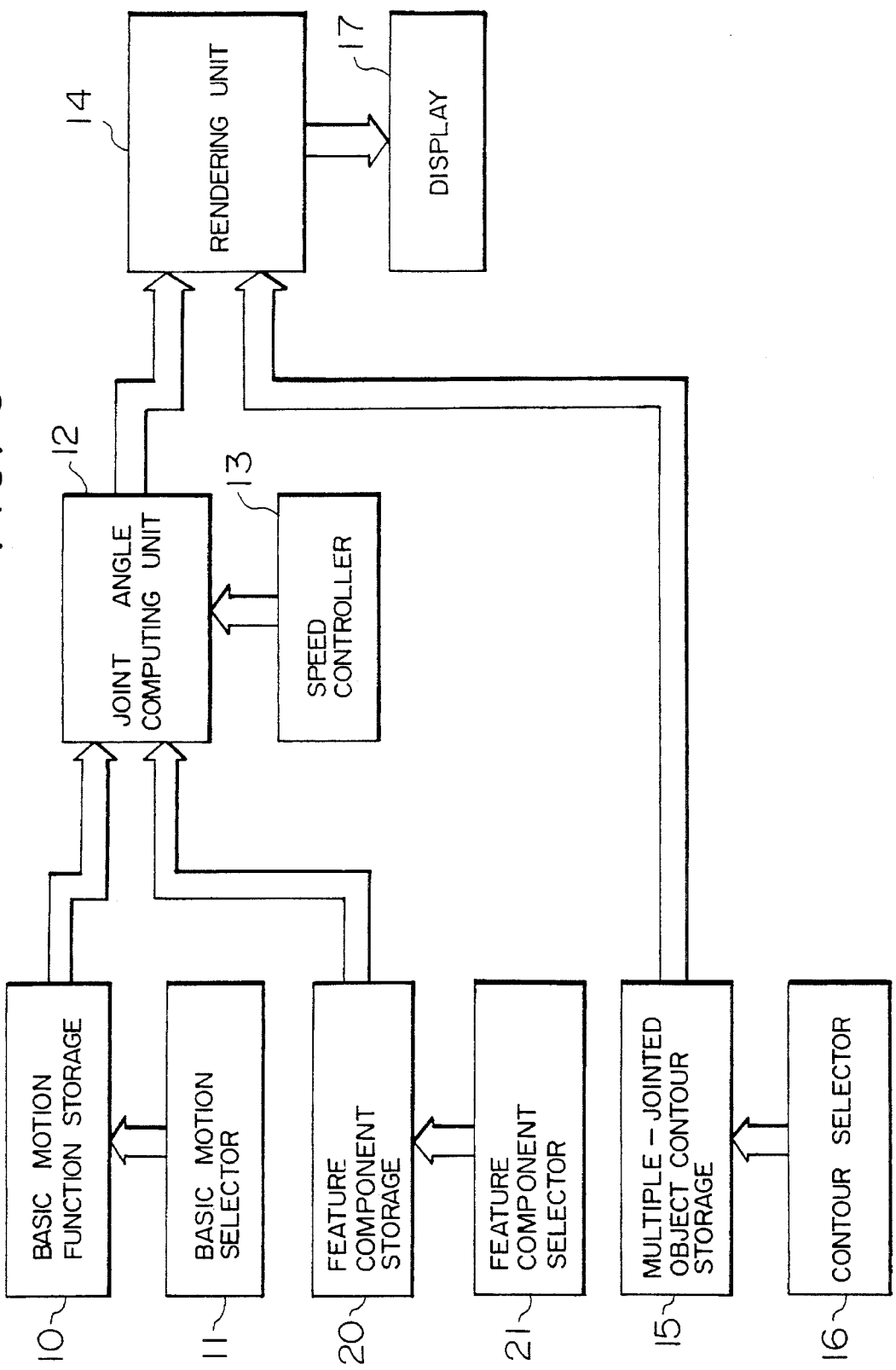
FIG. 6 is a schematic diagram showing the configuration of a computer graphic apparatus in a second embodiment according to the present invention.

FIG. 6 shows the constitution of a computer graphic apparatus in a second embodiment according to the present invention. As compared with the configuration of the first embodiment of FIG. 1, the second embodiment includes a feature component storage 20 and a feature component selector 21. The joint angle computing unit 12 is configured to accomplish computations based on a selected basic operation function and a selected feature component. The feature component associated with a feature and is used to qualify an action or a motion. That is, the feature component is a feature such as joyfully, sadly, or delightfully. In this embodiment, the feature components are expressed in the form of functions so that the operator specifies a feature component to be selected. As can be seen from FIG. 2, the operator need only pick a feature selection icon 31 in the screen to choose a characteristic component. For example, with the mouse cursor or the like arranged over the icon 31, each time the left-side button is actuated features such as "joyfully", "merrily", "like a drunkard", and "calmly" are sequentially presented. When a desired feature is displayed on the screen, the operator actuates the right-side button to select the feature. In a case where "walk" is selected as the basic motion and "joyfully" is chosen as the feature element, the object of a human image 1 displayed achieves an indicated action, namely, the object 1 walks joyfully or merrily. Next, a description will be given of a control operation of the characteristic element.

Figure 7:
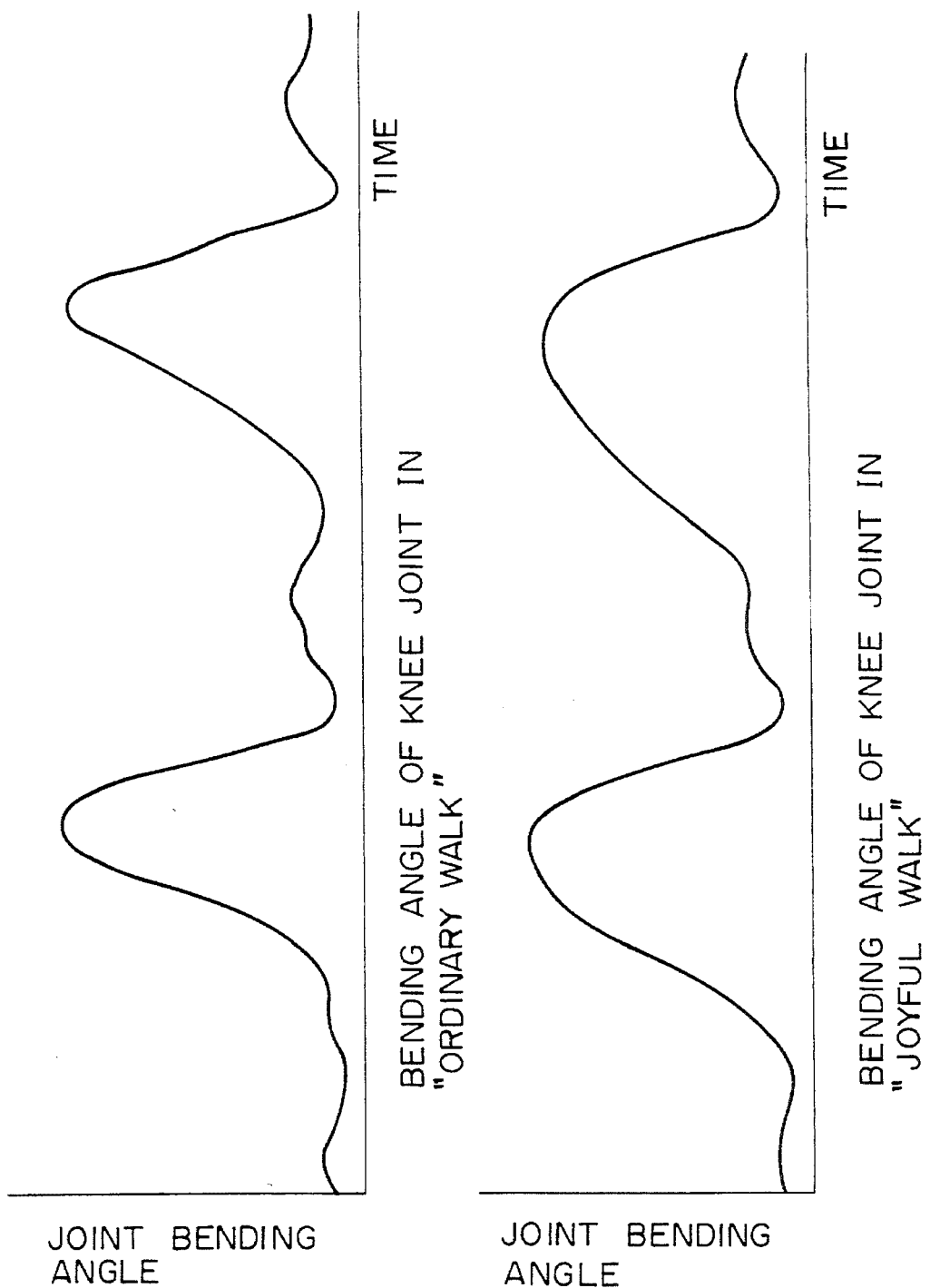
FIG. 7A is a graph, identical to the curve 3a of FIG. 4, presenting the bending angle change of a knee articulation in an ordinary walking action.
FIG. 7B is a graph showing the bending angle change of a knee articulation in a joyful walking action.
Figure 8:
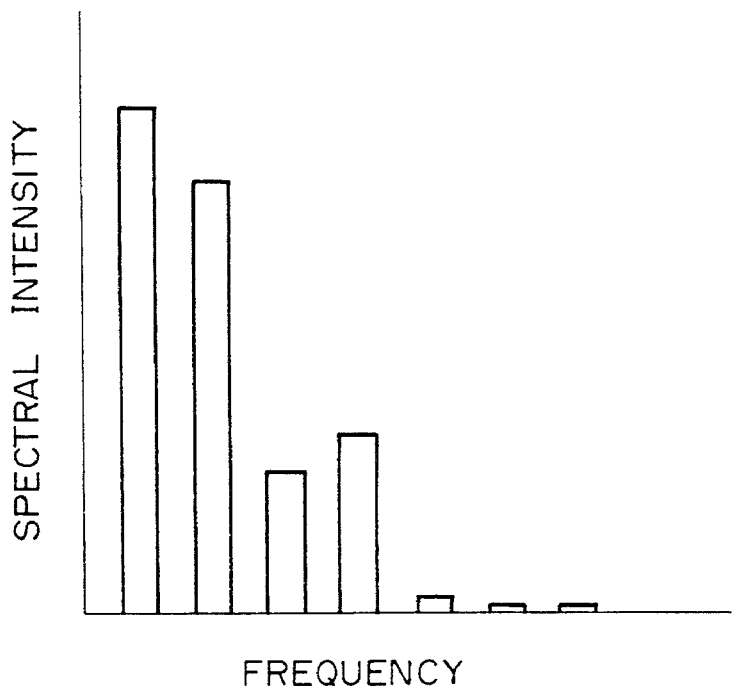
FIG. 8 is a graph showing a spectrum related to the curve of FIG. 7B.
Figure 9:
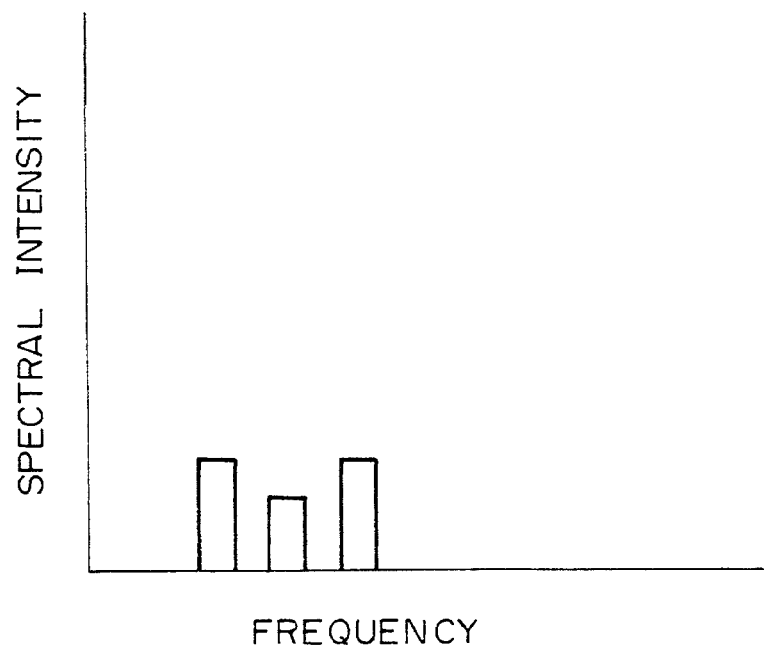
FIG. 9 is a graph showing a difference between spectra of FIGS. 5 and 8, respectively.

FIG. 7A is a graph presenting a change with respect to time of the measured bending angle of a knee joint in an ordinary walking action, whereas FIG. 7B is a graph showing a change with respect to time of the measured bending angle of a knee joint in a joyful walking action (i.e. the person walks joyfully). FIG. 8 shows a result of a spectral analysis achieved on the data of the joyful walking motion of FIG. 7B. In this connection, a result of a spectral analysis conducted on the measured values of the ordinary walking action of FIG. 7A is presented in the graph of FIG. 5. Consequently, a difference between the spectral analyses denotes the component associated with the feature "joyfully" as shown in FIG. 9. The graphs of FIGS. 5, 8 and 9 present only the power spectrum components having respectively different phases. As can be seen from the spectral graph of FIG. 9, the primary spectrum representing the expression "joyfully" as a feature element can be expressed with a function of, at most, the fifth or sixth degree. With the characteristic "joyfully" taken into consideration, the knee bending angle is represented by a function $\Theta_m(t)$ as follows.

$$\Theta_m(t) = (D_m + d_m) + \sum_{n=1} [(A_{mn} + a_{mn}) \times \qquad (2)$$

$$\sin\{n \cdot t + (\psi_{mn} + \psi_{mn}) - \phi_{mn \cdot n}\}]$$

where, $d_m$: Direct-current compound of "joyfully"

$a_{mn}$: Component of "joyfully" in each frequency component $\Phi_{mn}$: Phase component of "joyfully"

When the operator selects "joyfully" as the feature component by means of the selector 21 (FIG. 6), values of $d_m$, $a_m$, and $\psi_{mn}$ are read from the feature component storage 20 to be substituted in the function (1), thereby attaining a function (2) to be fed to the computing unit 12. As a result, the system displays on the screen an animation picture of a joyfully walking person.

In accordance with the second embodiment, only the feature selection is added to the operations of the first embodiment so that the multiple-articulated object can conduct an action qualified by the selected feature.

Since the operation of the motion representation apparatus of the second embodiment shown in FIG. 6 can be understood from the descriptions of the first embodiment of FIG. 1 and the second embodiment above, a redundant explanation thereof will be here omitted.

Figure 10:
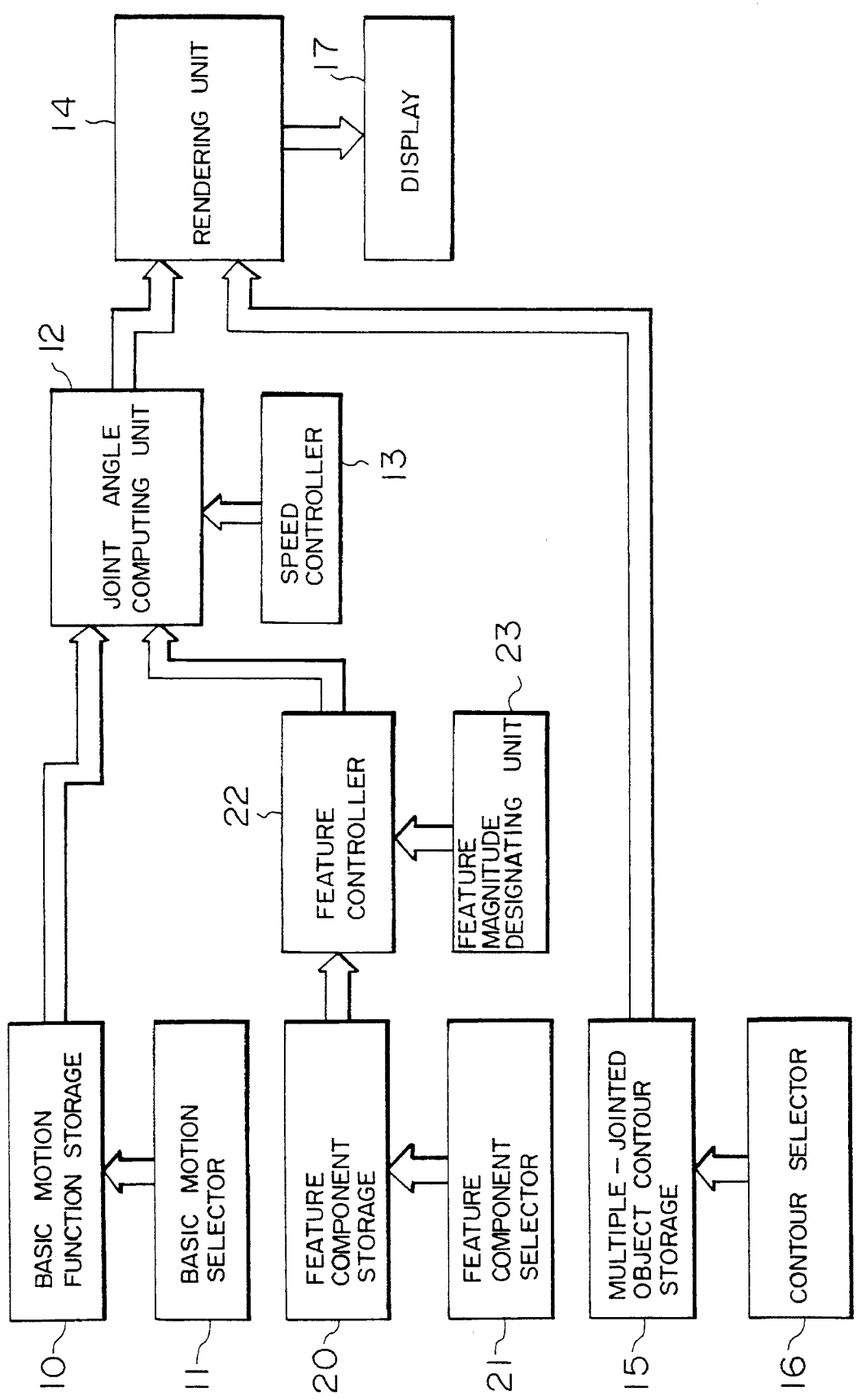
FIG. 10 is a schematic diagram showing the configuration of a computer graphic apparatus in a third embodiment according to the present invention.

FIG. 10 shows the configuration of a computer graphic apparatus in a third embodiment according to the present invention. When compared with the second embodiment of FIG. 6, this constitution additionally includes a feature controller 22 and a feature magnitude designating unit 23. In this embodiment, the joint angle computing unit 12 achieves computations based on the following function (3).

$$\Theta_m(T) = (A_m + \alpha_m \times d_m) + \beta_m \times \sum_{n=1} [(A_{mn} + \alpha_m \times a_{mn}) \times \qquad (3)$$

$$\sin\{n \cdot t + (\psi_{mn} + \alpha_m \cdot \psi_{mn}) - \phi_{mn \cdot n}\}]$$

where, $\alpha_m$ and $\beta_m$ denote a magnitude of a feature component and a magnitude or value of an amplitude, respectively. In this system, the feature magnitude $\alpha_m$ is changed to specify motions with expressions in a range including, for example, "walk ordinarily", "walk joyfully", and "walk quite joyfully". Alternatively, as a feature "sadly" opposite to "joyfully", there may be specified motions with expressions such as "quite sadly", "ordinarily", and "quite joyfully". In this operation, when the display item of the vertical bar 40 is horizontally shifted in the icon 34 denoting the feature magnitude of FIG. 2, the feature magnitude designating unit 23 specifies the desired magnitude of the feature component. The amplitude value $\beta_m$ is related to a stride length, which takes the larger value when the indication of the vertical bar 40 approches to the right end of the icon 32 of FIG. 2. Namely, the multiple-jointed object walks with a larger stride in the obtained animation picture.

According to the third embodiment, only by adding the magnitude specifying operation to the operations of the second embodiment, the degree of a feature component and a stride length can be altered; moreover, the feature magnitude and the stride length can be changed in a continuous manner.

Figure 11:
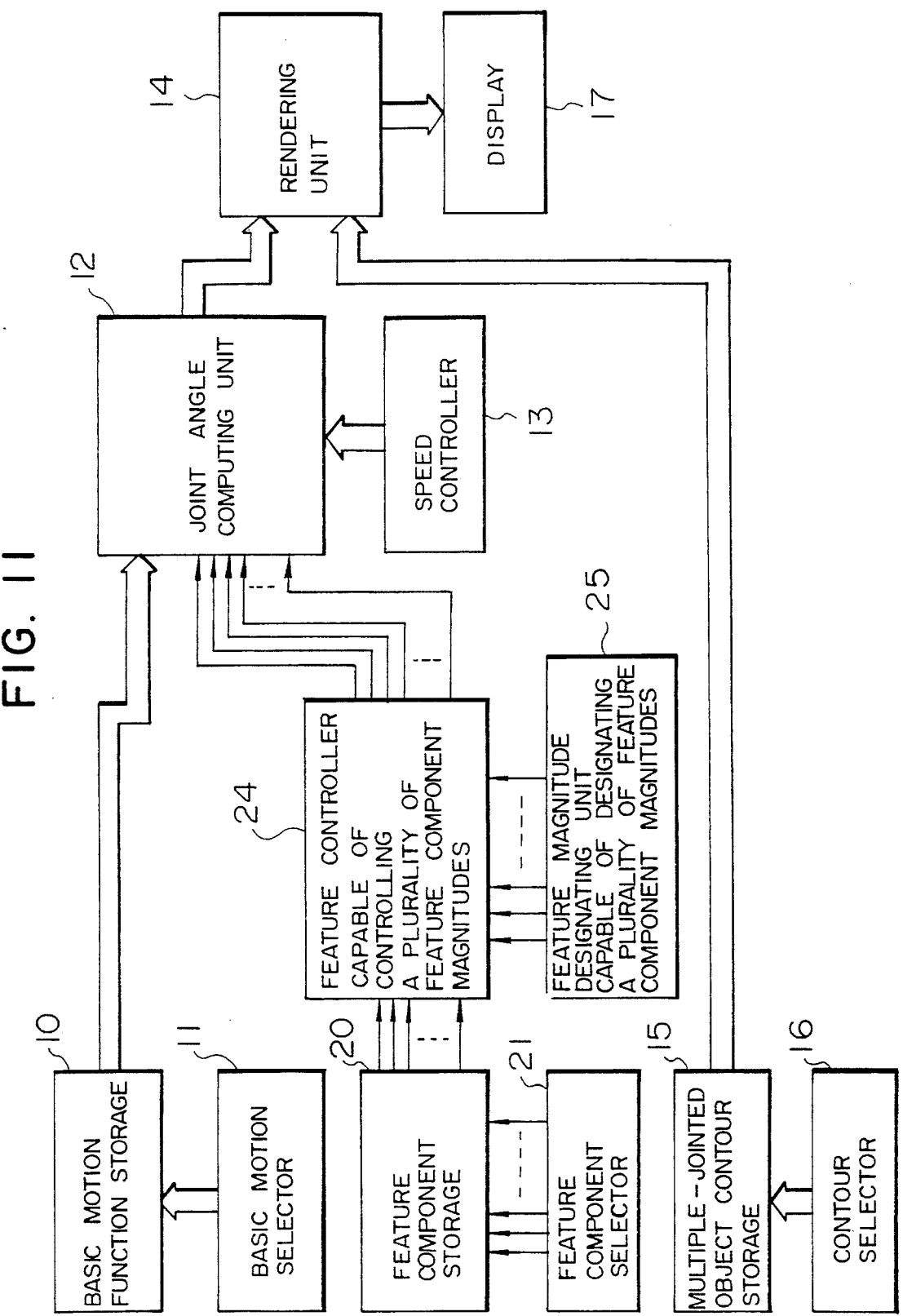
FIG. 11 is a schematic diagram showing the configuration of a computer graphic apparatus in a fourth embodiment according to the present invention.

FIG. 11 shows the construction of a computer graphic apparatus in a fourth embodiment according to the present invention. As compared with the third embodiment in which only one kind of the feature of an action can be specified, the user can specify a plurality of features of an action in this embodiment. For this purpose, there are adopted a feature controller 24 and a feature magnitude designating unit 25. According to the fourth embodiment, a walking action may be accomplished with specifications of, for example, "joyfully" and "slowly". In this case, the computations are carried out with the following function (4). It is assumed in this function that the value of each parameter can be changed.

$$\Theta_m(t) = A_{mo} + \sum_i \alpha_{mi} \times d_{mi}) + \beta_m \times \sum_{n=1} \left[ \left( A_{mn} + \sum_i \alpha_{mi} \times a_{mi} \right) \times \qquad (4)$$

$$\sin\left\{ n \times t + \left( \psi_{mn} + \sum_i \alpha_{mi} \times \psi_{mni} \right) - \phi_{mn \times n} \right\} \right]$$

Since a plurality of characteristic components can be specified for an action, the objective action is conducted with a wider variety of emotional expressions.

As above, according to the fourth embodiment, the values of parameters of the function (4) can be altered in a successive manner; moreover, the expressions of the action conducted by an image of a person can be changed depending on the modified parameters in a realtime manner and through an interactive operation.

In the description of the fourth embodiment, the apparatus controls the functions modified for a motion of a computer graphic image. However, when a computation result attained from the joint angle computation unit 12 is employed as an operational instruction to control an operation of a multiple-articulated robot having a real size of the pertinent object, there can be implemented a robot controller operating independently of the size of the robot. Furthermore, since the actions to be sent as instructions to the robot can be qualified with the features, the robot can perform various kinds of actions with desired functions.

According to the embodiments 1 to 4 described above, since the contour of a multiple-jointed object and/or a robot at an intermediate point of a motion can be computed by use of a function independent of the size thereof, multiple-hinged objects and/or robots of various sizes can be actuated in a realtime manner. In addition, the action can be qualified by a feature of the action; moreover, the degree of the feature can be varied. Consequently, the motion can be accomplished with quite a large number of functions.

Although a human model has been described in conjunction with the embodiments 1 to 4 above, an effect similar to those of the embodiments can naturally be developed also for an object such as a measuring worm.

Figure 12:
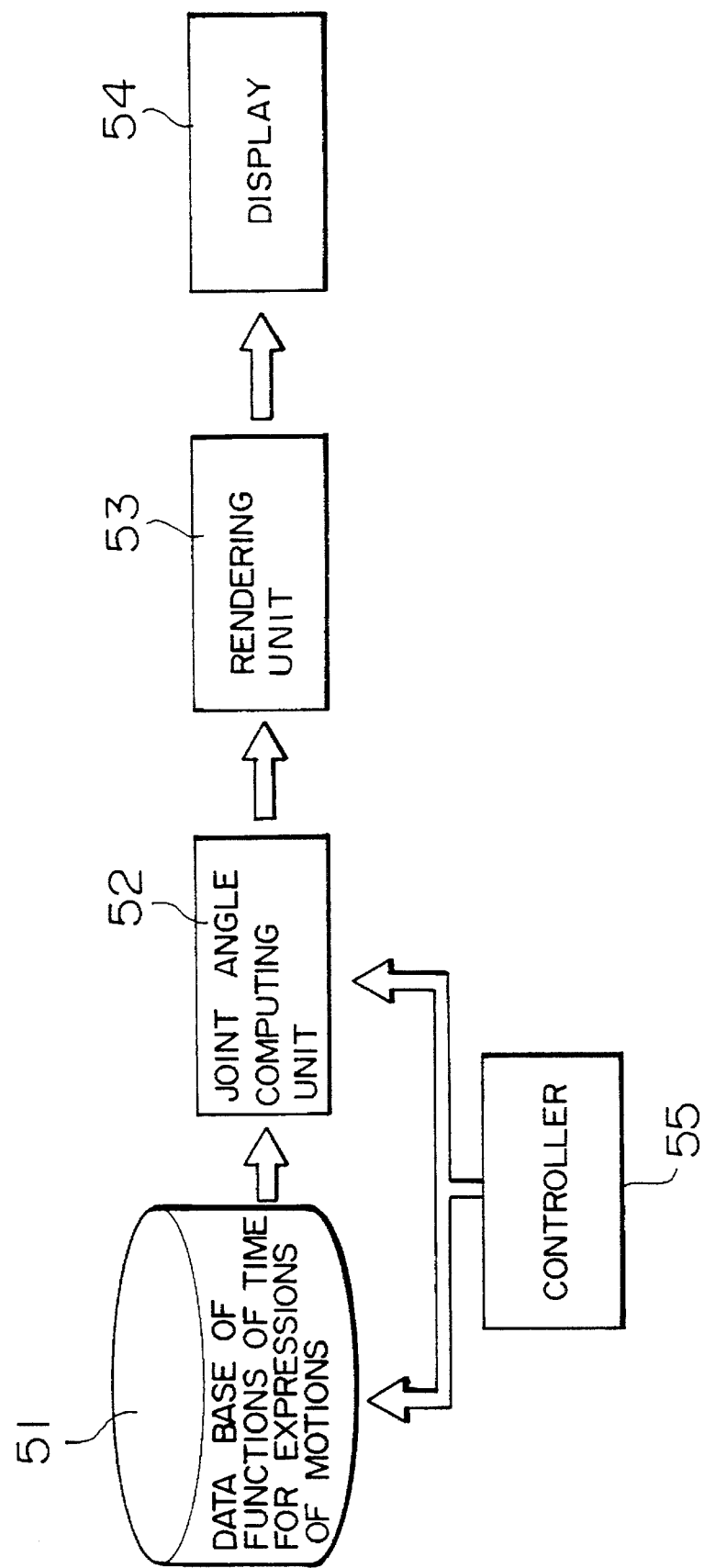
FIG. 12 is a diagram showing the constitution of a control system of a multiple-jointed object in a fifth embodiment according to the present invention.

Referring next to FIG. 12, a description will be given of a computer graphic apparatus in a fifth embodiment according to the present invention. The constitution of FIG. 12 includes a data base 51 for storing therein functions of time for expressions of motions, a joint angle computing unit 52, a rendering unit 53, a display 54, and a controller 55. Let us assume here that in order to actuate a person image, a bending angle of each joint is varied with respect to time based on the following function.

$$\theta_m(t) = A_0 + \sum_{n=1}^{1} \{A_n \times \sin(nt + \psi_n)\} \tag{5}$$

This function expressing a joint bending angle with respect to time is obtained from a Fourier series expansion of a period function in which a letter m denotes a joint number. To represent a motion of the entire human body, there are required a function $\theta_m(t)$ for each of the joints. In the function, i stands for the maximum degree of the series expansion, $A_0$ designates a mean value of the bending angle, $A_n$ indicates a spectral intensity of an n-th order higher harmonic, and $\Psi_n$ designates a phase of the n-th order higher harmonic.

The data base 51 is loaded, for each kind of motion, with coefficients $A_0, A_1, \ldots, A_i, \Psi_1, \Psi_2, \ldots,$ and $\Psi_i$ for the function $\theta_m(t)$ of time associated with each joint of a person image. The joint angle computing unit 52 computes, based on the coefficients $A_0, A_1, \ldots, A_i, \Psi_1, \Psi_2, \ldots,$ and $\Psi_1$ of an objective motion, a bending angle of each human articulation at a point of time. The rendering unit 53 receives the computated results from the joint angle computing unit 52 to further compute based thereon a position and a posture of the person image in a three-dimensional manner so as to project the attained image data onto a two-dimensional area. The display 54 presents the resultant picture on its screen. The controller 55 selects functions of time from the data base 51, modifies the coefficients $A_0, A_1, \ldots, A_i, \Psi_1, \Psi_2, \ldots,$ and $\Psi_i$ of each selected function of time $\theta_m(t)$, and controls a variable t of time.

As a result, according to the fifth embodiment, a desired action can be selected, expressions of operations other than those stored in the data base 51 can be developed, and the action speed can be controlled depending on the variable t of time.

Figure 13:
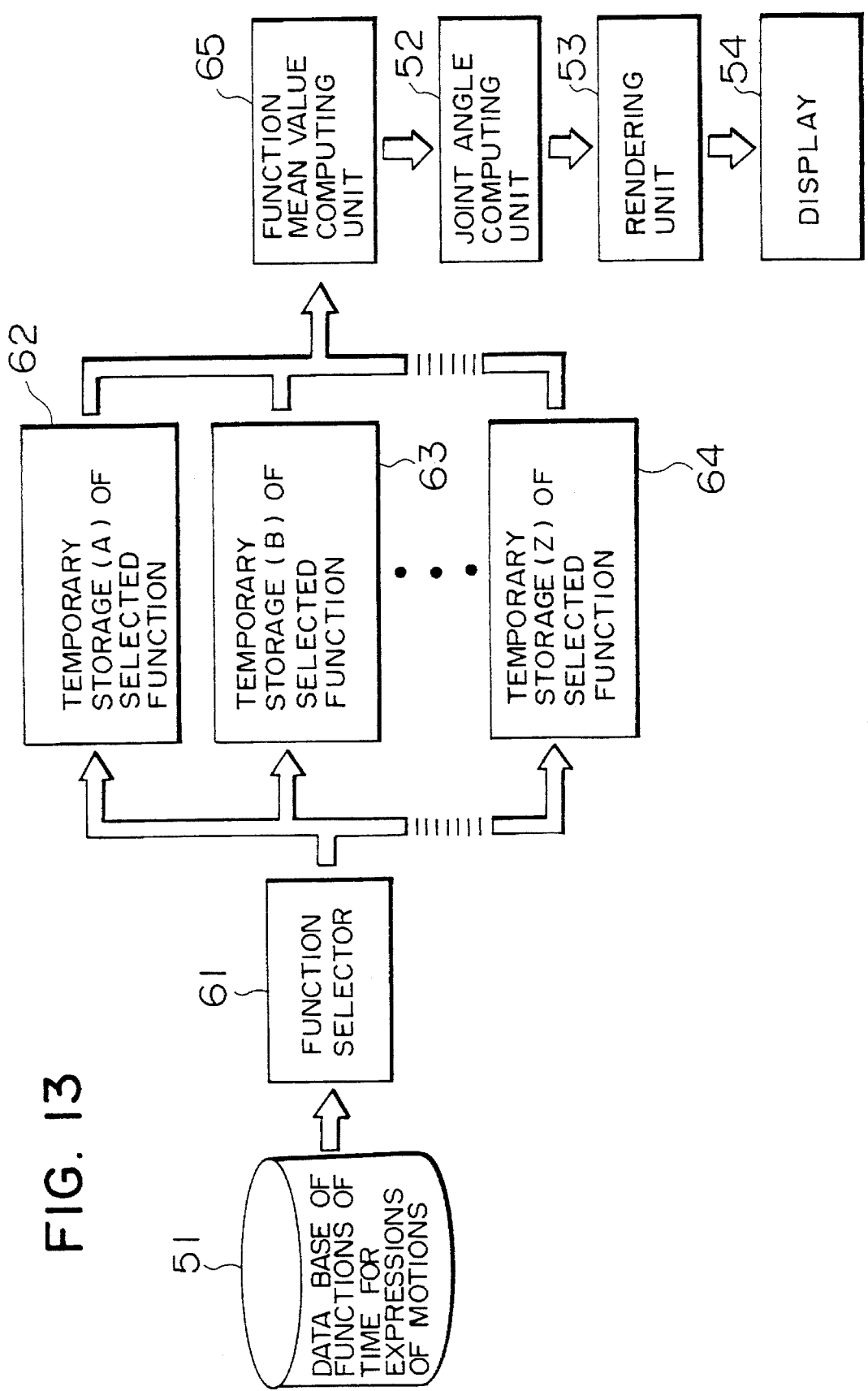
FIG. 13 is a diagram showing the configuration of a control system of a multiple-jointed object in a sixth embodiment according to the present invention.

FIG. 13 shows the configuration of a computer graphic apparatus in a sixth embodiment according to the present invention. This system includes a data base 51 for storing therein functions of time for expressions of motions, a time function selector 61, storages 62, 63, and 64 for temporarily storing therein the selected functions, a mean value computing unit 65 for computing a mean value of functions of time, a joint angle computing unit 52, a rendering unit 53, and a display 54. After the function selector 61 chooses motions, the components of the functions of time representing the motions are stored in the temporary storage 62 thereof for each motion. Let us assume here that the number of the selected motions is j and the amplitudes and phase differences of the respective functions are as follows. Namely, $A_{10}, A_{11}, \ldots A_{1i}, \Psi_{11}, \Psi_{12}, \ldots, \Psi_{1i}$ for motion 1; $A_{20}, A_{21}, \ldots A_{2i}, \Psi_{21}, \Psi_{22}, \ldots, \Psi_{2i}$ for motion 2; and $A_{j0}, A_{j1}, \ldots A_{ji}, \Psi_{j1}, \Psi_{j2}, \ldots, \Psi_{j1}$ for motion j. The amplitudes and phases of the selected functions of time are processed by the function mean value computing unit 65, which achieves computations thereon to attain a mean value of each frequency component as follows.

$$A_n^* = \frac{\sum_{k=0}^{j} A_{kn}}{j} \tag{6}$$

$$\psi_n^* = \frac{\sum_{k=1}^{j} \psi_{kn}}{j} \tag{7}$$

Using the following function (8), the joint angle computing unit 52 computes, for each angle of the person image, a bending angle at a point of time based on the amplitude and the phase resultant from the functions (6) and (7), respectively.

$$\theta_m^*(t) = A_0^* + \sum_{n=1}^{i} \{A_n^* \times \sin(nt + \psi_n^*)\} \tag{8}$$

The rendering unit 53 processes the data resultant from the computing unit 52 to obtain information in a three-dimensional representation of a position and a posture of the person image so as to project the information onto a two-dimensional space. Based on the projected result, the display 54 presents a person image on a screen thereof.

In short, the system is capable of creating a motion other than those loaded in the function data base 51 as follows. Namely, the data base 51 is accessed to obtain therefrom a plurality of functions of time for expressions of motions such that the functions are subjected to the computations above, thereby producing a desired motion.

Figure 14:
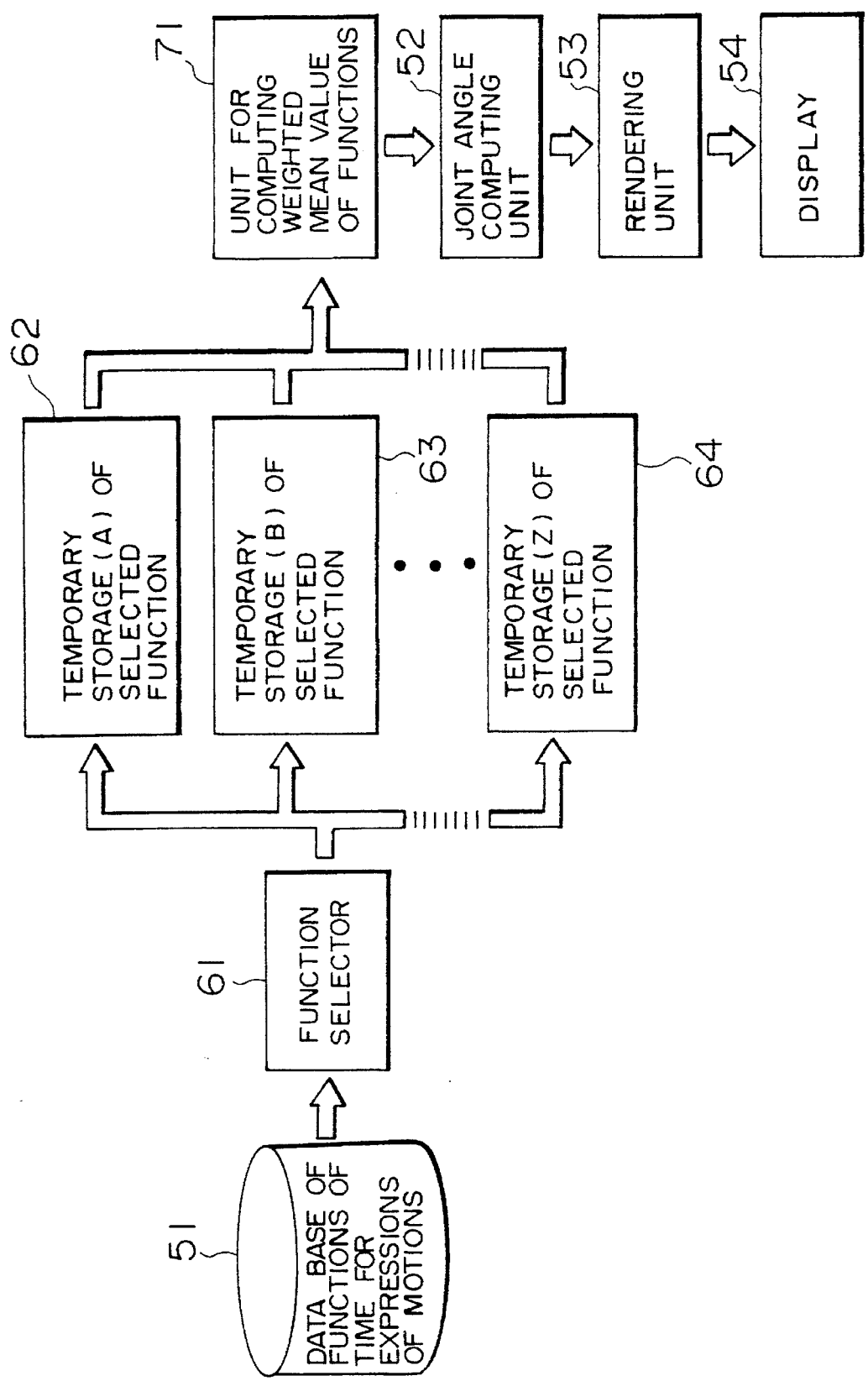
FIG. 14 is a diagram showing the constitution of a control system of a multiple-jointed object in a seventh embodiment according to the present invention.

FIG. 14 shows the constitution of a computer graphic apparatus in a seventh embodiment according to the present invention. This configuration includes a data base 51 for storing therein functions of time for expressions of motions, a function selector 61, temporary storages 62 to 64 for temporarily storing the respective components of the selected functions of time, a unit 71 for computing a weighted mean value of the functions of time, a joint angle computing unit 52, a rendering unit 53, a display 54, and a controller 55. For the functions of time representing the motions thus selected by the function selector 61, the components thereof are stored in the temporary storage 62 associated therewith for each motion. It is assumed here that the number of the selected motions is j and the amplitudes and phase differences of the respective functions are as follows. That is, $A_{10}, A_{11}, \ldots A_{1i}, \Psi_{11}, \Psi_{12}, \ldots, \Psi_{1i}$ for motion 1; $A_{20}, A_{21}, \ldots A_{2i}, \Psi_{21}, \Psi_{22}, \ldots, \Psi_{2i}$ for motion 2; and $A_{j0}, A_{j1}, \ldots A_{ji}, \Psi_{j1}, \Psi_{j2}, \ldots, \Psi_{ji}$ for motion j. The amplitudes and phases of the selected functions of time are delivered to the function mean value computing unit 65, which achieves based thereon computations to attain a mean value of each frequency component as follows.

$$A_n^{**} = \frac{\sum_{k=0}^{j} (A_{kn} \times \alpha_k)}{j} \qquad (9)$$

$$\psi_n^{**} = \frac{\sum_{k=1}^{j} (\psi_{kn} \times \alpha_k)}{j} \qquad (10)$$

where, $\alpha_k$ denotes a weight of a function of time.

According to the following function (11), the joint angle computing unit 52 computes for each angle of the person a bending angle at a point of time by use of the amplitude and the phase attained from the functions (9) and (10), respectively.

$$\theta_m^{}(t) = A_0^{} + \sum_{n=1}^{i} \{A_n^{} \times \sin(nt + \psi_n^{})\} \qquad (11)$$

Thereafter, the rendering unit 53 processes the data resultant from the computing unit 52 to attain information of a position and a posture of the person image in a three-dimensional manner so as to project the information onto a two-dimensional area. Based on the projected result, the display 54 presents a human image on a screen thereof.

As a result of the processing above, the apparatus is capable of generating a motion other than those loaded in the function data base 51 as follows. The data base 51 is accessed to obtain therefrom a plurality of functions of time for expressions of motions such that based on the functions, the computations above are executed with the weights for the selected motions taken into consideration, thereby producing a desired motion.

Figure 15:
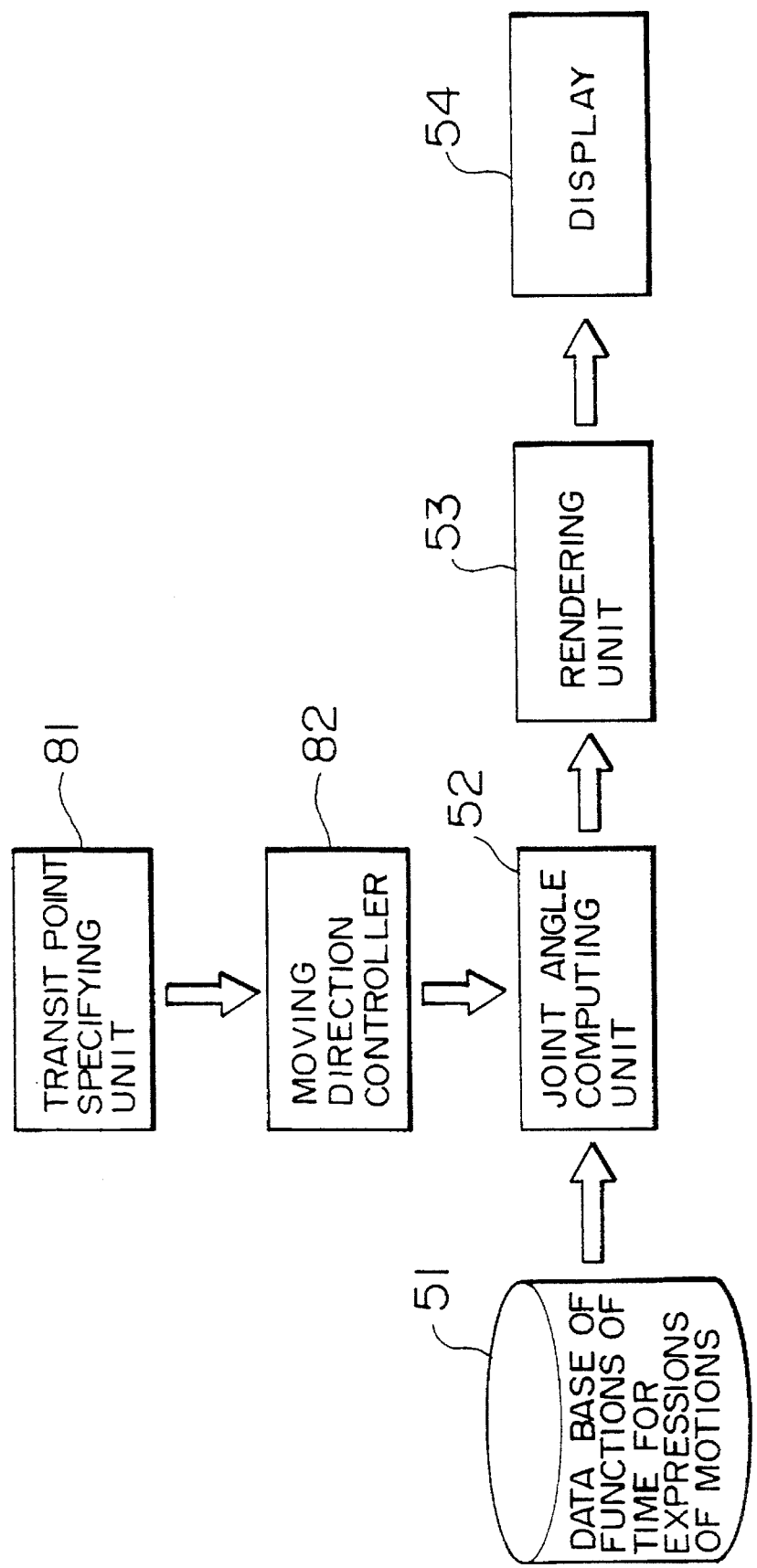
FIG. 15 is a diagram showing the configuration of a control system of a multiple-jointed object in a eighth embodiment according to the present invention.
Figure 16:
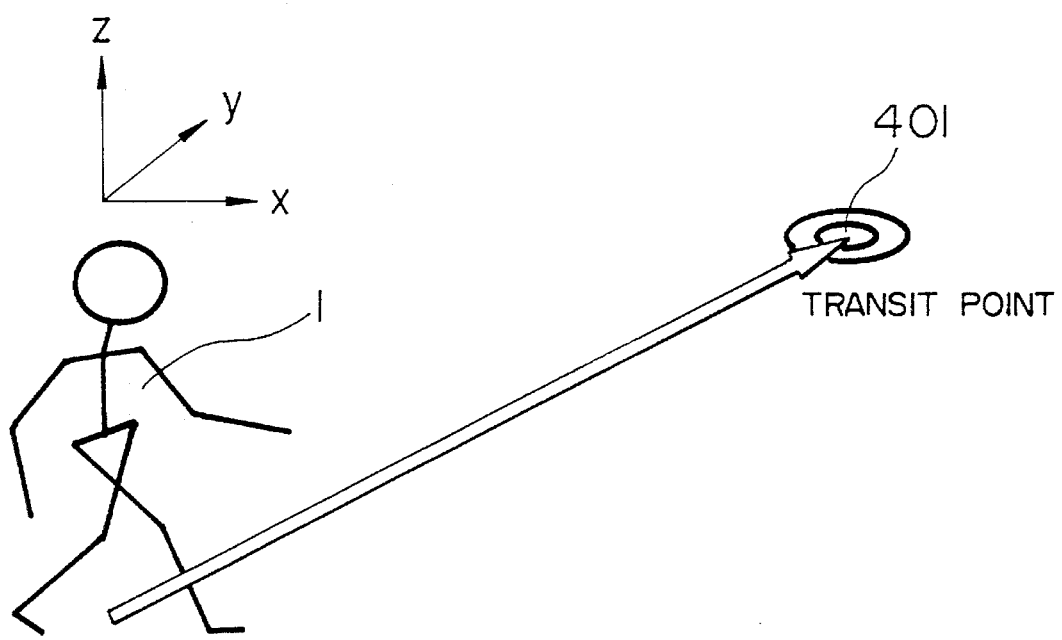
FIG. 16 is a diagram illustratively showing a relationship between a transit point and a moving direction.

FIG. 15 shows the configuration of a computer graphic apparatus in an eighth embodiment according to the present invention. This system includes a data base 51 for storing therein functions of time for expressions of motions, a transit point specifying unit 81, a moving direction controller 82, a joint angle computing unit 52, a rendering unit 53, and a display 54. FIG. 16 shows a relationship between a transit point and a moving direction of a multiple-jointed object 1. It is assumed in this diagram that a plane defined by the x and y axes is a ground surface where a human as the multiple-articulated object 1 stands. In this graphic image, the person stands on the ground in a vertical direction i.e. along the z-axis. First, the transit point specifying unit 81 designates a transit point 401 of the person in FIG. 16. The moving direction controller 82 then rotates the object 1 about the y axis so that the front side thereof faces to the transit point 401. For the displacement of the object 1, the user selects expressions of the motion during the movement from the data base 51. Thereafter, the joint angle computing unit 52 is operated to actuate joints of the multiple-jointed object 1. Since the object 1 is facing to the passage point 401 as a result of the operation conducted by the moving direction controller 82, the object 1 is moved or displaced toward the transit point 401. The rendering unit 53 processes the data from the computing unit 52 to generate information of a position and a posture of the object 1 in a three-dimensional manner so as to project the information onto a two-dimensional space. Depending on the projected result, the display 54 presents a picture of the multiple-articulated object 1 on a screen thereof.

With the provision above, the system can control the moving direction of a human whose motions are represented by the functions of time.

Figure 17:
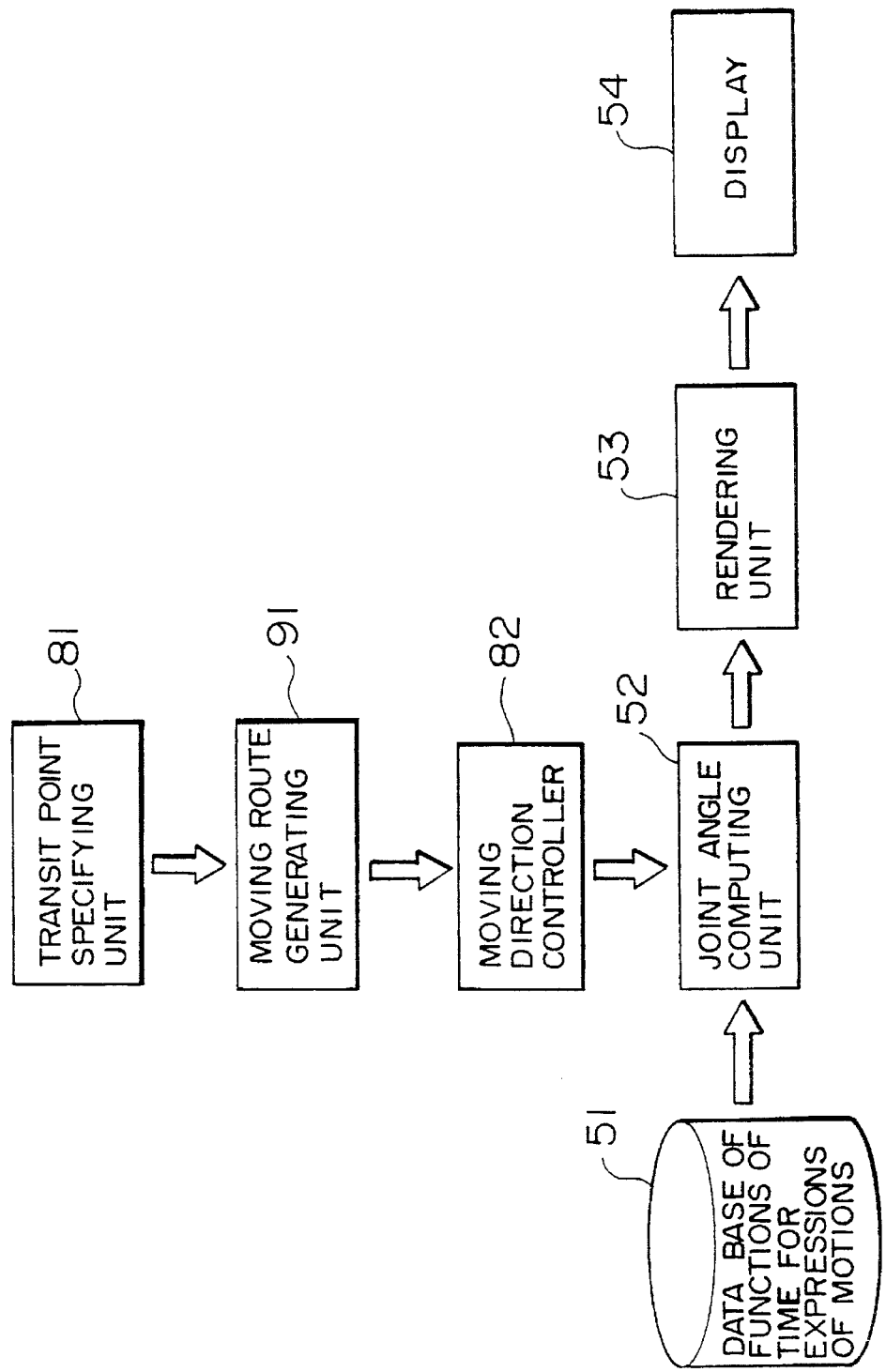
FIG. 17 is a diagram showing the configuration of a control system of a multiple-jointed object in a ninth embodiment according to the present invention.
Figure 18:
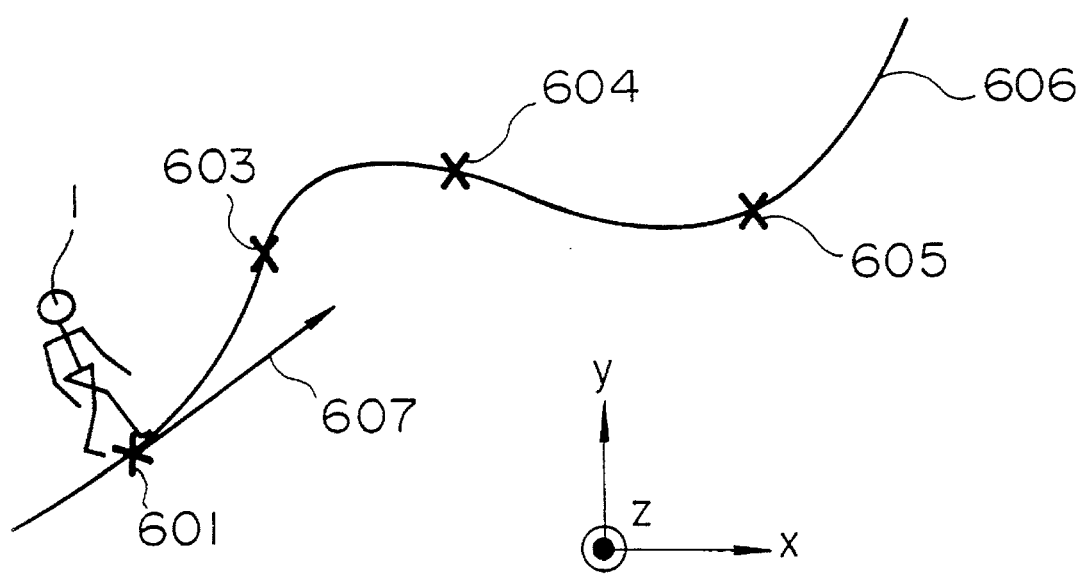
FIG. 18 is a diagram showing relationships between transit points and a moving direction.

FIG. 17 shows the constitution of a computer graphic apparatus in a ninth embodiment according to the present invention. This system comprises a data base 51 for storing therein functions of time for expressions of motions, a transit point specifying unit 81, a moving direction controller 82, a joint angle computing unit 52, a rendering unit 53, and a display 54. FIG. 18 shows an example of a display screen presenting a relationship between a transit point and a moving direction of a multiple-jointed object 1. Let us assume in this diagram that a plane defined by the x and y axes is a ground surface where the multiple-articulated object 1, namely, the person stands. In this graphic image, the object 1 takes a standing posture on the ground in a vertical direction i.e. along the z-axis of the coordinate system. First, the transit point specifying unit 81 specifies transit points 601 to 605 of the object 1 on the plane. The specified transit points are connected to each other with a curve such as a free curve so as to create a moving route designated by a position 601 and a curve 606. The moving direction controller 82 rotates the object 1 about the y axis so that the front side thereof is oriented to a direction of a tangent of the curve 606 at a position of the object 1 moving on the curve 606. For the displacement of the object 1, the user selects expressions of the motion during the movement from the data base 51. Based on the selected data, the joint angle computing unit 52 actuates joints of the multiple-jointed object 1. Since the object 1 is directed along the tangent direction at the current passage point on the curve 606 as a result of the operation conducted by the moving direction controller 82, the object 1 is displaced along the generated curve 606. The rendering unit 53 processes data received from the computing unit 52 to produce information of a position and a posture of the object 1 in a three-dimensional manner so as to project the information onto a two-dimensional space. Based on the projected result, the display 54 presents an image of the object 1 on a screen thereof.

Through the operation above, the apparatus can arbitrarily move an image of the human on the plane by controlling the functions of time representing expressions of motions of the human.

There may also utilize still another control method of controlling the motions of a multiple-hinged object as follows. Namely, the user supplies the system, from input means (not shown), with a position 601 denoting a starting point of a movement of the multiple-articulated object 1, a tangent direction (vector information) 607 designating at least one of a speed of the object 1 at the starting point of the movement and a direction of the movement of the object 1 thereat, a position 603 indicating an ending point of the movement of the object 1, and vector information (not shown) denoting at least one of a speed of the object 1 at the ending point of the movement and a direction of the movement of the object 1 thereat. The input information items are memorized and displayed on the screen. Based on these data items, the system accomplishes computations to obtain information denoting a route of the movement of the object 1 from the initial position 601 to the terminal position 603. Thereafter, the moving passage portions are similarly computed between the positions 603 and 604, 604 to 605, and 605 to 606 in a sequential manner.

Moreover, according to a still another motion control method, the system is supplied with a position 601 related to a position of the multiple-jointed object 1 in motion and a tangent direction 607 indicating a direction of the movement of the object 1. The input information items are then stored in a memory and are displayed on a screen. Depending on these data items, the apparatus conducts computations to attain information designating a path of the movement of the multiple-articulated object 1. In this connection, the information item indicating the direction of the moving object 1 is either one of information denoting a direction thereof with respect to a desired point in the pertinent coordinate system or to another multiple-hinged object, information designating a direction thereof with respect to a desired line in the pertinent coordinate system, information indicating a direction thereof with respect to a desired plane in the pertinent coordinate system, and information denoting a direction thereof with respect to the current direction of the movement of the object 1.

Figure 19:
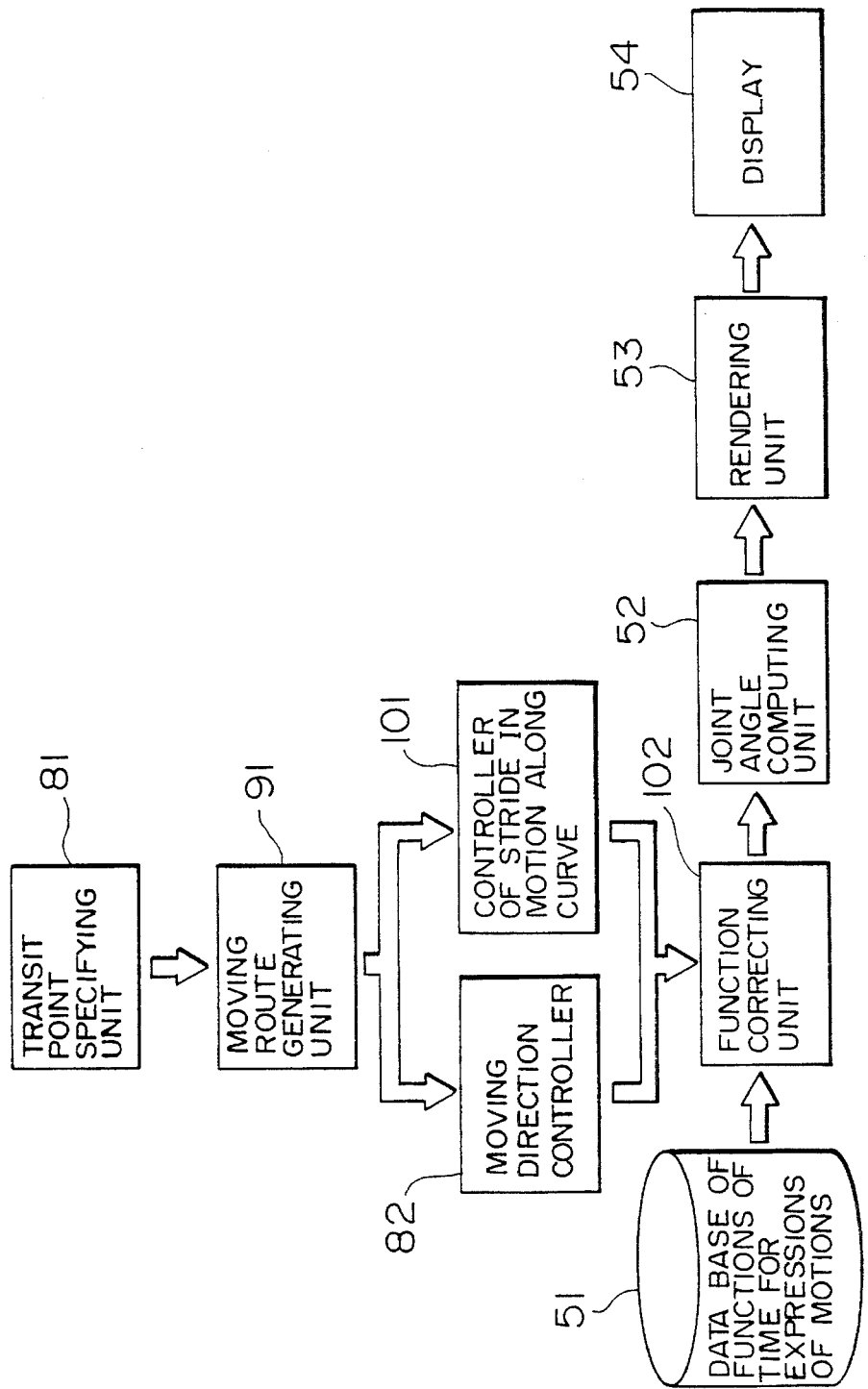
FIG. 19 is a diagram showing the configuration of a control system of a multiple-jointed object in a tenth embodiment according to the present invention.
Figure 20:
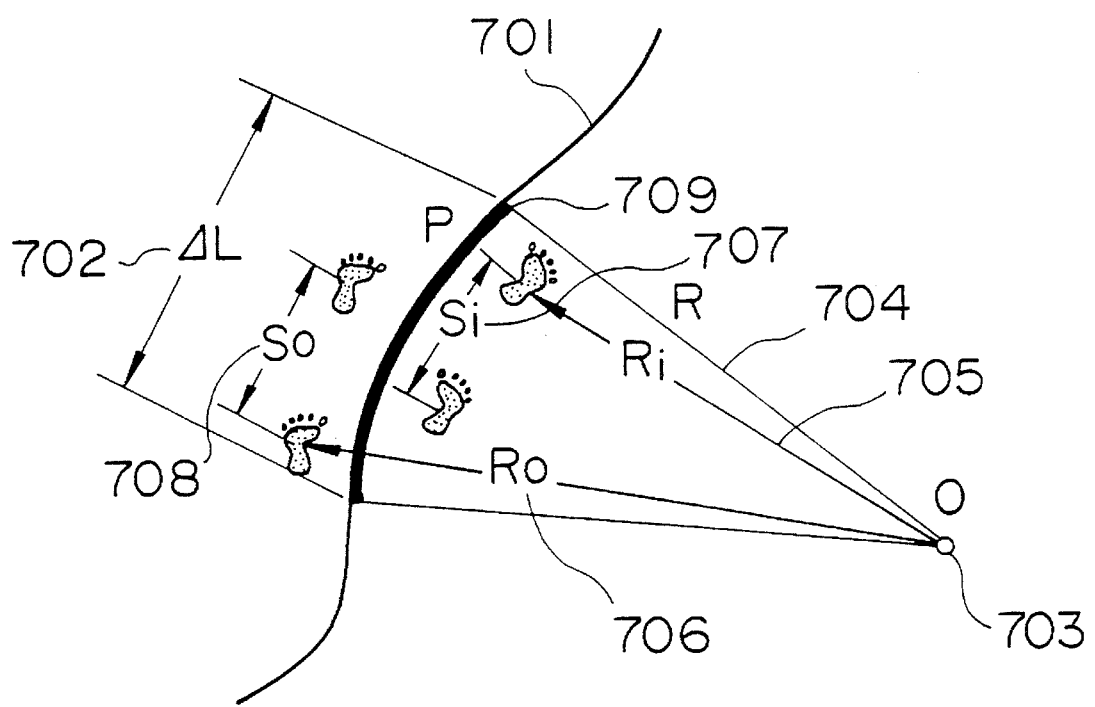
FIG. 20 is a diagram showing relationship of strides in a movement along a curve.

FIG. 19 shows the construction of a computer graphic apparatus in a tenth embodiment according to the present invention. This system comprises a data base 51 for storing therein functions of time for expressions of motions, a transit point specifying unit 81, a moving route generator 91, a moving direction controller 82, a controller 101 for adjusting a stride width in a movement along a curve, a function correcting unit 102, a joint angle computing unit 52, a rendering unit 53, and a display 54. FIG. 20 shows a relationship between a stride width of a foot of the object 1 on a center side of the radius of curvature and a stride width of a foot on a side opposite thereto of the radius of curvature when the object 1 as the multiple-jointed object moves along a curve 701. Let us assume here that a small interval ΔL or 702 at a point P or 709 on the curve 701 where the object 1 is moving has a center of curvature 0 or 703 and a radius of curvature R or 704, the distance between the foot on the center side of the curvature and the center of curvature 0 is denoted as Ri or by a reference numeral 705, and the distance between the foot on the side opposite to the center side of the curvature and the center of curvature 0 is denoted as Ro or by a reference numeral 706. The passage route or curve 701 of the object 1 is then produced by the transit point specifying unit 81 and the moving route generator 91 of FIG. 19. The moving direction controller 82 adjusts the posture of the object 1 such that the front side thereof is oriented along a tangent direction at the point P. The stride controller 101 produces, based on the following functions (12) and (13), a stride length $S_i$ or 707 on the center side of the curvature and a stride length $S_o$ or 708 on a side opposite thereof when the multiple-articulated object 1 moves along the curve. In this connection, a letter S denotes a stride length of the object 1 moving along a straight line.

$$S_i = \frac{R_i}{R} \times S \qquad (12)$$

$$S_o = \frac{R_o}{R} \times S \qquad (13)$$

For a movement of the object 1, the user accesses the data base 51 to acquire therefrom functions for desired expressions of motions to be achieved during the movement of the object 1. Resultantly, the joint angle computing unit 52 actuates joints of the object 1. The difference between the strides on the inner and outer sides is supervised by the stride controller 101 and then the function correcting unit 102 corrects functions of time representing the motions. Since the image of the object 1 is oriented along a tangent direction at the current point of the passage as a result of the operation achieved by the moving direction controller 82, the object 1 moves along the curved line 701 without causing any foot slippage on the ground. The rendering unit 53 computes, based on the results of the computation of the joint angle computing unit 52, information of a position and a posture of the object 1 in the three-dimensional manner so as to project the information onto a two-dimensional area. The resultant information is then presented on the display 54.

With the provisions above, the apparatus can move the human image whose motions are represented by functions of time freely on a plane without causing any foot slippage on the ground.

Figure 21:
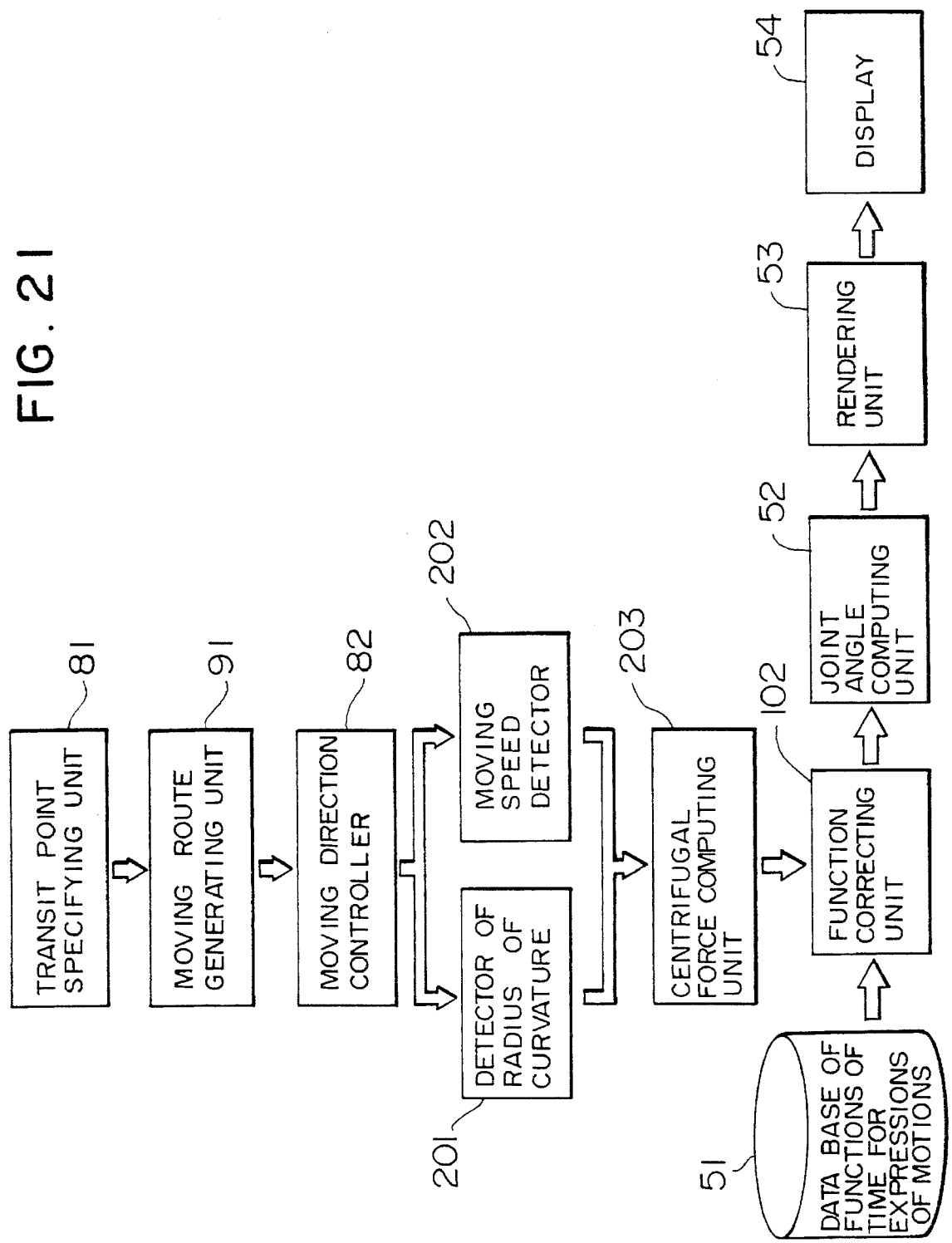
FIG. 21 is a diagram showing the configuration of a control system of a multiple-jointed object in an 11th embodiment according to the present invention.
Figure 22:
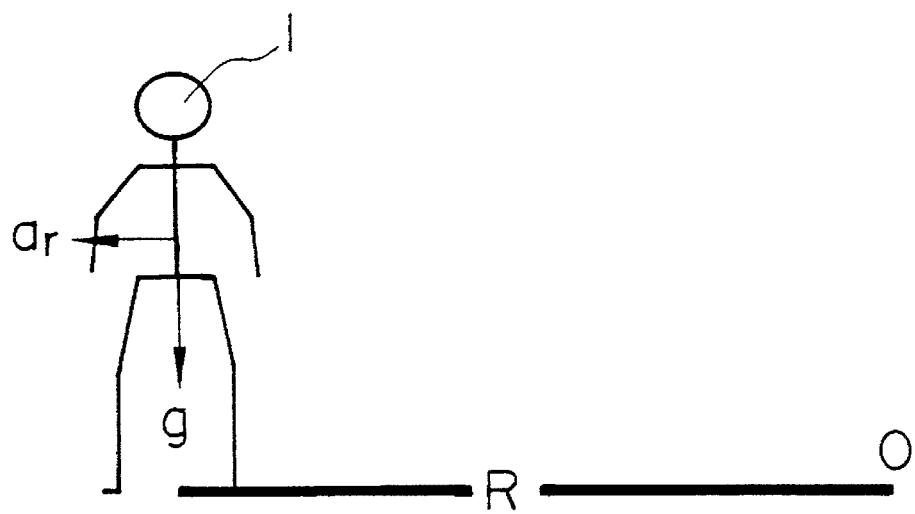
FIG. 22 is a diagram schematically showing components of force applied onto a human in a circular motion.
Figure 23:
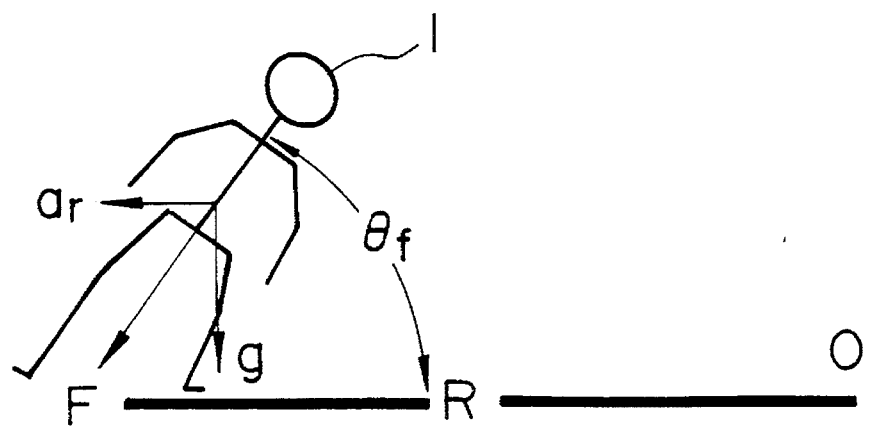
FIG. 23 is a diagram showing a correction of a human posture.

FIG. 21 shows the configuration of a computer graphic apparatus in an 11th emodiment according to the present invention. This system comprises a data base 51 for storing therein functions of time designating expressions of motions, a transit point specifying unit 81, a moving route generator 91, a moving direction controller 82, a unit 201 for detecting a radius of curvature, a moving speed detector 202, a centrifugal force computing unit 203, a function correcting unit 102, a joint angle computing unit 52, a rendering unit 53, and a display 54. The moving path of a multiple-jointed object e.g. a human is created by the transit point specifying unit 81 and the moving path generator 91. The moving direction controller 82 adjusts a posture of the person image such that the front side thereof is oriented along a tangent direction of a curve of the moving path. FIG. 22 shows a relationship between forces applied to a person image when the state of the person image is changed from an upright posture with respect to the ground surface to a circular motion. This diagram includes a multiple-hinged object 1, a center of curvature 0, a radius of curvature R, a gravity force g, a centrifugal force ar, and a resultant force F of the centrifugal force ar and the gravity force g. In this state, the object 1 falls down outwardly due to the centrifugal force ar. More concretely, for the observer, the object 1 seems to fall down toward the outside. In this situation, the posture of the object 1 is controlled as follows. In the system, a radius of curvature of the curve where the object 1 is just passing is sensed by the detector 201 and the current moving speed is detected by the moving speed detector 202. Using the radius of curvature and the moving speed, the centrifugal force computing unit 203 achieves computations to attain a centrifugal force ar applied to the object 1. Thereafter, in order arrange the person posture to be parallel to the resultant force F of the centrifugal force ar and the gravity g, the function correcting unit 102 corrects the functions of time representing expressions of motions to incline the posture of the object 1 by an angle $\theta_f$. Resultantly, an equilibrium state is established between the centrifugal force ar and the gravity force g applied to the multiple-articulated object 1, which hence does not fall down onto the ground. Actions of the related joints are then generated by the joint angle computing unit 52. The rendering unit 53 computes, depending on the results of the computation of the joint angle computing unit 52, information of a position and a posture of the object 1 in the three-dimensional manner so as to project the information onto a two-dimensional area. The display 54 then presents the obtained information on its screen.

In short, when moving along a curved line an image of a person whose motions are represented by functions of time, the apparatus takes the influence on the centrifugal force into consideration. Consequently, there can be prevented an unnatural action in which, for example, the person image seems to fall down onto the ground.

Figure 24:
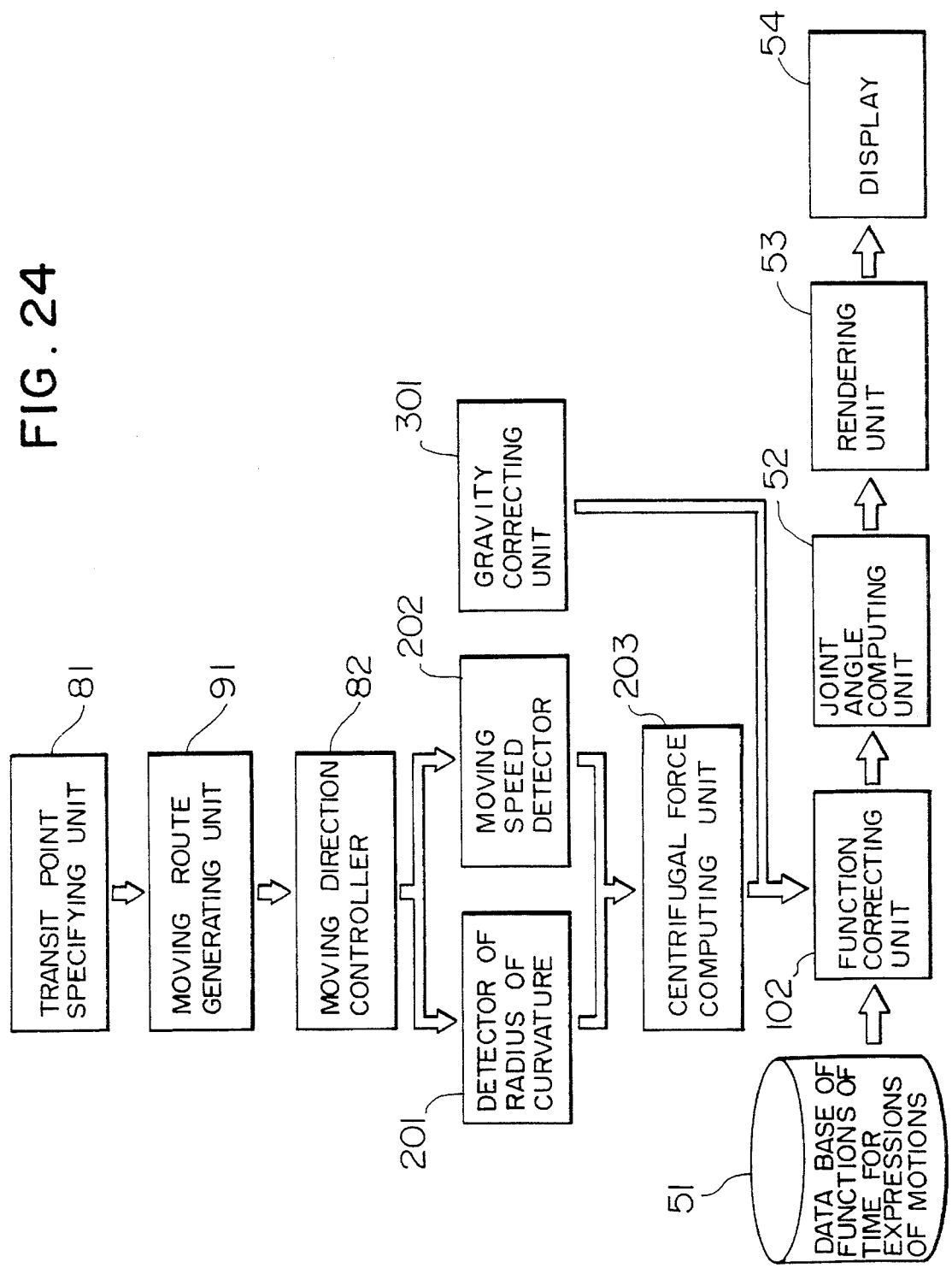
FIG. 24 is a diagram showing the configuration of a control system of a multiple-jointed object in a 12th embodiment according to the present invention.

FIG. 24 shows the configuration of a computer graphic apparatus in a 12th embodiment according to the present invention. This system comprises a data base 51 for storing therein functions of time representing expressions of motions, a transit point specifying unit 81, a moving route generator 91, a moving direction controller 82, a unit 201 for detecting a radius of curvature, a moving speed detector 202, a gravity correcting unit 301, a centrifugal force computing unit 203, a function correcting unit 102, a joint angle computing unit 52, a rendering unit 53, and a display 54. The moving path of a human image is produced by the transit point specifying unit 81 and the moving route generator 91. The moving direction controller 82 arranges a posture of the person image such that the front side thereof is oriented along a tangent direction of a curve of the moving path. Thereafter, a radius of curvature of the curve where the object 1 is just moving is detected by the detector 201 and the current moving speed is sensed by the moving speed detector 202. Based on the radius of curvature and the moving speed, the centrifugal force computing unit 203 achieves computations to attain a centrifugal force ar applied to the person. In order to establish an equilibrium state between the centrifugal force ar and the gravity force g applied to the multiple-articulated object, the posture of the person image is-corrected by means of the function correcting unit 102. The gravity correcting unit 301 is disposed to correct the magnitude of information associated with the gravity force. When information of the gravity is varied, for example, when the gravity applied to the person image is reduced, the posture thereof is greatly inclined; conversely, when the gravity is increased, the person image becomes to be stable, thereby presenting actions of the person image in an arbitrary manner. Thereafter, motions of the related joints are then generated by the joint angle computing unit 52. The rendering unit 53 computes, based on the results obtained from the joint angle computing unit 52, information of a position and a posture of the person in the three-dimensional fashion so as to project the information onto a two-dimensional space. The display 54 presents the resultant information on its screen.

In short, when moving along a curve an image of a person whose motions are represented by functions of time, the apparatus can alter the magnitude of the gravity applied to the person image such that the change in the posture of the person image passing along the curved line is represented with an emphasized expression or a moderate expression.

Figure 25:
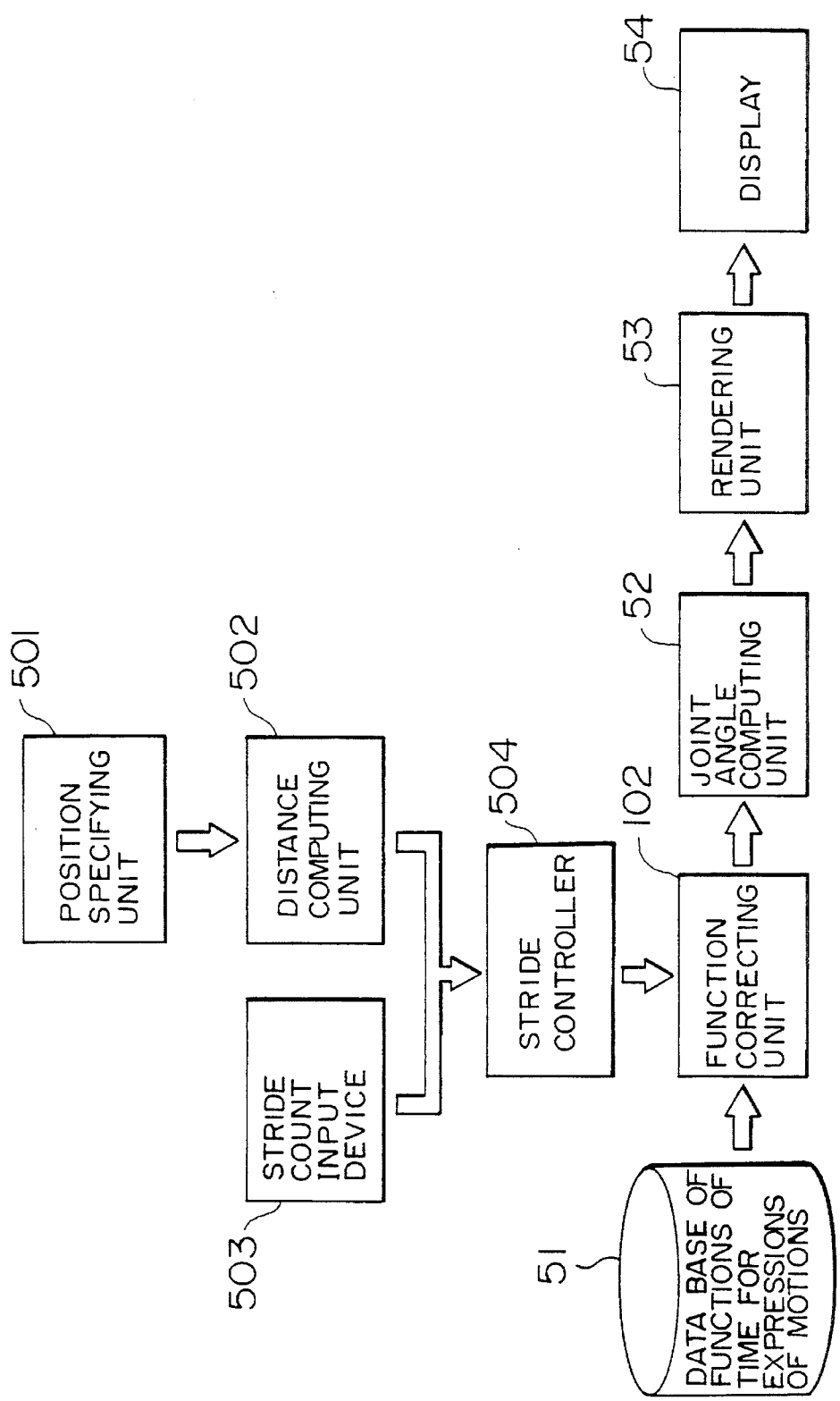
FIG. 25 is a diagram showing the configuration of a control system of a multiple-jointed object in a 13th embodiment according to the present invention.
Figure 26:
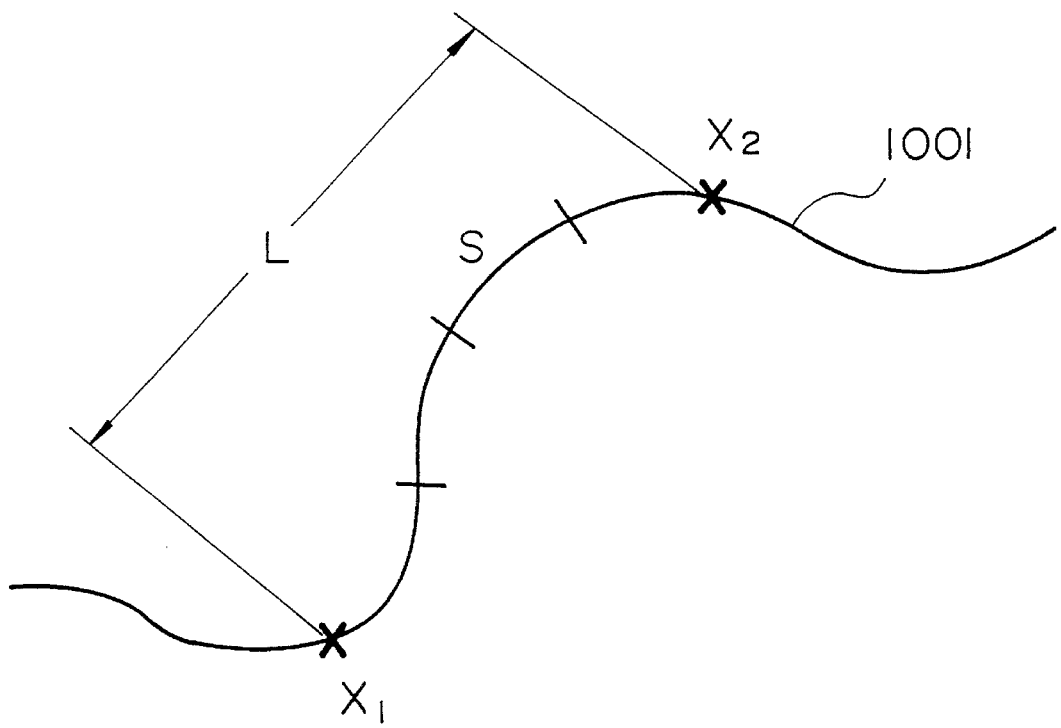
FIG. 26 is a diagram showing a relationship between a moving route and a stride length.

FIG. 25 shows the construction of a computer graphic apparatus in a 13th embodiment according to the present invention. This constitution includes a data base 51 for storing therein functions of time respresenting expressions of motions, a position specifying unit 501, a distance computing unit 502, a stride information input device 503, a stride controller 504, a function correcting unit 102, a joint angle computing unit 52, a rendering unit 53, and a display 54. FIG. 26 shows a display example of a relationship between a moving route and a stride of a person image. This diagram includes a curved line 1001 denoting a moving route of the person image. The position specifying unit 501 is employed to specify two points $x_1$ and $x_2$ on the curve 1001 and then the distance computing unit 502 determines a distance L of a portion $x_1x_2$ of the curve 1001. The stride input device 503 is disposed to input therefrom a stride count n required when the person image moves along the curve 1001 from the point $x_1$ to the point $x_2$. The stride controller 504 obtains the stride length S based on the following equation to send the value S to the function correcting unit 102.

$$S = L/n \quad (14)$$

The function correcting unit 102 corrects functions of time chosen from the data base 51 such that the stride width comes to be S. Using the corrected functions of time, the joint angle computing unit 52 generates actions of the respective joints. Based on the computation results, the rendering unit 53 attains information of a position and a posture of the person image in the three-dimension fashion. The information is then projected onto a two-dimensional space to be presented on a screen by the display 54.

In summary, the apparatus can move an image of a person along a preset interval on a curve with a predetermined number of strides.

Figure 27:
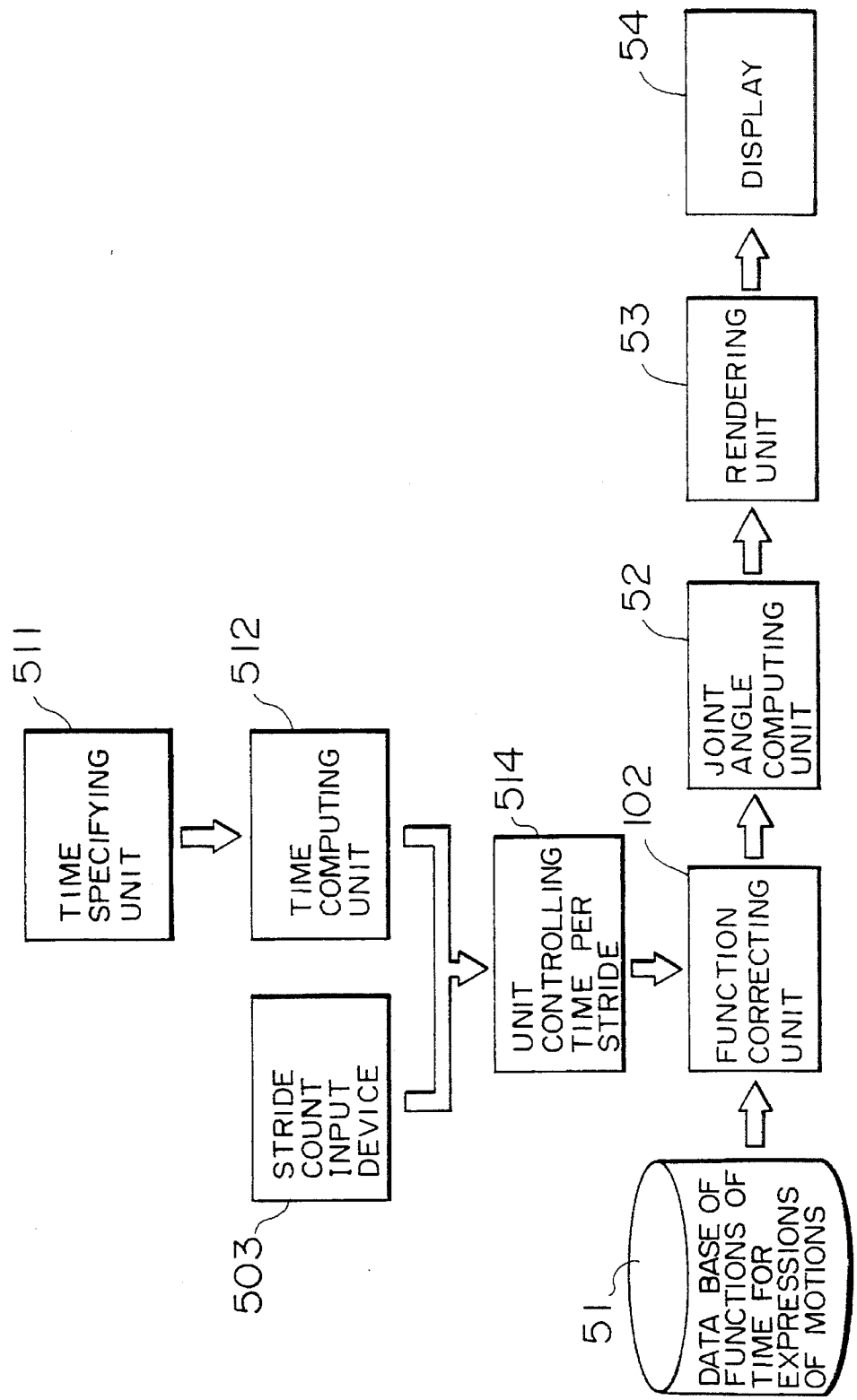
FIG. 27 is a diagram showing the constitution of a control system of a multiple-jointed object in a 14th embodiment according to the present invention.
Figure 28:
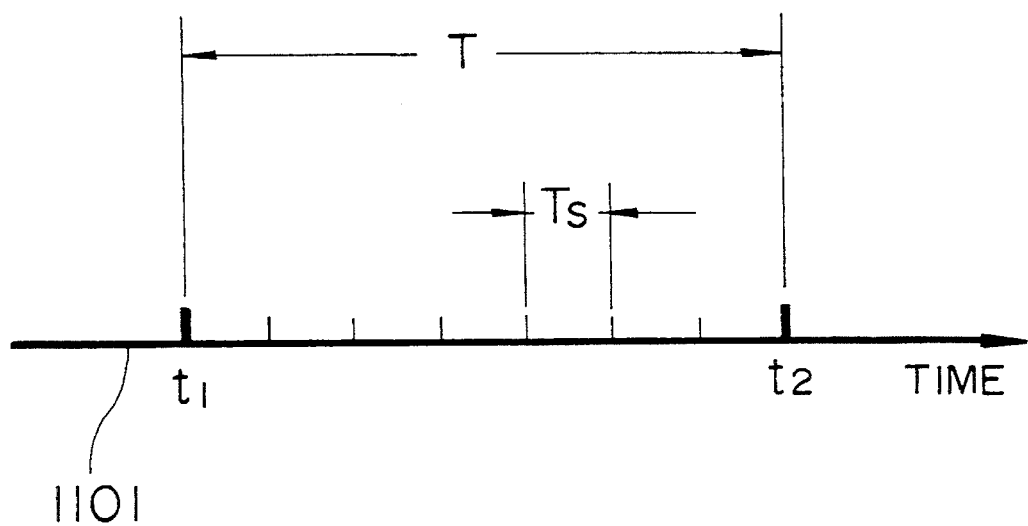
FIG. 28 is a diagram schematically showing relationships between periods of time and stride lengths.

FIG. 27 shows the configuration of a computer graphic apparatus in a 14th embodiment according to the present invention. This structure comprises a data base 51 for storing therein functions of time representing expressions of motions, a time specifying unit 511, a time computing unit 512, a stride count input device 503, a controller 514 for supervising a period of time required for a stride or step, a function correcting unit 102, a joint angle computing unit 52, a rendering unit 53, and a display 54. FIG. 28 shows a display example of the display 54 representing a relationship of a stride with respect to time (on a horizontal line or an abscissa) in a movement of the person image. The time specifying unit 511 is employed to specify two points of time $t_1$ and $t_2$ on the line 1101 designating elapsed time. The time computing unit 512 obtains an interval of time between the points of time $t_1$ and $t_2$ on the line 1101. The stride count input device 503 is disposed to input therefrom a stride count n required when the person moves during the interval of time from $t_1$ to $t_2$. The stride period controller 514 obtains the period of $T_S$ required for a step based on the following equation, thereby sending the attained value $T_S$ to the function correcting unit 102.

$$T_S = T/n \quad (15)$$

The function correcting unit 102 achieves a correction on functions of time chosen from the data base 51 such that the stride period becomes to be $T_S$. Depending on the corrected functions of time, the joint angle computing unit 52 generates motions of the respective joints. On receiving the computation results, the rendering unit 53 computes based thereon information of a position and a posture of the person in the three-dimensional fashion. The information is then projected onto a two-dimensional space so as to be presented on a screen by the display 54.

As a result, the system can move an image of a person along a line during a preset interval of time with a predetermined number of steps.

Figure 29:
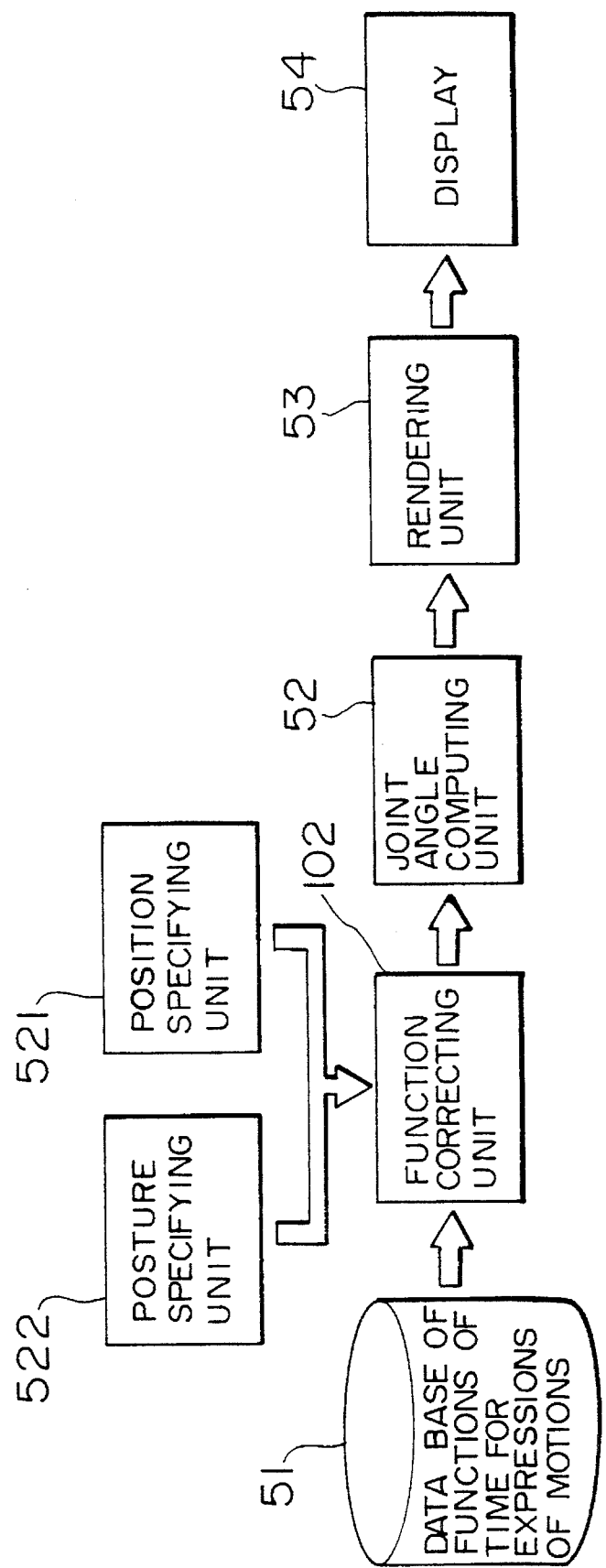
FIG. 29 is a diagram showing the configuration of a control system of a multiple-jointed object in a 15th embodiment according to the present invention.

FIG. 29 shows the constitution of a computer graphic apparatus in a 15th embodiment according to the present invention. This structure comprises a data base 51 for storing therein functions of time representing expressions of motions, a posture specifying unit 522, a position specifying unit 521, a function correcting unit 102, a joint angle computing unit 52, a rendering unit 53, and a display 54. The posture specifying unit 522 is adopted to designate a desired posture (in a stationary state) of a person image. The position specifying unit 521 is used to denote a position in the space where the human takes the posture. In this situation, the person image is moving with motions associated with functions of time selected from the data base 51. When the person image approaches the position specified by the position specifying unit 521, in order to develop the posture denoted by the posture specifying unit 522, the function correcting unit 102 corrects the functions of time. At the specified position, the person image takes the denoted posture. Depending on the corrected functions of time, the joint angle computing unit 52 creates motions of the respective joints. Based on the computation results, the rendering unit 53 obtains information of a position and a posture of the person image in the three-dimensional fashion. The information is then mapped onto a two-dimensional area to be presented on a screen by the display 54.

Resultantly, the constitution can present an image of a multiple-articulated object in a specified posture at a predetermined position while the object is acting based on functions of time.

Figure 30:
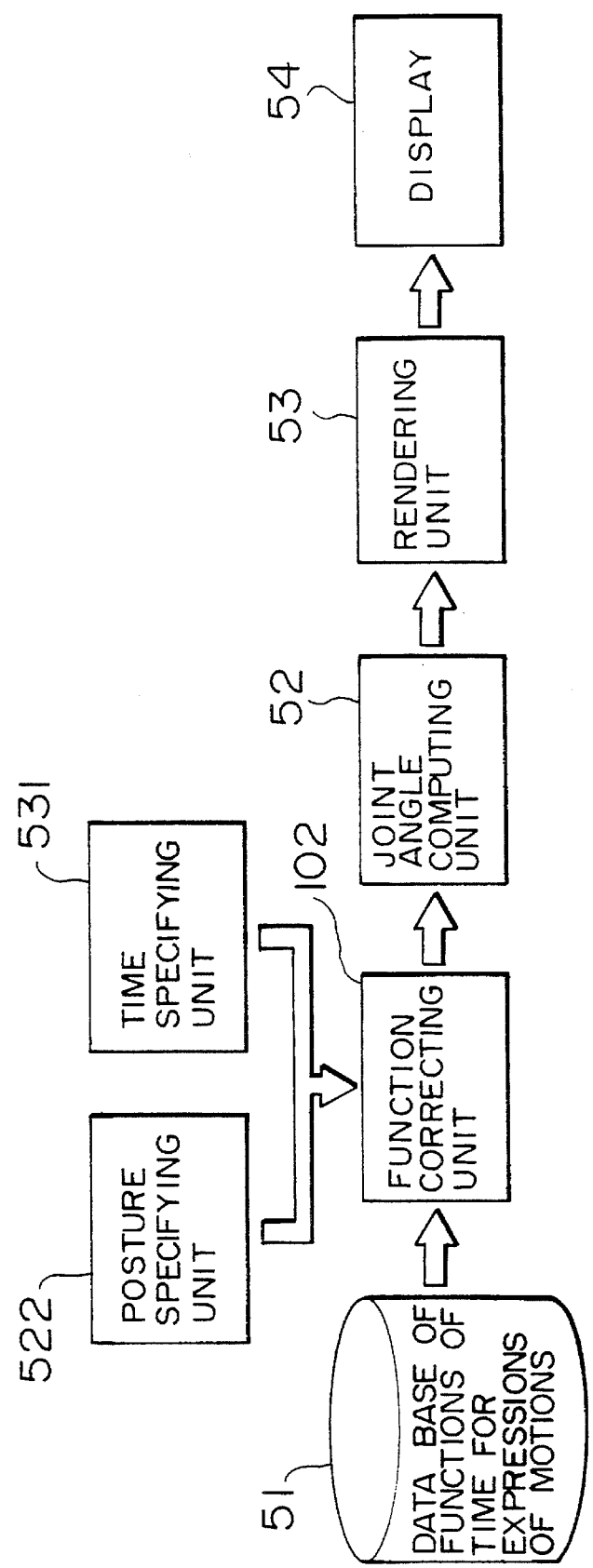
FIG. 30 is a diagram showing the constitution of a control system of a multiple-jointed object in a 16th embodiment according to the present invention.

FIG. 30 shows the construction of a computer graphic apparatus in a 16th embodiment according to the present invention. This structure comprises a data base 51 for storing therein functions of time representing expressions of motions, a posture specifying unit 522, a time specifying unit 531, a function correcting unit 102, a joint angle computing unit 52, a rendering unit 53, and a display 54. The posture specifying unit 522 is adopted to designate a desired posture (in a stationary state) of a person image. The time specifying unit 531 is used to denote a point of time when the person image takes the posture. The person image is moving with motions presented by functions of time selected from the data base 51. At a point of time in the vicinity of the point of time specified by the time specifying unit 531, in order to develop the posture designated by the posture specifying unit 522, the function correcting unit 102 corrects the functions of time. At the specified point of time, the person image takes the denoted posture. Using the corrected functions of time, the joint angle computing unit 52 creates motions of the respective joints. Based on the computation results, the rendering unit 53 obtains information of a position and a posture of the person image in the three-dimensional fashion, which is then projected onto a two-dimensional area to be displayed on a screen by the display 54.

With the operations above, the system can present an image of a multiple-articulated object in a specified posture at a predetermined point of time while the object is moving based on functions of time.

Figure 31:
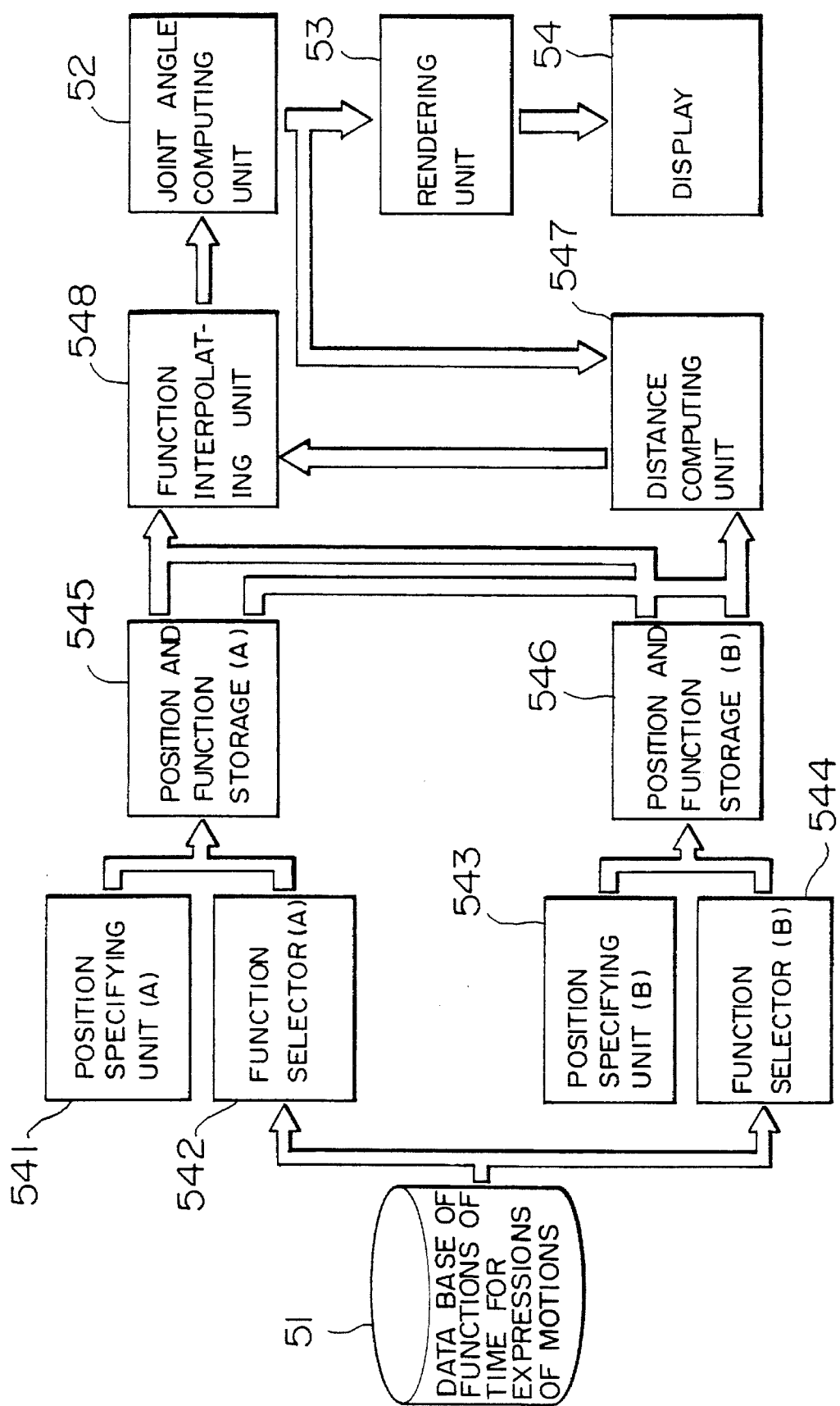
FIG. 31 is a diagram showing the configuration of a control system of a multiple-jointed object in a 17th embodiment according to the present invention.
Figure 32:
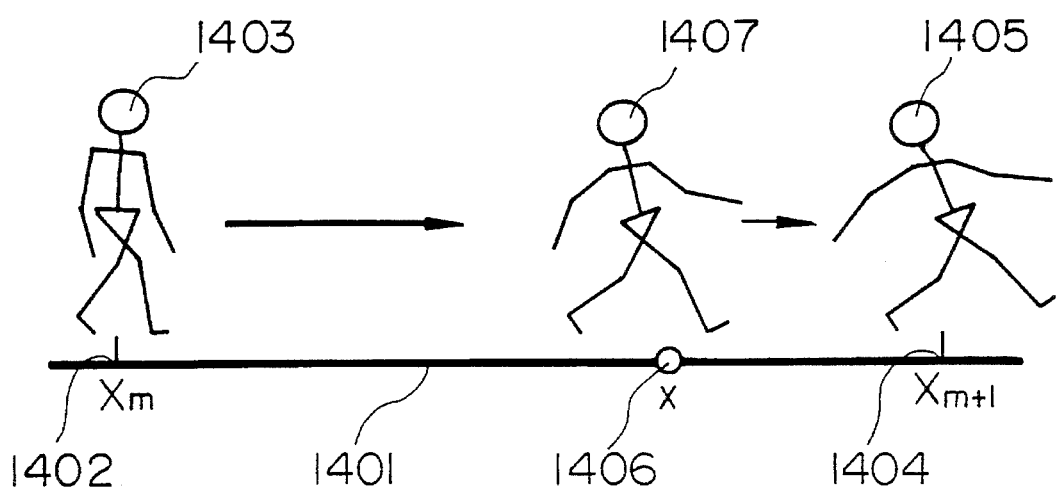
FIG. 32 is a diagram illustratively showing an interpolation of an image during a displacement thereof.

FIG. 31 shows the configuration of a computer graphic apparatus in a 17th embodiment according to the present invention. This constitution comprises a data base 51 for storing therein functions of time representing expressions of motions, a function selector (A) 542, a position and function storage (A) 545, a position specifying unit (B) 543, a function selector (B) 544, a position and function storage (B) 546, a distance computing unit 547, a function interpolating unit 548, a joint angle computing unit 52, a rendering unit 53, and a display 54. FIG. 32 shows a screen display example of the display 54 useful to explain a method of interpolating expressions of motions of a person image while the person image is moving. The person image moves from a left-hand side to the right-hand side along a straight line 1401. The position specifying unit (A) 541 is employed to specify a point Xm or 1402 on the straight line 1401 and then the function selector (A) 542 is initiated to select from the data base 51 functions of time related to an expression of the motion at the point 1402. Let us assume here, that "the person walks in an ordinary manner" has been selected (1403 in FIG. 32) and that each frequency component of the function of time has a spectral intensity $A_{mn}$ and a phase $\Psi_{mn}$. The position $X_m$ on the straight line 1401 and the spectral intensity $A_{mn}$ and the phase $\Psi_{mn}$ of the function of time representing the action are loaded in the position and function storage (A) 545. Next, the position specifying unit (B) 543 is used to specify a point $X_{m+1}$ or 1404 and then the function selector (B) 544 selects from the data base 51 functions of time related to an expression of the motion at the point 1404. It is assumed here that "the person walks cheerfully" has been selected (1405 in FIG. 32) and that each frequency component of the function of time has a spectral intensity $A_{m+1n}$ and a phase $\Psi_{m+1n}$. The specified position $X_{m+1}$ on the straight line 1401 and the spectral intensity $A_{m+1n}$ and the phase $\Psi_{m+1n}$ of the function of time representing the motion are stored in the position and function storage (B) 546. The distance computing unit 547 is adopted to determine a current position of the person image. Let us assume here that the current position is denoted as x or by a reference numeral 1406. The function interpolating unit 548 processes the functions of time related to the two points and the current position to obtain a spectral intensity $A_n(x)$ and a phase $\Psi_n(x)$ of the function of time at the present position x based on the following equations.

$$A_n(x) = A_{mn} + \frac{A_{m+1n} - A_{mn}}{X_{m+1} - X_m} (x - X_m) \quad (16)$$

$$\Psi_n(x) = \Psi_{mn} + \frac{\Psi_{m+1n} - \Psi_{mn}}{X_{m+1} - X_m} (x - X_m) \quad (17)$$

Using the spectral intensity $A_n(x)$ and a phase $\Psi_n(x)$ of the function of time determined from the equations (16) and (17), the joint angle computing unit 52 solves the following function to attain the joint angles.

$$\theta_n(t) = A_o(x) + \sum_{n=1}^{1} \{A_n(x) \times \sin(nt + \Psi_n(x))\} \quad (18)$$

Based on interpolated functions of time, the joint angle computing unit 52 creates motions of the respective joints. In this example, there is produced an intermediate action 1403 between the ordinary walk and the cheerful walk. Based on the computation results, the rendering unit 53 generates information of a position and a posture of the person image in the three-dimensional fashion. The information is then projected onto a two-dimensional space, which is then presented on a screen by the display 54.

As a result, the system can present an image of a multiple-articulated object in which the image moves with an expression developed by an interpolation of motions between two specified positions.

Figure 33:
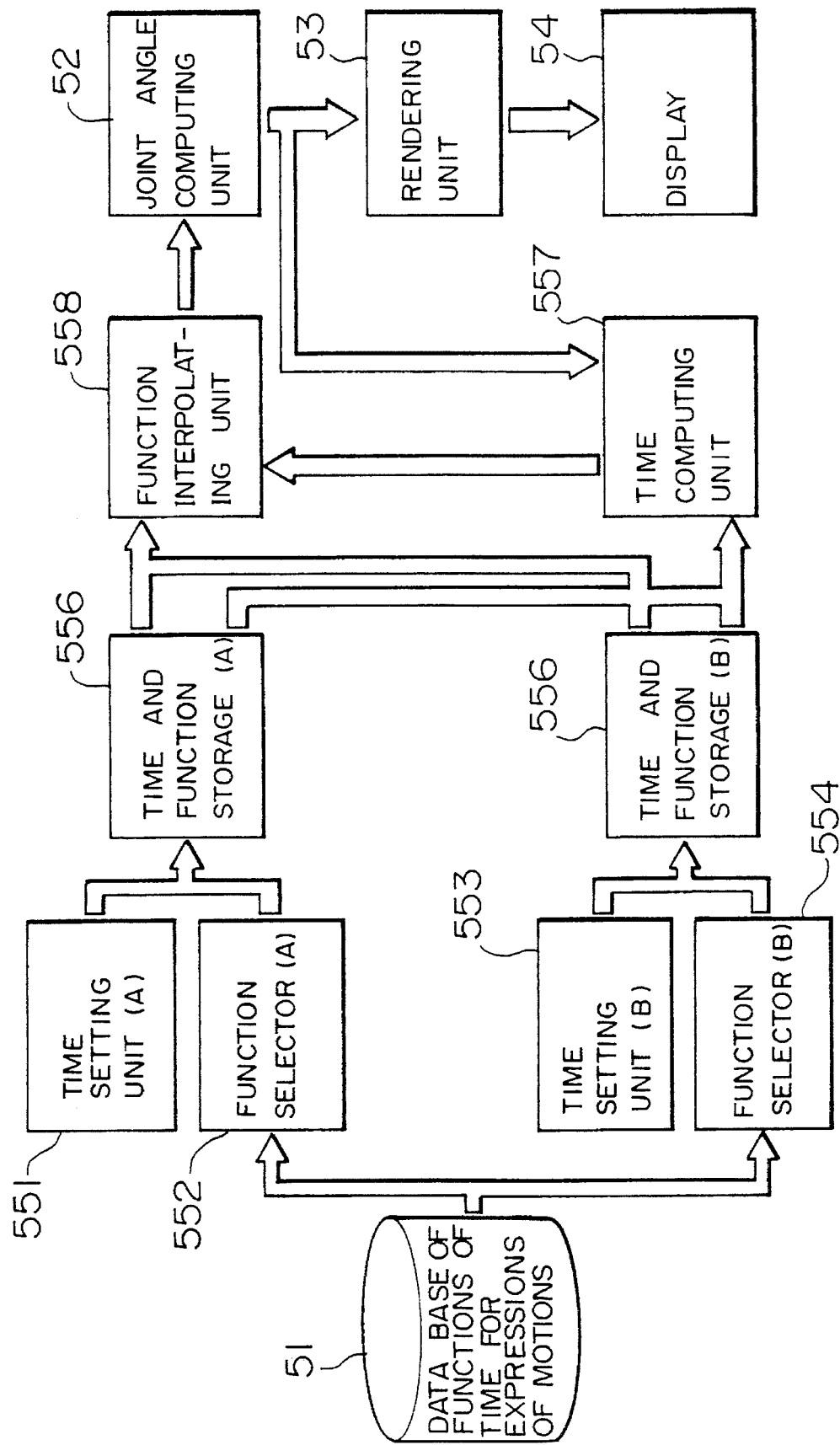
FIG. 33 is a diagram showing the configuration of a control system of a multiple-jointed object in an 18th embodiment according to the present invention.
Figure 34:
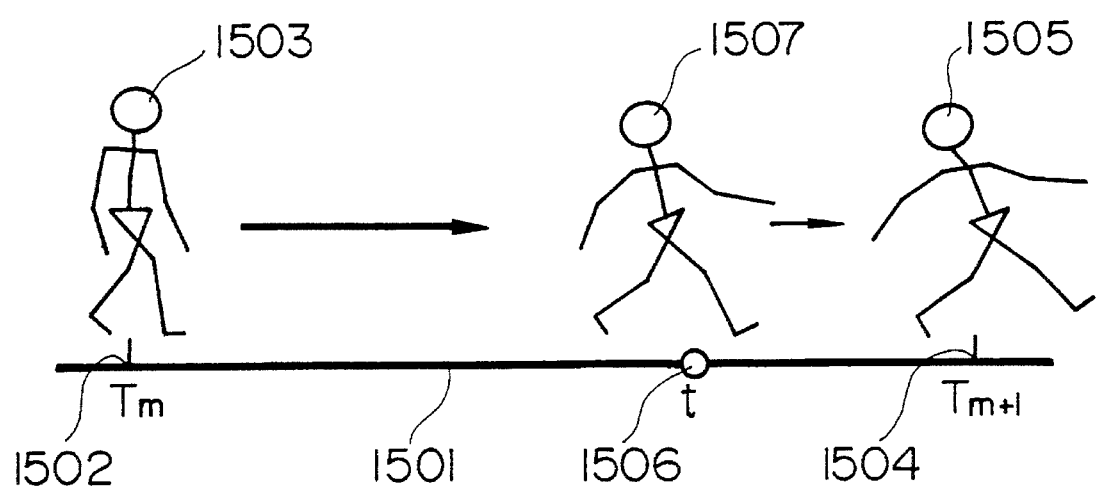
FIG. 34 is a diagram showing an interpolation of a motion with respect to time.

FIG. 33 shows the configuration of a computer graphic apparatus in an 18th embodiment according to the present invention. This structure includes a data base 51 for storing therein functions of time representing expressions of motions, a time specifying unit (A) 551, a function selector (A) 552, a time and function storage (A) 555, a time specifying unit (B) 553, a time and function selector (B) 554, a time and function storage (B) 556, a time computing unit 557, a function interpolating unit 548, a joint angle computing unit 52, a rendering unit 53, and a display 54. FIG. 34 shows a screen display example produced by the display 54 for explaining a method of interpolating expressions of motions of a person image being displaced. In this diagram, a straight line 1501 represents an axis of time. The time specifying unit (A) 551 is used to specify a point of time $T_m$ or 1502 on the time axis 1501 and then the function selector (A) 552 selects from the data base 51 functions of time associated with an expression of the motion at the point of time 1502. Let us assume here, that "the person walks in an ordinary manner" has been selected (1503 in FIG. 34) and that each frequency component of the function of time has a spectral intensity $A_{mn}$ and a phase $\Psi_{mn}$. The point of time $T_m$ specified on the time axis 1501 and the spectral intensity $A_{mn}$ and the phase $\Psi_{mn}$ of the function of time representing the action are memorized in the time and function storage (A) 555. Subsequently, the time specifying unit (B) 553 is adopted to specify a point of time $T_{m+1}$ or 1504 and then the function selector (B) 554 selects from the data base 51 functions of time related to an expression of the motion at the point of time 1504. Let us assume here that a motion "the person walks cheerfully" has been chosen (1505 in FIG. 34) and that each frequency component of the function of time has a spectral intensity $A_{m+1}$ and a phase $105_{m+1n}$. The specified position $T_{m+1}$ on the time axis 1501 and the spectral intensity $A_{m+1n}$ and the phase $\Psi_{m+1n}$ of the function of time representing the motion are memorized in the time and function storage (B) 556. The time computing unit 577 is then activated to determine a current point of time, which is assumed here to be denoted as t or by a reference numeral 1506. The function interpolating unit 558 processes the functions of time associated with the two points and the current point of time to attain a spectral intensity $A_n(t)$ and a phase $\Psi_n(t)$ of the function of time at the present point of time t based on the following equations.

$$A_n(t) = A_{mn} + \frac{A_{m+1n} - A_{mn}}{T_{m+1} - T_m}(t - T_m) \quad (19)$$

$$\Psi_n(t) = \Psi_{mn} + \frac{\Psi_{m+1n} - \Psi_{mn}}{T_{m+1} - T_m}(t - T_m) \quad (20)$$

Using the spectral intensity $A_n(t)$ and the phase $\Psi_n(t)$ of the function of time determined from the equations (16) and (17), the joint angle computing unit 52 solves the following function to obtain the joint angles.

$$\theta_n(t) = A_o(t) + \sum_{n=1}^{i} \{A_n(t) \times \sin(nt + \psi_n(t))\} \quad (21)$$

Based on the functions of time determined through the interpolation, the joint angle computing unit 52 produces actions of the respective joints. In this example, there is generated an intermediate action 1503 between the ordinary walk and the cheerful walk. Depending on the computation results, the rendering unit 53 generates information of a position and a posture of the person image in the three-dimensional fashion, which is then projected onto a two-dimensional space to be displayed on a screen by the display 54.

With the provision above, the apparatus can present an image of a multiple-articulated object in which the image moves with an interpolated expression developed by an interpolation of motions between two specified positions.

Figure 35:
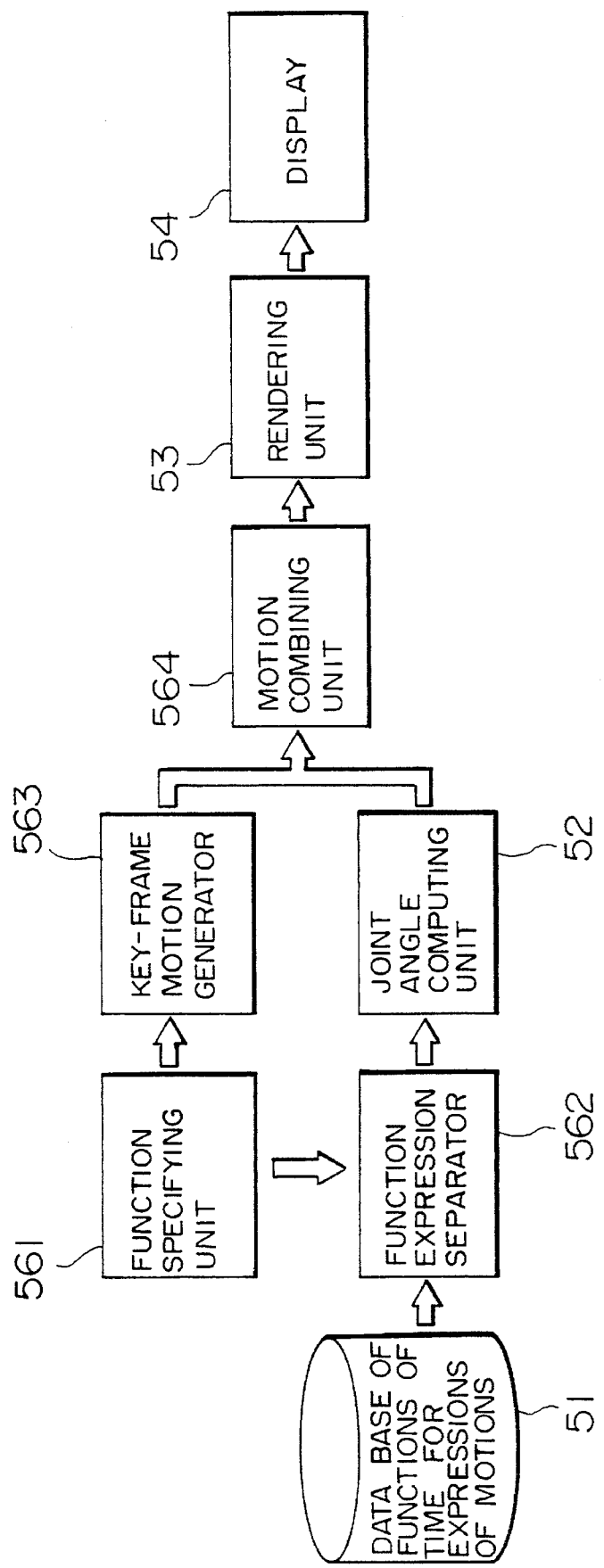
FIG. 35 is a diagram showing the constitution of a control system of a multiple-jointed object in a 19th embodiment according to the present invention.

FIG. 35 shows the structure of a computer graphic apparatus in a 19th embodiment according to the present invention. This configuration includes a data base 51 for storing therein functions of time representing expressions of motions, an angle specifying unit 561, a function expression separator 562, a key-frame motion generator 563, a motion combining unit 564, a joint angle computing unit 52, a rendering unit 53, and a display 54. In some cases, all actions of a person image cannot be represented by use of functions of time stored in the data base 51. For example, in a case where a motion "a walking person waves his or her hand" is desired to be produced, even when an action "a person walks" is already loaded in the data base 51, if a motion of "wave a hand" is missing therein, the desired action cannot be obtained. Next, a description will be given of a method of generating a motion, for example, "a walking person waves his or her hand" in the computer graphic apparatus of the 19th embodiment. First, functions of time representing an action "walk" are selected from the data base 51. Let us assume here that the person image waves the left hand. In this situation, the joints ranging from the left shoulder joint to the joint of the tip of the hand are required to be separated from those to be represented with the functions of time above. This operation is accomplished by the joint specifying unit 561. The function expression separator 562 accordingly separates the specified joints from the function expression. Actions of the remaining joints are then generated by the joint angle computing unit 52. For the spearated joints, motions are produced by the key-frame motion generator 563 creating motions in the key frame method. The motion combining unit 564 combines the motions generated in the key frame method with those prepared depending on the functions of time. Using the combined results, the rendering unit 53 generates information of a position and a posture of the person image in the three-dimensional fashion. The information is then projected onto a two-dimensional space to be presented on a screen by the display 54.

As a result, the apparatus can present an image of a multiple-articulated object in which the image conducts an action not registered to the data base in advance.

Figure 36:
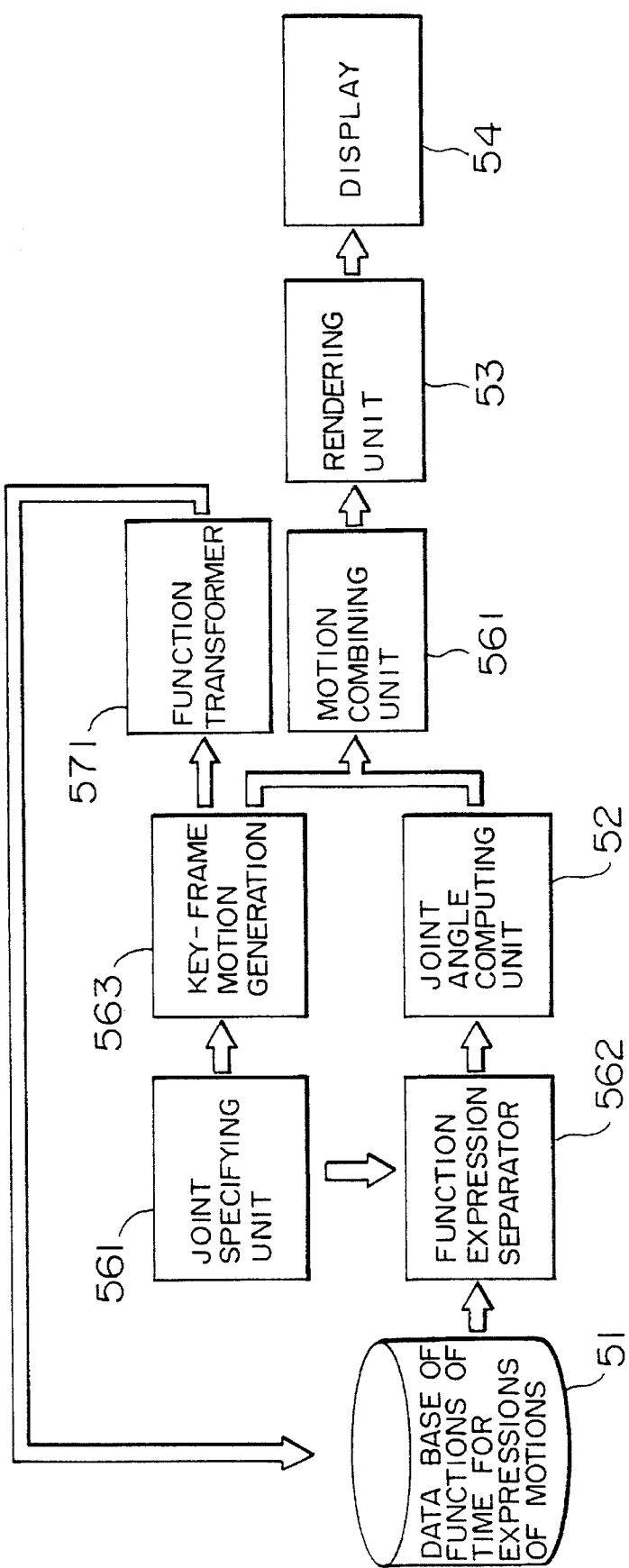
FIG. 36 is a diagram showing the configuration of a control system of a multiple-jointed object in a 20th embodiment according to the present invention.

FIG. 36 shows the construction of a computer graphic apparatus in a 20th embodiment according to the present invention. This constitution comprises a data base 51 for storing therein functions of time representing expressions of motions, an angle specifying unit 561, a function expression separator 562, a key-frame motion generator 563, a function transformer 571, a motion combining unit 564, a joint angle computing unit 52, a rendering unit 53, and a display 54. The structure of this embodiment is implemented by additionally disposing a function transformer 571 preceding to the key-frame motion generator 563 of the apparatus of the 19th embodiment shown in FIG. 35. An action generated by the key-frame motion generator 563 is transformed by the function transformer 571 into a function of time such as one represented by the function (5). The motion represented by the transformed result is registered to the data base 51 so as to be used again in a later processing.

In short, according to the 20th embodiment, a motion which has not been registered to the data base is generated in the key frame method and is then transformed into a function of time, which is registered to the data base so as to be employed again in an operation later.

Figure 37:
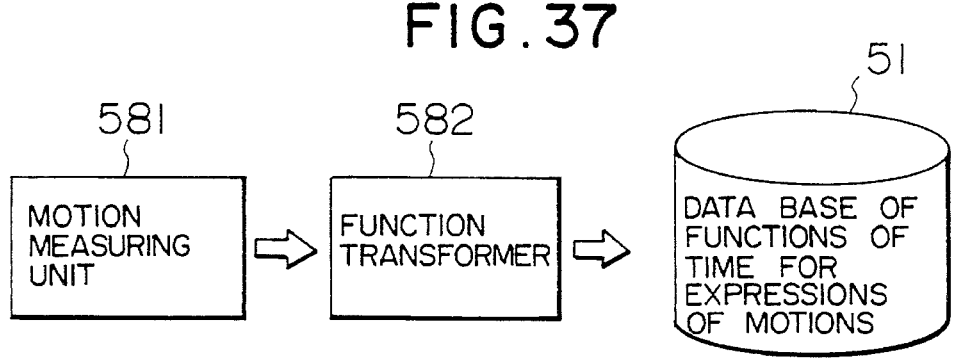
FIG. 37 is a diagram showing the constitution of a system in which a function of time is created from measured data.
Figure 38:
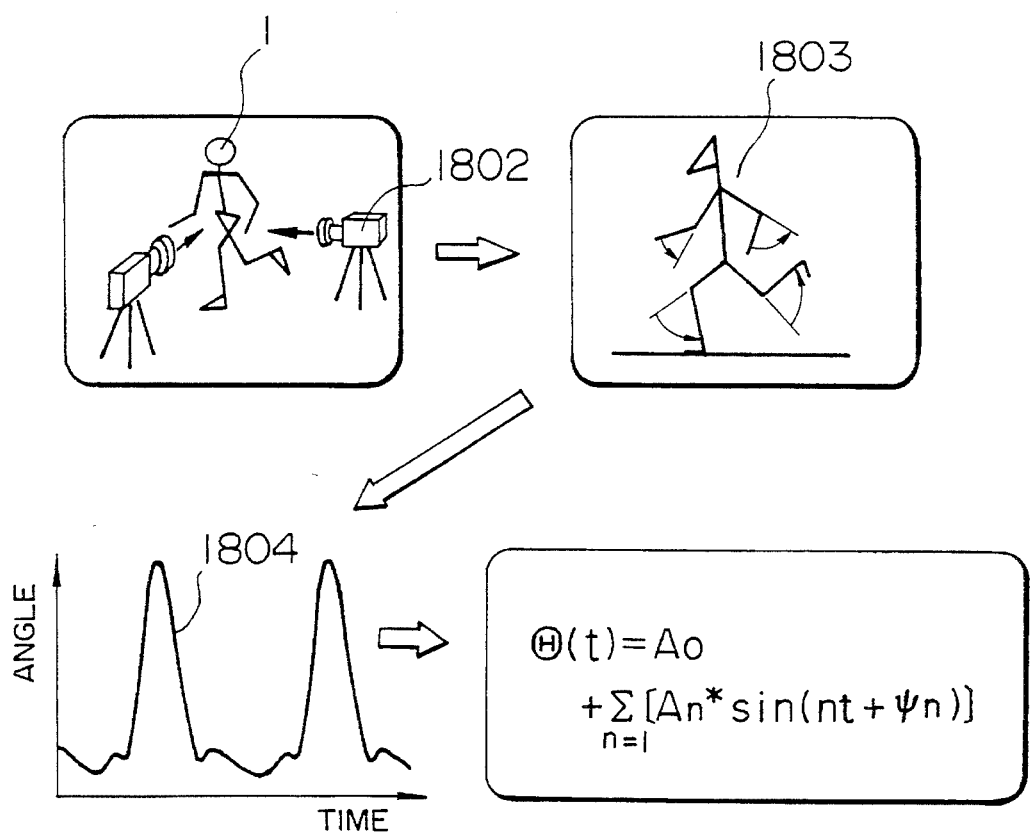
FIG. 38 is a schematic diagram showing a method of generating a function of time representing a motion.

FIG. 37 shows an apparatus for creating a function of time representing an action. The constitution includes a motion measuring unit 581, a function transformer 582, and a data base 51 storing functions of time for expressions of motions. FIG. 38 shows an example of a procedure used to create a function of time representing an expression of a motion. First, the motion measuring unit 581 measures an action (angle) of each joint of a person image as a multiple-articulated object 1. In the example of FIG. 38, a video camera 1802 is adopted to shoot an image of the object 1 in motion such that based on an image 1803 presented on a screen for each frame, the motion of each articulation is measured, which is obtained, for example, as shown in a graph 1804. The function transformer 582 then accomplishes a Fourier series expansion on the measured data to obtain a function (representing an expression of a motion) similar to the function (5). The resultant function of time is then loaded in the data base 51.

Through the operation above, the apparatus can process an actual action of a person image to create a function of time representing an expression of the action.

Figure 39:
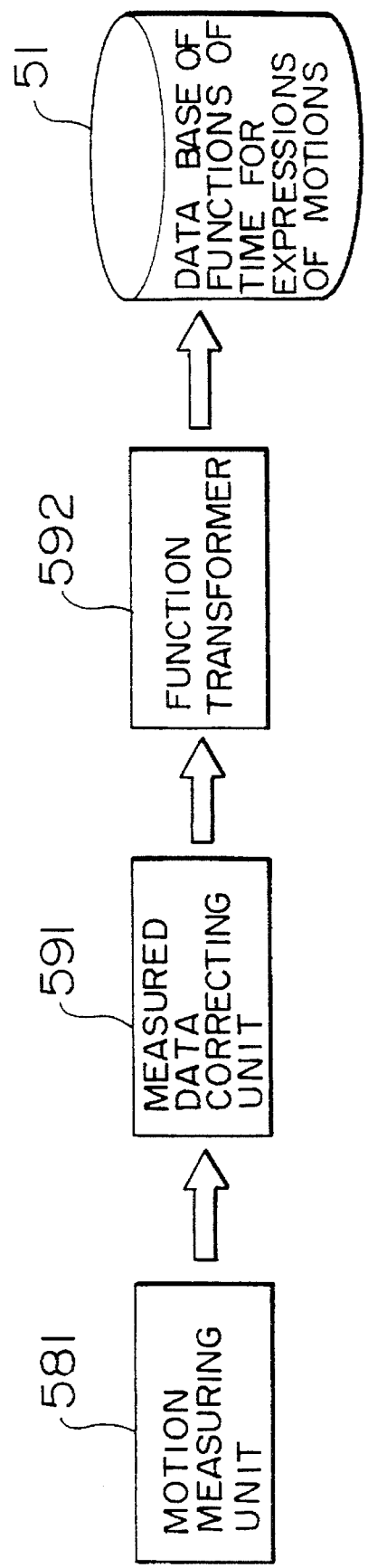
FIG. 39 is a diagram showing another system in which a function of time is produced from measured data.

FIG. 39 shows an apparatus for generating a function of time representing an expression of a motion. The configuration includes a motion measuring unit 581, a measured data correcting unit 591, a function transformer 582, and a data base 51 for storing therein functions of time for expressions of motions. This system is materialized by adding the measured data correcting unit 591 to the apparatus of FIG. 37. The measured data has a difference with respect to actual data because of a measuring error and an inappropriate measurement. In order to minimize the discrepancy therebetween, the measured data correcting unit 591 accomplishes a filtering operation and a correction on the measured data.

As a result of these operations, according to the apparatus of FIG. 39, when an actual motion of a person image is measured, any error appearing in the measuring operation can be removed to appropriately create a function of time representing an expression of the motion.

Figure 40:
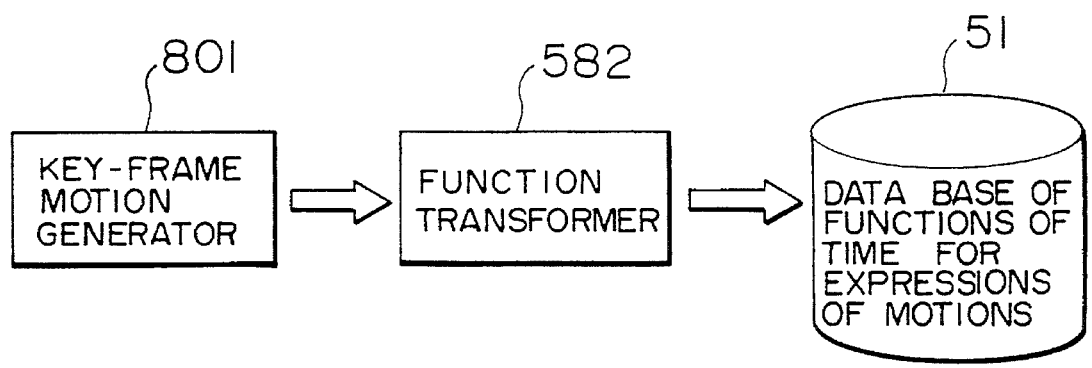
FIG. 40 is a diagram showing still another system in which a function of time is generated from data measured in the key frame method.

FIG. 40 shows a structure of an alternative apparatus for generating a function of time representing an expression of a motion. The configuration includes a key-frame motion generator 801, a function transformer 582, and a data base 51 storing functions of time for expressions of motions. In this system, a motion of a person image is first generated by the motion generator 801 in the key frame method. The generated motion (a change with respect to time in the bending angle of each joint) is transformed into a function of time representing the motion, which is then registered to the data base 51.

As a result, the apparatus can produce, based on the motion prepared according to the key frame method, a function of time representing an expression of the motion.

Figure 41:
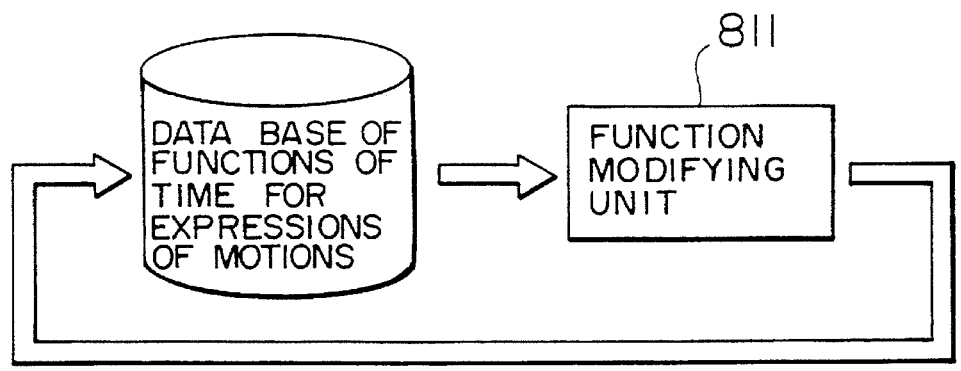
FIG. 41 is a diagram showing the configuration of a system for correcting a data base.

FIG. 41 shows the constitution of still another apparatus for creating a function of time representing an expression of a motion. The configuration includes a data base 51 loaded with functions of time for expressions of motions and a function correcting unit 811. In this system, the function correcting unit 811 is disposed to modify a function of time representing the motion selected from the data base 51. The modifying operation here includes a filtering operation of a function representing an action, an interpolation on a motion function, and an operation to obtain a mean value of a plurality of motion functions. The modified functions are stored in the data base 51 so as to be used again in a later operation.

With this provision, the apparatus of FIG. 41 modifies a function of time representing the motion selected from the data base 51 and then stores the modified function in the data base, thereby enabling the resultant function to be employed again later.

Figure 42:
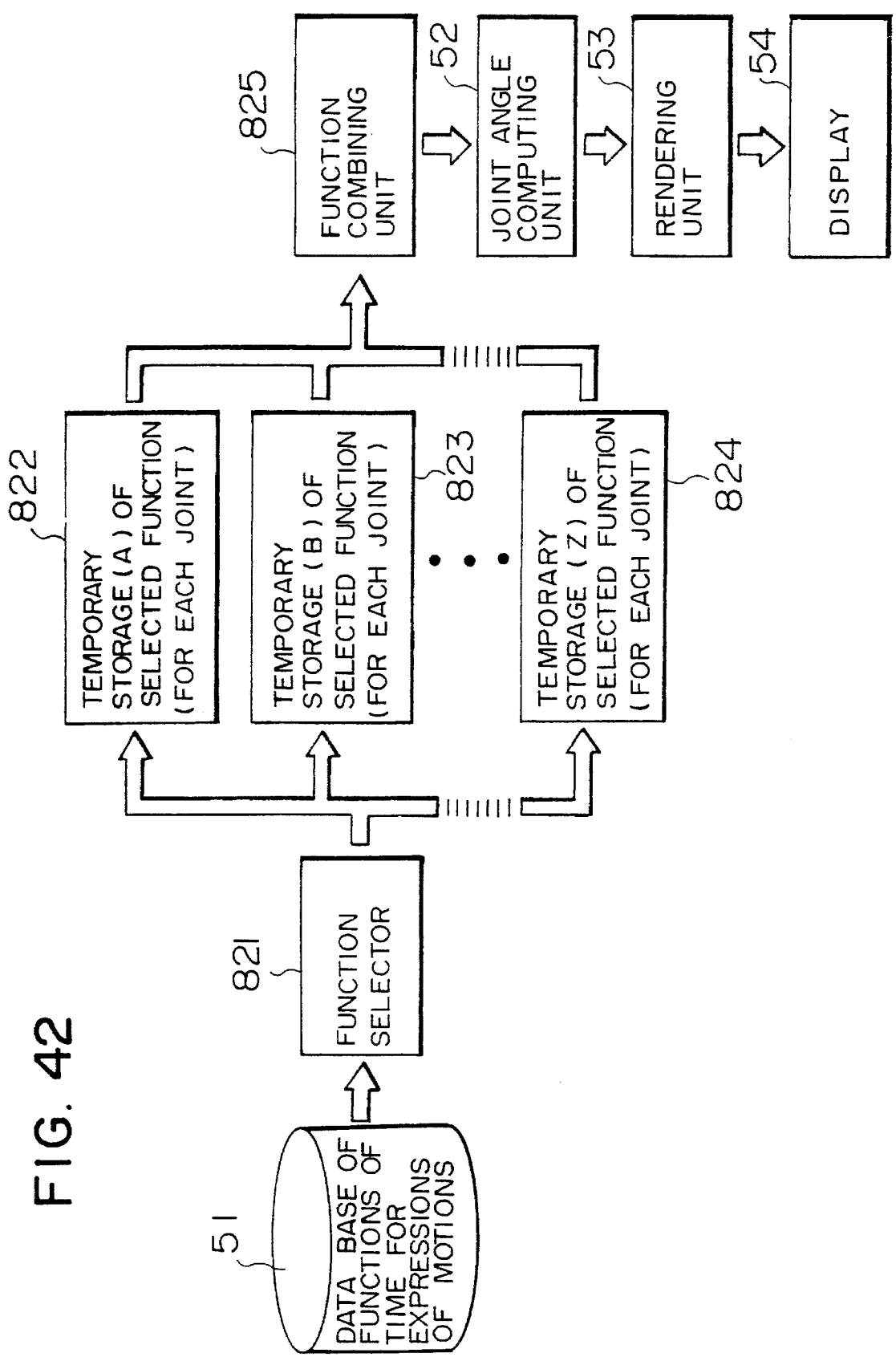
FIG. 42 is a diagram showing the configuration of a control system of a multiple-jointed object in a 21st embodiment according to the present invention.

FIG. 42 shows a constitution of a computer graphic apparatus in a 21st embodiment according to the present invention. The structure of this embodiment includes a data base 51 storing functions of time for expressions of motions, a function selector 821 for selecting a function of time for a joint constituting a body of a multiple-articulated object, a temporary storages 822 to 824 for temporarily storing therein selected functions of time for the associated joints, a function composing unit 825, a joint angle computing unit 52, a rendering unit 53, and a display 54. The system of this embodiment is adopted to present an action of a person image as a multiple-hinged object in which the upper-half body of the person image conducts a walking action and the lower-half body thereof achieves a running action. In this example, the system accomplishes operations as follows. The function selector 821 selects from the data base 51 functions of time for the walking action of the upper-half of the body, which are stored in the temporary storage 822. Subsequently, the function selector 821 similarly selects functions of time for the running action of the lower-half of the body, which are stored in the temporary storage 823. The function composing unit 825 then combines the functions of the upper-half of the body with those of the lower-half thereof. Based on the resultant function of time, the joint angle computing unit 52 achieves computations to determine actions of the respective joints. The rendering unit 53 processes the resultant data to obtain a position and a posture of the person image in the three-dimensional fashion. Information of the position and the posture is then projected onto a two-dimensional space so as to be displayed on a screen of the display 54.

Resultantly, according to the 21st embodiment, a function of time can be selected for each articulation of the person image such that actions of the respective joints are combined with each other to achieve a motion of the person image.

Figure 43:
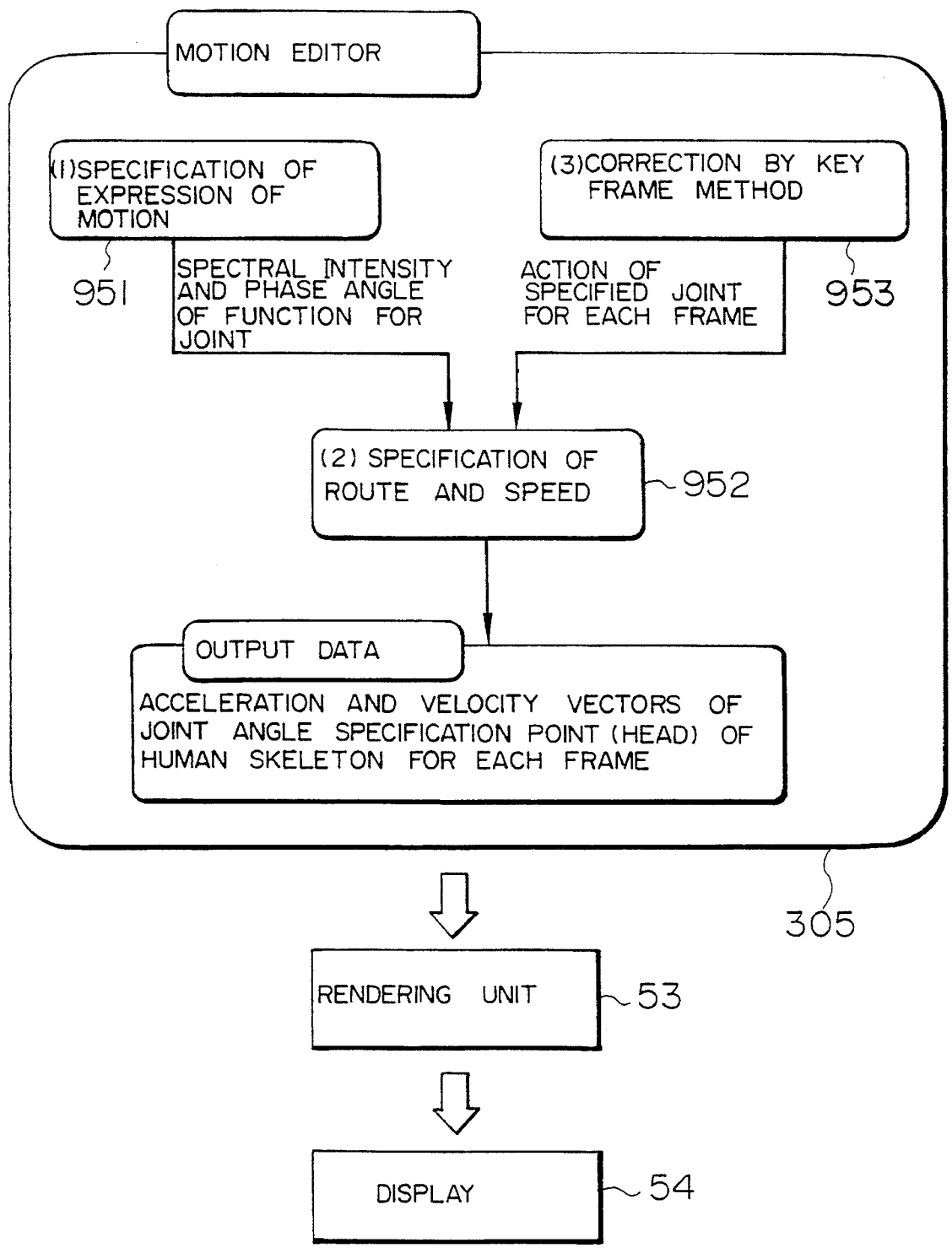
FIG. 43 is a diagram showing the operation of an editing section of the embodiments above in which various parameters are supplied from a display screen.

FIG. 43 shows a motion editor 305 available as an editing section of the configurations of FIGS. 12 to 42. The motion editor 305 is adopted to input various parameters and the like of the respective emobiment, for example, from a screen. The configuration of the editor 305 includes a motion expression specifying part 951, a path and speed specifying part 952, and a key-frame motion correcting part 953.

Figure 44:
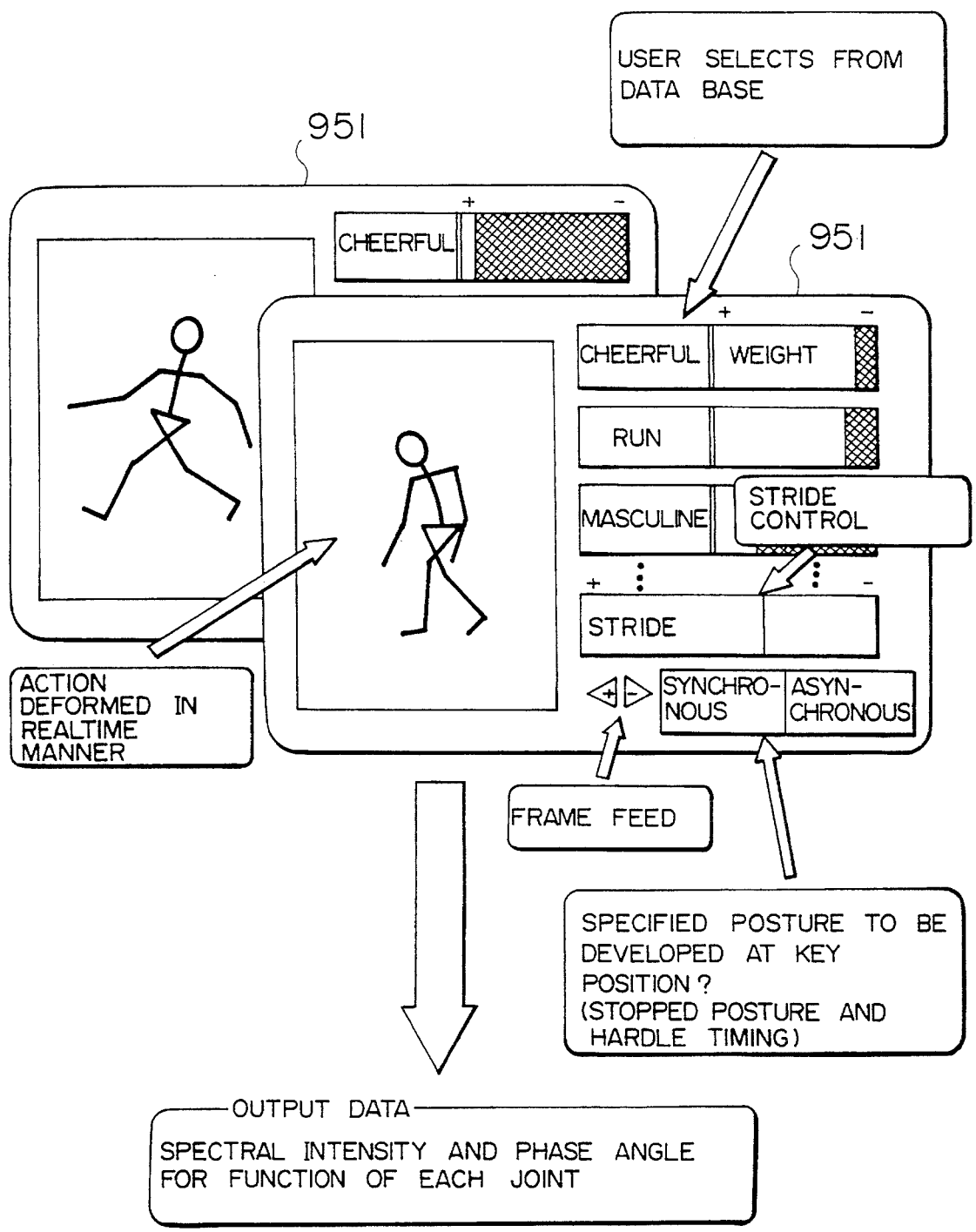
FIG. 44 is a diagram illustratively showing a screen example employed to specify expressions of a motion.

In the screen example of FIG. 44, the motion expression specifying part 951 is used, for example, to select a function representing an expression of a motion in the embodiments above and to adjust weights applied to the selected functions. The motion expression specifying part 951 outputs a function (related to a spectral intensity and a phase angle for a motion of each joint) representing a motion desired by the user.

Figure 45:
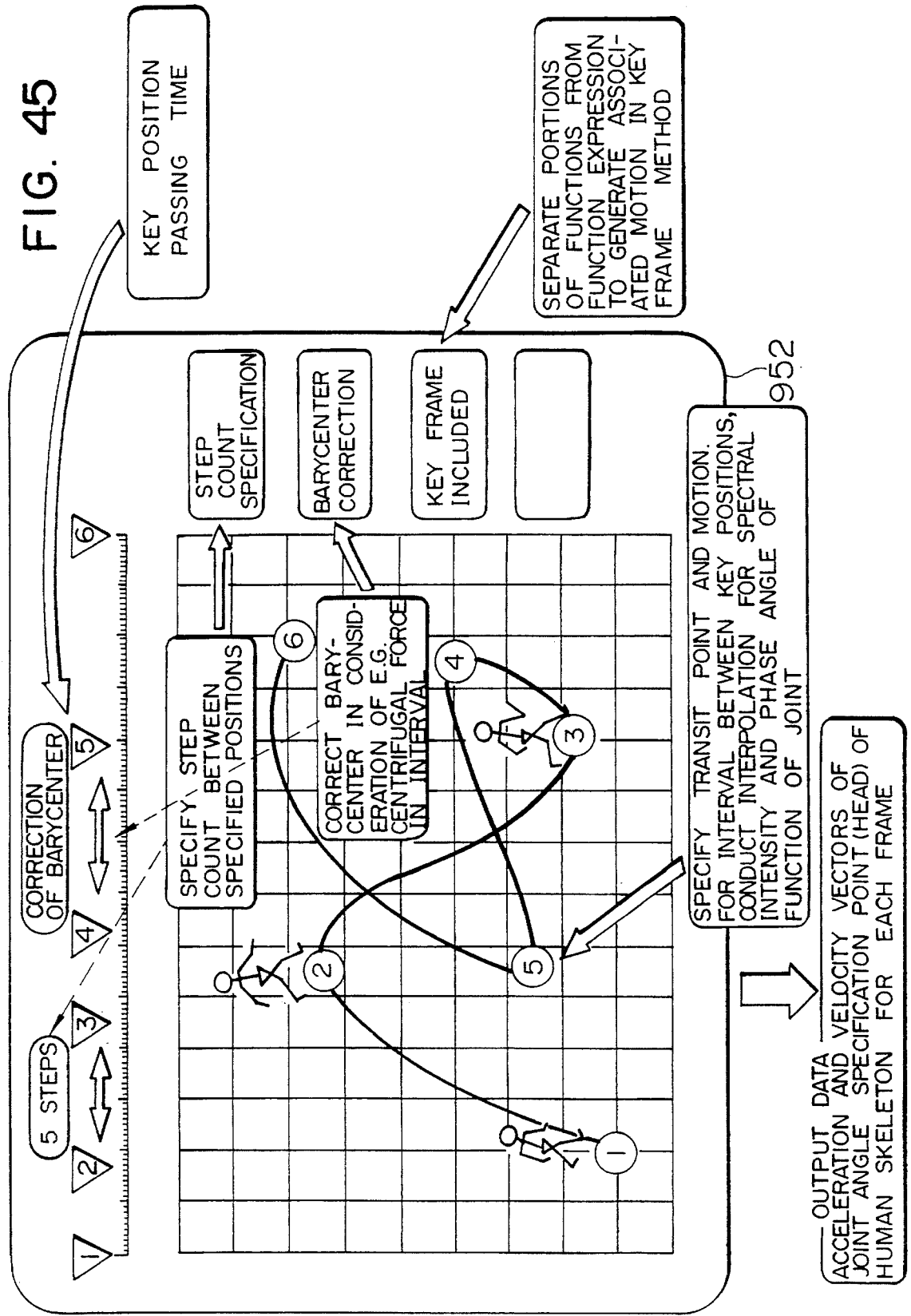
FIG. 45 is a diagram showing an example of a screen used to specify a route and a speed of an action in the motion editor.

FIG. 45 shows a screen display example of the path and speed specifying part 952 in which a moving path, a moving speed, and an expression of a motion is specified for an image of a person in the embodiments above. This part 952 produces data indicating a bending angle of each joint of the person image for each frame of the picture.

Figure 46:
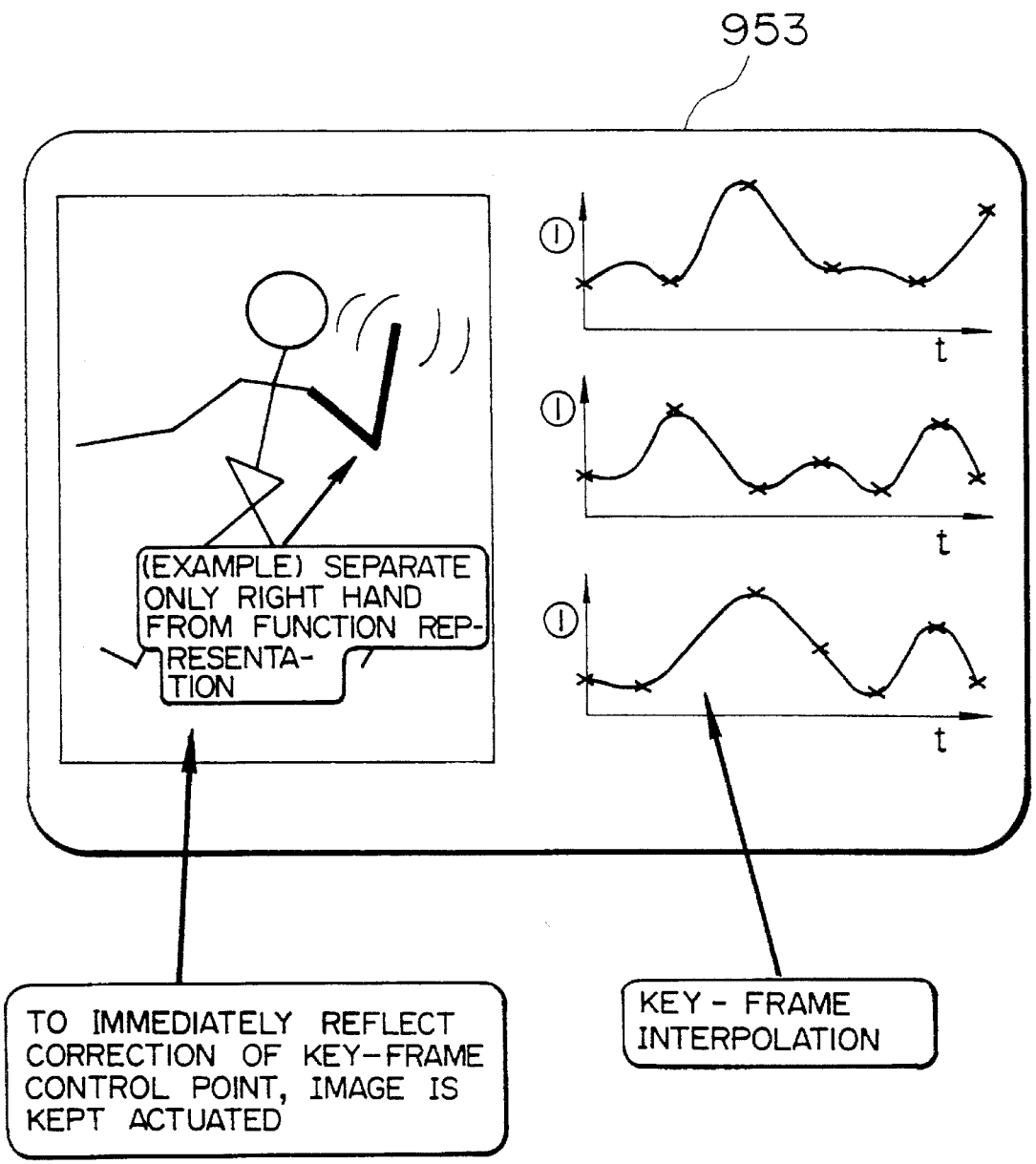
FIG. 46 is a diagram showing a screen example adopted to correct a motion obtained by the key frame method in the motion editor.

In a screen example of the key-frame motion correcting part 953 of FIG. 46, a portion of an expression of a motion represented by functions of time is separated from the function expressing so as to be generated according to the key frame method.

In the embodiments described above, description has been given of examples in which a computer graphic system is adopted to represent an image of a person so as to control an action of the person image. However, the results obtained from the joint angle computing unit 12 may be used as instructions for actions, namely, action control signals of a multiple-articulated robot having a real size of the associated object, thereby implementing a robot control system driving the robot.

Figure 47:
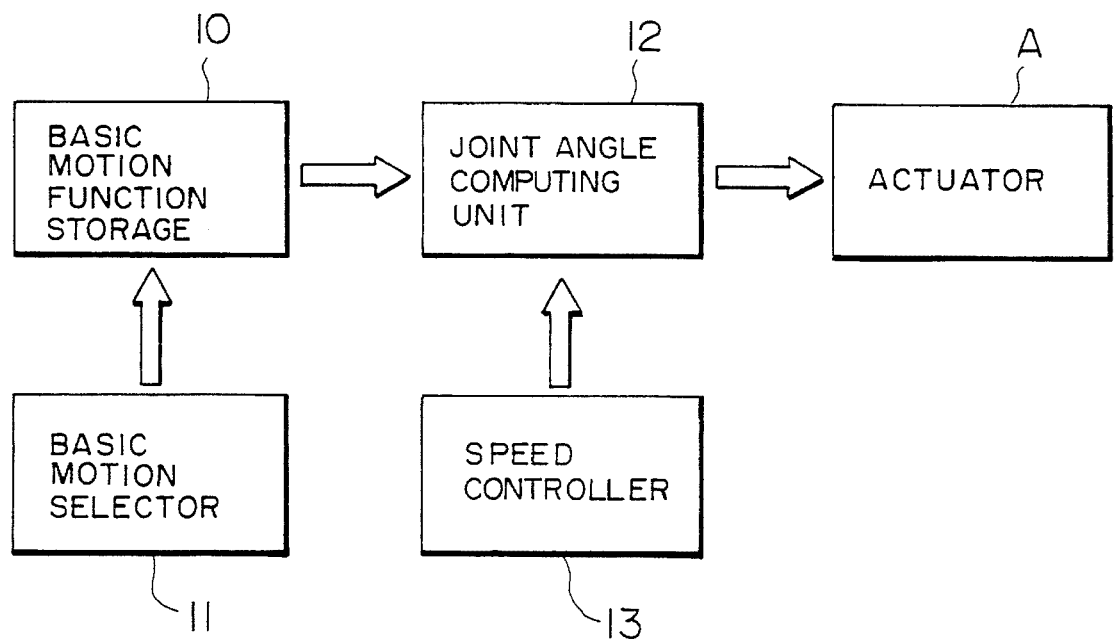
FIG. 47 is a block diagram showing the configuration of a control system of a multiple-jointed object in a 22nd embodiment according to the present invention.
Figure 48:
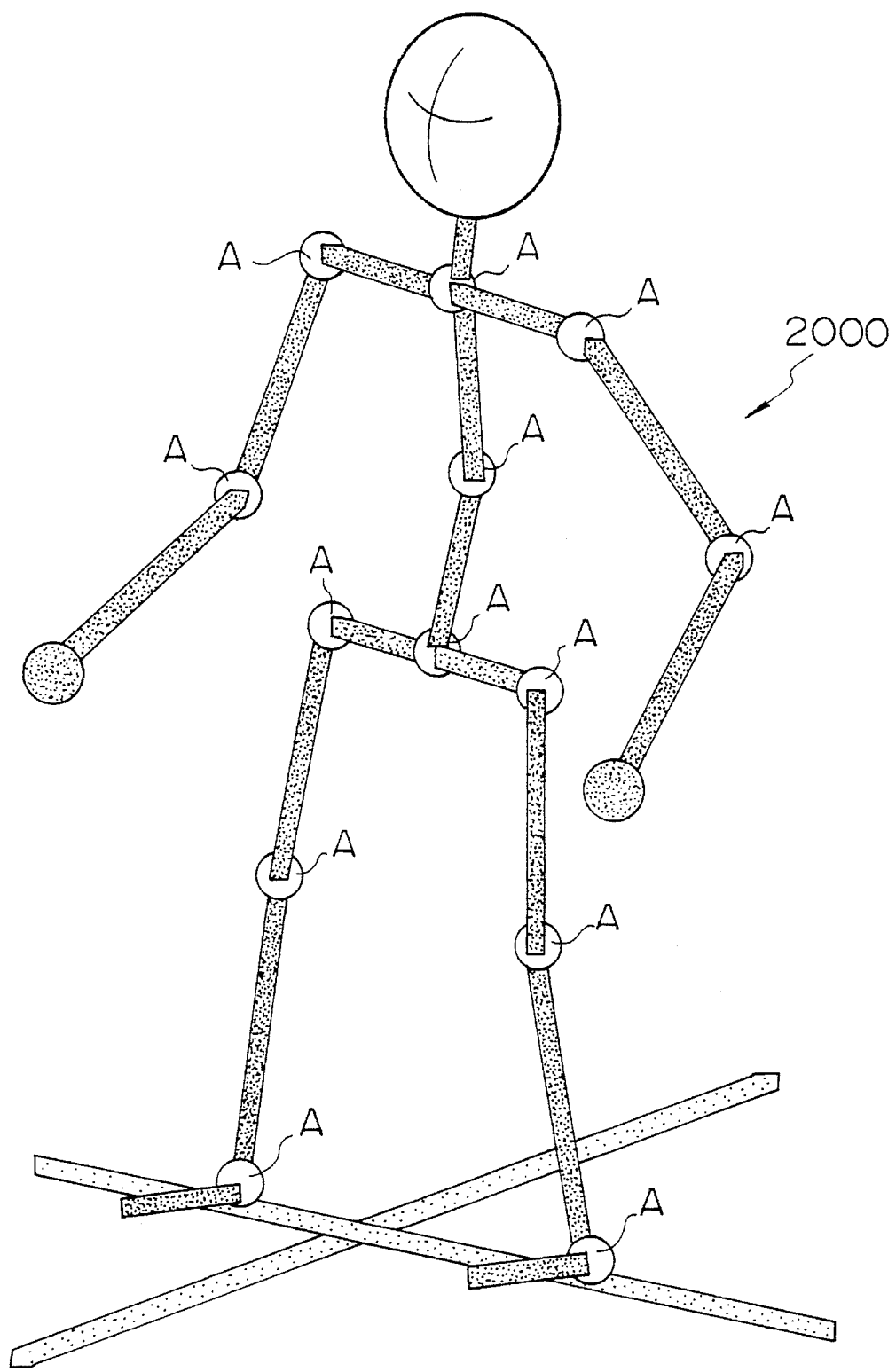
FIG. 48 is a schematic perspective view showing the constitution of a robot.

A description will now be given of such an example. FIG. 47 shows the constitution of an apapratus controlling a robot in a 22nd embodiment according to the present invention. As compared with the control apparatus of FIG. 1, the object contour storage 15 is dispensed with. Namely, the contour storage 15 is replaced with a robot 2000 shown in FIG. 48; moreover, the rendering unit 14 is substituted for actuators A. Each actuator A is disposed to bend an associated joint of the robot 2000 depending on a joint bending angle computed by the joint angle computing unit 12. In consequence, like in the case of the embodiments, the respective articulations are actuated in a harmonized manner based on a basic function for an action such as "walk" or "run" selected by the basic motion selector 11. Moreover, as already described in conjunction with the embodiments, when the basic motion function storage 10 is supplied with, in addition to the actions such as "walk" and "run", feature components, for example, a characteristic element representing an emotional expression of a person, the robot 2000 can be actuated in a motion such as "walk merrily" or "run sadly".

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A method of representing a motion of a multiple-jointed object, having multiple joints, in which an action of each articulation of said object is controlled to present said motion thereof on a screen, said method comprising the steps of:

attaining a bending angle of each of said joints as a function of a phase difference, time and amplitude independent of a length between said joints of said object;

obtaining, based on said bending angle functions, data of a contour of said object in motion in response to an instruction; and displaying the motion of said object as indicated by said contour data on the screen.

2. A method of representing a motion of a multiple-jointed object according to claim 1, wherein said step of displaying the motion of said object on the screen is executed by altering values of the parameters of said functions.

3. A method of representing a motion of a multiple-jointed object according to claim 1, said method further comprising the step of:

specifying, in response to an instruction, a feature component to said bending angle function, said feature component indicating a change in motion in each of said joints;

and wherein said step of displaying the motion of said object is executed in association with said feature component on a screen.

4. A method for representing a motion of a multiple-jointed object according to claim 1, having multiple joints, said method further comprising the step of:

altering values of parameters of said bending angle functions, thereby changing the motion of said object displayed on the screen based on said contour data.

5. A method of representing a motion of a multiple-jointed object, having multiple joints, in which an action of each one of multiple articulations of said object is controlled so as to present the motion thereof on a screen, said method comprising the steps of:

attaining a bending angle of each of said joints as the following function independent of a length between said joints of said object:

$$\theta_m(t) = D_m + \sum_{n=1} A_{mn} \times \sin(n \times t + \Psi_{mn} - \Phi_{mn}) \quad (1)$$

$D_m$: Direct current component
$A_{mn}$: Amplitude of each frequency component
$\Psi_{mn}$: Phase
m: Joint number
n: Higher harmonics of order n
$\Phi_m$: Phase difference of 1st order higher harmonics between reference joint and m-th joint ($\Phi_m=0$ for reference joint)

changing a value of at least either one of the parameters $D_m$, $A_{mn}$, and $\Psi_{mn}$ of the function (1), thereby varying said motion of said multiple-articulated object acting based on the function (1);

obtaining, from said function (1), data of a contour of said object in motion in response to an instruction; and displaying the motion of said object as indicated by said contour data on the screen.

6. A method according to claim 5, further comprising the steps of:

establishing a correspondence between a variation range of the value of the parameter and a feature component indicating a change associated with an action of each of said joints; and specifying, in place of the variation range, said feature component, thereby altering said motion of each of said joints.

7. A method according to claim 6 further including a step of changing a magnitude for the variation range based on said feature component.

8. A computer graphic apparatus for presenting a motion of a multiple-jointed object, having multiple joints, on a screen in which an action of each of said joints of said object is controlled so as to present said motion thereof on the screen, comprising:

means for attaining a bending angle of each of said joints as a function of a phase difference, time and amplitude independent of a length between said joints of said object;

means for obtaining, based on said bending angle functions, data of a contour of said object in motion in response to an instruction; and means for displaying the motion of said object as indicated by said contour data on the screen.

9. A computer graphic apparatus for presenting a motion of a multiple-jointed object, having multiple joints, on a screen in which an action of each of said joints of said object is controlled so as to present said motion thereof on the screen, comprising:

store means for storing therein a bending angle of each of said joints as the following function independent of a length between said joints of said object:

$$\theta_m(t) = D_m + \sum_{n=1} A_{mn} \times \sin(n \times t + \Psi_{mn} - \Phi_{mn}) \quad (1)$$

$D_m$: Direct current component
$A_{mn}$: Amplitude of each frequency component
$\Psi_{mn}$: Phase
Joint number
n: Higher harmonics of order n
$\Phi_m$: Phase difference of 1st order higher harmonics between reference joint and m-th joint ($\Phi_m=0$ for reference joint)

means for obtaining, based on said function (1), data of a contour of said object in motion in response to an instruction; and means for displaying the motion of said object as indicated by said contour data on the screen.

10. A computer graphic apparatus for presenting a motion of a multiple-jointed object, having multiple joints, on a screen in which an action of each of said joints of said object is controlled so as to present said motion thereof on the screen, comprising:

store means for storing therein a bending angle of each of said joints as the following function independent of a length between said joints of said object:

$$\theta_m(t) = (D_m + d_m) + \sum_{n=1} ((A_{mn} + a_{mn}) \times \qquad (2)$$

$$\sin\{n \cdot t + (\Psi_{mn} + \psi_{mn}) - \phi_{mn}\})$$

$D_m$: Direct current component
$A_{mn}$: Amplitude of each frequency component
$\Psi_{mn}$: Phase
m: Joint number
n: Higher harmonics of order n
$\phi_m$: Phase difference of 1st order higher harmonics between reference joint and m-th joint ($\phi_m=0$ for reference joint)
$d_m$: Direct current component of qualification component
Qualification component of each frequency component
$\psi_{mn}$: Phase component of qualification component means for setting and for changing values of $d_{mn}$, $a_{mn}$ and $\psi_{mn}$;
means for obtaining, based on said function (2), data of a contour of said object in motion in response to an instruction; and
means for displaying the motion of said object as indicated by said contour data on the screen.

11. An apparatus according to claim 10 further comprising:
a table for storing therein preset/change values respectively of $d_{mn}$, $a_{mn}$, and $\psi_{mn}$ of said function (2) and feature components indicating a change of each of said joints in motion with respective correspondence established therebetween; and
means for referencing said table based on a specification of said feature components, thereby determining said preset/change values of $d_{mn}$, $a_{mn}$, and $\psi_{mn}$.

12. A computer graphic apparatus for presenting a motion of a multiple-jointed object, having multiple joints, on a screen in which an action of each of said joints of said object is controlled so as to present said motion thereof on the screen, comprising:
store means for storing therein a bending angle of each of said joints as the following function independent of a length between said joints of said object:

$$\theta_m(t) = (D_m + \alpha_m \times d_m) + \beta_m \sum_{n=1} ((A_{mn} + \alpha_m \times a_{mn}) \times \qquad (3)$$

$$\sin\{n \cdot t + (\Psi_{mn} + \alpha_m \cdot \psi_{mn}) - \phi_{mn} \cdot n\})$$

$D_m$: Direct current component
$A_{mn}$: Amplitude of each frequency component
$\Psi_{mn}$: Phase
m: Joint number
n: Higher harmonics of order n
$\phi_m$: Phase difference of 1st order higher harmonics between reference joint and m-th joint ($\phi_m=0$ for reference joint)
$d_m$: Direct current component of qualification component
$a_{mn}$: Qualification component of each frequency component
$\psi_{mn}$: Phase component of qualification component $\alpha_m$,
$\beta_m$: Magnitude
means for setting and for changing values of said magnitudes $\alpha_m$ and $\beta_m$;
means for attaining a value of said function (3) for each of said joints;
means for obtaining, based on said function (3), data of a contour of said object in motion in response to an instruction; and
means for displaying the motion of said object as indicated by said contour data on the screen.

13. A computer graphic apparatus for presenting a motion of a multiple-jointed object, having multiple joints, on a screen in which an action of each of said joints of said object is controlled so as to present said motion thereof on the screen, comprising:
store means for storing therein a bending angle of each of said joints as the following function independent of a length between said joints of said object:

$$\theta_m(t) = \left( D_m + \sum_i \alpha_{mi} \times d_{mi} \right) + \beta_m \sum_{n=1} \left( \left( A_{mn} + \sum_i \alpha_{mi} \times a_{mni} \right) \times \qquad (4)$$

$$\sin\{n \cdot t + (\Psi_{mn} + \Sigma\alpha_{mi} \cdot \psi_{mni}) - \phi_{mn} \cdot n\})$$

$D_m$: Direct current component
$A_{mn}$: Amplitude of each frequency component
$\Psi_{mn}$: Phase
m: Joint number
n: Higher harmonics of order n
$\phi_m$: Phase difference of 1st order higher harmonics between reference joint and m-th joint ($\phi_m=0$ for reference joint)
$d_{mi}$: Direct current components of respective kinds of qualification components
$a_{mi}$: Qualification components of different kinds for each frequency component
$\psi_{mi}$: Phase components of respective kinds of qualification components
$\alpha_{mi}$: Magnitude of each qualification component
$\beta_m$: Magnitude of amplitude
means for setting and for changing values of said magnitudes $\alpha_{mi}$ and $\beta_m$;
means for setting and for changing values of $d_{mi}$, $a_{mi}$, and $\psi_{mn}$;
means for attaining a value of said function (4) for each of said joints;
means for obtaining, based on said function (4), data of a contour of said object in motion in response to an instruction; and
means for displaying the motion of said object as indicated by said contour data on the screen.

14. An apparatus according to claim 13 further comprising:
a table for storing therein preset and change values of $d_{mi}$, $a_{mi}$, and $\psi_{mn[i]}$ (i varies for each feature component) of said function (4) and said feature component denoting a change of each of said joints in motion with respective correspondence established therebetween; and
means for referencing said table depending on a specification of said feature component, thereby determining the values of $d_{mi}$, $a_{mi}$, and $\psi_{mn[i]}$.

15. An apparatus for representing a motion of a multiple-jointed object, having multiple joints, in which an action of each of said joints of said object is controlled so as to present said motion thereof on a screen, comprising:
store means for storing therein a plurality of primary functions of a phase difference, time and amplitude designating actions of respective ones of said joints of said object, each of said primary functions representing a single movement;

select means for selecting, from said plurality of primary functions of time, at least one primary function of time;

computation means for computing, based on said selected primary time functions, at least a secondary function of time, the secondary function of time representing plural movements; and output means for outputting, based on said secondary time function, a motion of said multiple-jointed object in accordance with said plural movements.

16. An apparatus according to claim 15, wherein said computation means computes said at least a secondary time function based on a mean value of said selected plural primary functions of time.

17. An apparatus according to claim 16, wherein said mean value is obtained by applying magnitudes to respective ones of said selected primary time functions.

18. An apparatus according to claim 15, wherein said output means is display means.

19. An apparatus according to claim 15, further comprising:

input means for inputting therefrom information designating a first position of the movement of said object, information denoting at least either one of a speed of said object and a direction of said movement thereof at a first point, information indicating a last position of said movement of said object, and information denoting at least either one of a speed of said object and a direction of said movement thereof at said last point; and path computation means for computing, based on the four kinds of information, information designating a path of said movement of said object from said first position to said last position.

20. An apparatus according to claim 19, further comprising display means for displaying the information designating a path of movement of said object from said first position to said last position.

21. An apparatus according to claim 20, wherein said display means displays the information designating said first position of said movement of the object and the information indicating said last position of said movement of said object.

22. An apparatus according to claim 20, wherein said display means displays information denoting at least either one of a speed of said object and a direction of movement thereof at said first point and information denoting at least either one of a speed of said object and a direction of the movement thereof at said last point.

23. An apparatus according to claim 19, wherein the information denoting at least either one of a speed of said object and a direction of the movement thereof at said first point and the information denoting at least either one of a speed of said object and a direction of the movement thereof at said last point are vector information.

24. An apparatus according to claim 15, further comprising:

input means for inputting therefrom information associated with a position of the movement of said object and information designating a direction of the movement of said object; and path computation means for computing, based on the information associated with a position of said object in the movement and the information indicating a direction of the movement of said object, information designating a path of the movement of said object being moved.

25. An apparatus according to claim 24, further comprising store means for storing therein the information associated with a position of said object in the movement and the information of a direction of the movement of said object.

26. An apparatus according to claim 24, wherein the information denoting a direction of the movement of said object is information indicating a direction of the object in the movement relative to either of a desired point in a coordinate system and another multiple-jointed object.

27. An apparatus according to claim 24, wherein the information denoting a direction of the movement of said object is information indicating a direction of said object in the movement relative to a desired line in a coordinate system.

28. An apparatus according to claim 24, wherein the information denoting a direction of the movement of said object is information indicating a direction of said object in the movement relative to a desired plane in a coordinate system.

29. An apparatus according to claim 24 wherein the information denoting a direction of the movement of said object is information indicating a direction of said object in the movement relative to a preceding direction of the movement of said object.

30. An apparatus according to claim 15, further comprising:

means for specifying transit points of said object;

path generation means for generating a path along which said object moves between specified transit points; and output means for outputting a motion of said object passing a specified transit point.

31. An apparatus according to claim 15 further comprising:

means for specifying transit points of said object;

path generation means for generating a path along which said object moves between specified transit points; and output means for outputting the motion of said object passing a point in the proximity of a specified transit point in accordance with said secondary function of time.

32. A computer graphic system achieving computer graphics comprising:

a motion representing apparatus according to claim 15; and a display for displaying the motion of said multiple-jointed object.

33. A robot control system comprising:

a motion representing apparatus according to claim 15; and a robot being driven in association with the motion of the object.

34. An apparatus according to claim 15 wherein the primary functions of time are components of a function of time.

35. A motion representing apparatus for representing with functions of time an action of each joint of a multiple-jointed object comprising, output means for outputting the motion of the object which takes a specified posture at a specified point of time during the movement.

* * * * *